United States Patent
Lee et al.

(10) Patent No.: US 10,891,681 B2
(45) Date of Patent: Jan. 12, 2021

(54) ITEM PURCHASE, ITEM PURCHASE METHOD AND REFRIGERATOR

(71) Applicants: Samsung Electronics Co., Ltd., Suwon-si (KR); MasterCard International Inc, Purchase, NY (US)

(72) Inventors: Min Su Lee, Suwon-si (KR); Kyoung Ae Lim, Seoul (KR); Ye Kyung Yoo, Seoul (KR); Yoo Lim Baek, Seoul (KR); Chris O'Mahony, Greystones (IE)

(73) Assignees: SAMSUNG ELECTRONICS CO., LTD., Suwon-si (KR); MASTERCARD INTERNATIONAL INC, Purchase, NY (US)

( * ) Notice: Subject to any disclaimer, the term of this patent is extended or adjusted under 35 U.S.C. 154(b) by 248 days.

(21) Appl. No.: 15/391,181

(22) Filed: Dec. 27, 2016

(65) Prior Publication Data

US 2017/0186074 A1 Jun. 29, 2017

Related U.S. Application Data

(60) Provisional application No. 62/272,286, filed on Dec. 29, 2015.

(51) Int. Cl.
| | |
|---|---|
| *G06Q 30/00* | (2012.01) |
| *G06Q 30/06* | (2012.01) |
| *G06Q 10/08* | (2012.01) |
| *G06F 3/0488* | (2013.01) |
| *G06F 3/0482* | (2013.01) |

(Continued)

(52) U.S. Cl.
CPC ......... *G06Q 30/0633* (2013.01); *F25D 23/12* (2013.01); *F25D 29/00* (2013.01); *G06F 3/0482* (2013.01); *G06F 3/04886* (2013.01); *G06Q 10/0875* (2013.01); *G06Q 20/08* (2013.01); *G06Q 20/12* (2013.01); *G06Q 20/18* (2013.01); *G06Q 30/0601* (2013.01); *G06Q 30/0641* (2013.01); *G07F 9/023* (2013.01);

(Continued)

(58) Field of Classification Search
CPC ..................................................... G06Q 30/00
See application file for complete search history.

(56) References Cited

U.S. PATENT DOCUMENTS

| | | | |
|---|---|---|---|
| 6,876,977 B1 * | 4/2005 | Marks .................... | G06Q 30/06 705/26.62 |
| 2003/0120574 A1 * | 6/2003 | Wallman ................ | G06Q 40/06 705/36 R |

(Continued)

OTHER PUBLICATIONS

Pilkington, Katie. A close look at LG's Smart ThinQ LFX31995St Refrigerator (hands-on). Sep. 10, 2013. ,https://www.cnet.com/reviews/lg-smart-thinq-lfx31995st-refrigerator-preview/ (Year: 2013).*

(Continued)

*Primary Examiner* — Abby J Flynn
(74) *Attorney, Agent, or Firm* — Staas & Halsey LLP

(57) ABSTRACT

An item purchase system may include a user device configured to receive an item purchase request from a user and transmit the item purchase request, and the refrigerator configured to display the item purchase request in response to receiving the item purchase request and place an order for the item requested to be purchased according to an input by the user or another user.

19 Claims, 37 Drawing Sheets

(51) Int. Cl.
*G06Q 20/08* (2012.01)
*G07F 9/02* (2006.01)
*F25D 29/00* (2006.01)
*G07F 9/10* (2006.01)
*G06Q 20/18* (2012.01)
*F25D 23/12* (2006.01)
*G06Q 20/12* (2012.01)

(52) U.S. Cl.
CPC ........ *G07F 9/105* (2013.01); *F25D 2400/361* (2013.01); *F25D 2500/06* (2013.01)

(56) References Cited

U.S. PATENT DOCUMENTS

| | | | | |
|---|---|---|---|---|
| 2003/0208380 | A1* | 11/2003 | Honeycutt | G06F 19/3456 705/2 |
| 2008/0201239 | A1* | 8/2008 | Anderson | G06Q 10/087 705/26.2 |
| 2011/0145093 | A1* | 6/2011 | Paradise | G06Q 30/0613 705/26.41 |
| 2012/0203661 | A1* | 8/2012 | Baharloo | G06Q 30/06 705/26.8 |
| 2012/0260683 | A1* | 10/2012 | Cheon | F25D 29/00 62/125 |
| 2013/0214935 | A1* | 8/2013 | Kim | H04L 12/2816 340/870.02 |
| 2014/0195383 | A1* | 7/2014 | Kim | G06Q 30/0633 705/26.62 |
| 2014/0351082 | A1* | 11/2014 | Lowinger | G06Q 30/0633 705/26.8 |
| 2016/0253691 | A1* | 9/2016 | Dante, III | G06Q 30/0207 705/14.1 |

OTHER PUBLICATIONS

Baker, Natasha. Smart refrigerator runs apps for shopping lists, recipes). Jan. 21, 2013. https://www.reuters.com/article/us-app-refrigerator/smart-refrigerator-runs-apps-for-shopping-lists-recipes-idUSBRE90K0PX20130121 (Year: 2013).*
European Communication dated Apr. 19, 2018 in European Patent Application No. 16207235.9.
Extended European Search Report dated Feb. 10, 2017 from European Patent Application No. 16207235.9, 8 pages.
Office Action dated Jul. 19, 2019 in corresponding European Patent Application No. 16 207 235.9.
European Summons to Attend Oral Proceedings dated May 14, 2020 in European Patent Application No. 16207235.9.

* cited by examiner

← Create your Grocerices Account

Step 1 of 5

First name          Last name          — 2021

Email (Used as your primary identifier)   — 2022

Password must be at least 7 characters in length
and should contain at least 1 numeric character.

Create a password

Confirm password          — 2023

Register Now

ITEM PURCHASE, ITEM PURCHASE METHOD AND REFRIGERATOR

CROSS-REFERENCE TO RELATED APPLICATION

This application claims the priority benefit of U.S. Provisional Patent Application No. 62/272,286, filed on Dec. 29, 2015, in the United States Patent and Trademark Office, the disclosure of which is incorporated herein by reference in its entirety.

BACKGROUND

1. Field

The present disclosure relates to a refrigerator, and more particularly, to a refrigerator capable of communicating with an external device.

2. Description of the Related Art

Latest refrigerators include a display configured to display temperature of a storage compartment and an operation mode of a refrigerator.

The display enables a user to easily acquire image information through a graphical user interface and intuitively input a control command through a touch panel. In other words, latest displays perform an information display function as well as an information input function.

Moreover, a latest refrigerator includes a communication module configured to connect to an external device (e.g., a server connected to the Internet).

A refrigerator may connect to the Internet via the communication module, acquire diverse information from multiple servers connected to the Internet, and provide various services based on the acquired information. For example, a refrigerator may provide information on a food item and information related to the food item such as a recipe for the food item through the Internet and provide various services such as online shopping.

In this way, a refrigerator provides a user with wide-ranging services through the display and the communication module.

SUMMARY

It is an aspect of the present disclosure to provide a refrigerator capable of providing convenient online shopping through a communication device and a touchscreen display.

Additional aspects of the present disclosure will be set forth in part in the description which follows and, in part, will be obvious from the description, or may be learned by practice of the present disclosure.

In accordance with one aspect of an exemplary embodiment, an item purchase system may include a user device configured to receive an item purchase request from a user and transmit the item purchase request, and the refrigerator configured to display the item purchase request in response to receiving the item purchase request and place an order for the item requested to be purchased according to an input by the user or another user.

The refrigerator may include a communicator configured to receive a purchase request from the user device, a touchscreen display configured to display the purchase request from the user device and a controller configured to place an order for an item requested to be purchased from the user device via the communicator when a touch input for accepting the purchase request from the user device is received through the touchscreen display.

The controller may display user identification information, information of the item requested to be purchased from the user device, a purchase request refusal button configured to turn down the purchase request from the user device, and a purchase request acceptance button configured to accept the purchase request from the user device.

When a touch input on the purchase request acceptance button is received, the controller may display an order screen configured to place an order for the item requested to be purchased from the user device on the touchscreen display.

When a touch input related to the user identification information is received, the controller may display a user message input through the user device.

The controller may display a plurality of store selection buttons configured to respectively represent a plurality of stores on the touchscreen display.

The controller may separately display available items from each of the plurality of stores on the touchscreen display.

The controller may separately displays purchase prices to be paid to each of the plurality of stores on the touchscreen display.

The item purchase system may further include a service server configured to receive the item purchase request from the user device and transmit the item purchase request to the refrigerator.

The service server may send a message for connecting an account of the user device to the refrigerator to the user device in response to account connection request from the refrigerator and register the account of the user device to the refrigerator in response to account connection acceptance from the user device.

In accordance with one aspect of an exemplary embodiment, an item purchase method using a user device and a refrigerator may include receiving an item purchase request by the user device from a user, transmitting the item purchase request from the user device to the refrigerator in response to the item purchase request, displaying the item purchase request on the refrigerator, in response to receiving the item purchase request, and placing an order for an item requested to be purchased, in response to an input to the refrigerator by the user or another user.

The displaying of the item purchase request on the refrigerator may include displaying, on the refrigerator, a purchase request image that includes the user identification information, information of the item requested to be purchased from the user device, a purchase request refusal button configured to turn down the purchase request from the user device, and a purchase request acceptance button configured to accept the purchase request from the user device.

The item purchase method may further include displaying an order screen configured to place an order for the item requested to be purchased from the user device on the refrigerator when a touch input on the purchase request acceptance button is received.

The item purchase method may include displaying, on the refrigerator, the user message input through the user device when a touch input related to the user identification information is received.

The item purchase method may further include separately displaying available items from each of a plurality of stores on the refrigerator.

The item purchase method may further include separately displaying each purchase price to be paid to each of a plurality of stores on the refrigerator.

In accordance with one aspect of an exemplary embodiment, a refrigerator may include a communicator configured to receive an item purchase request from a user device, a touchscreen display configured to display the item purchase request from the user device, and a controller configured to place an order for an item requested to be purchased from the user device via the communicator, when a touch input for accepting the item purchase request from the user device is received from a user through the touchscreen display.

The controller may display, on the touchscreen display, a purchase request image that includes the user identification information, information of the item requested to be purchased from the user device, a purchase request refusal button configured to turn down the purchase request from the user device, and a purchase request acceptance button configured to accept the purchase request from the user device.

When a touch input to the purchase request acceptance button is received, the controller may display an order screen configured to place an order for the item requested to be purchased from the user device on the touchscreen display.

When a touch input related to the user identification information is received, the controller may display the user message input through the user device on the touchscreen display.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 9, 10 and 11 illustrate an example of a registration screen displayed on the refrigerator according to an embodiment;

DETAILED DESCRIPTION

Figure 1:
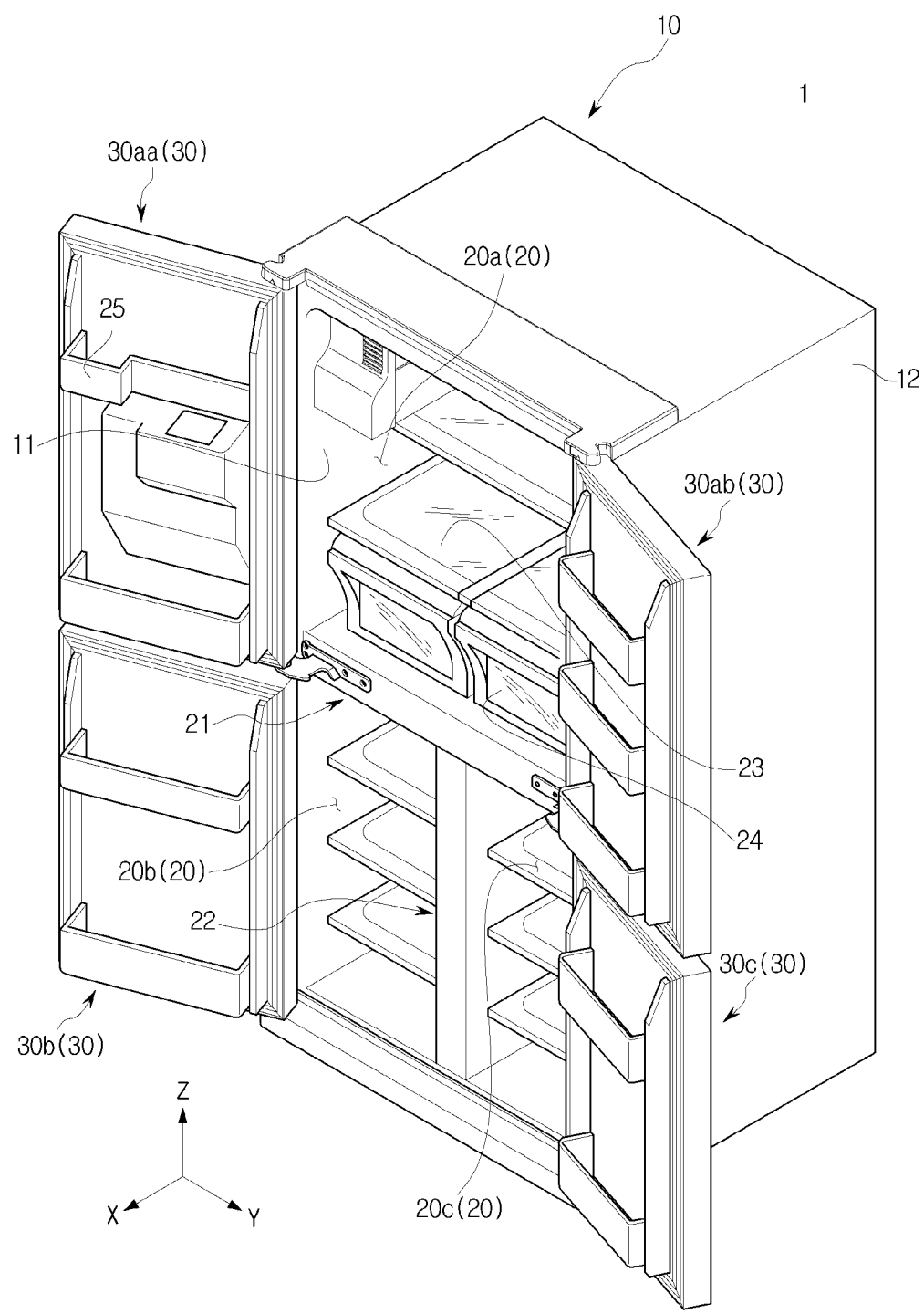
FIG. 1 illustrates an exterior of a refrigerator according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

Figure 2:
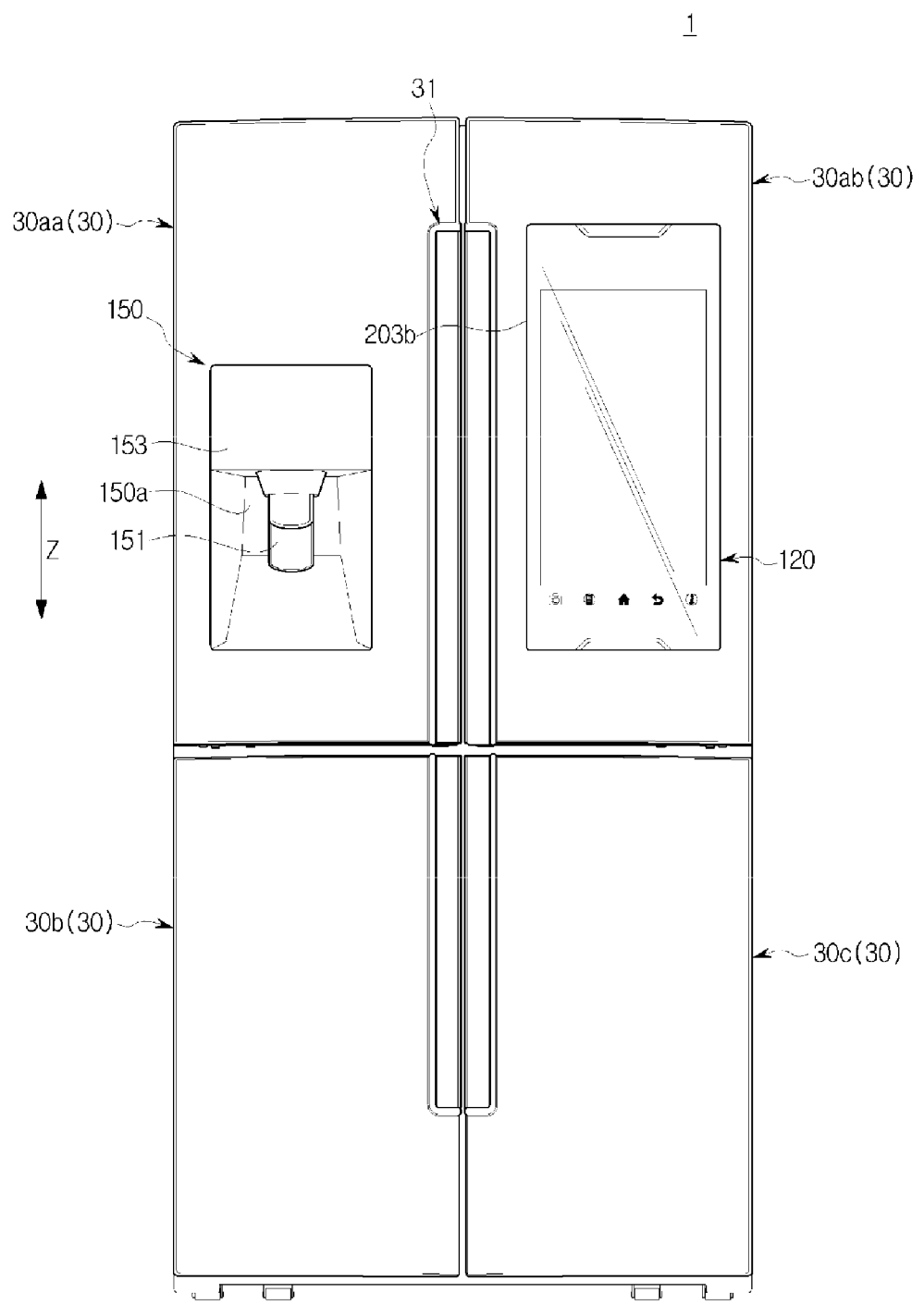
FIG. 2 illustrates a front surface of the refrigerator according to the embodiment.
Figure 3:
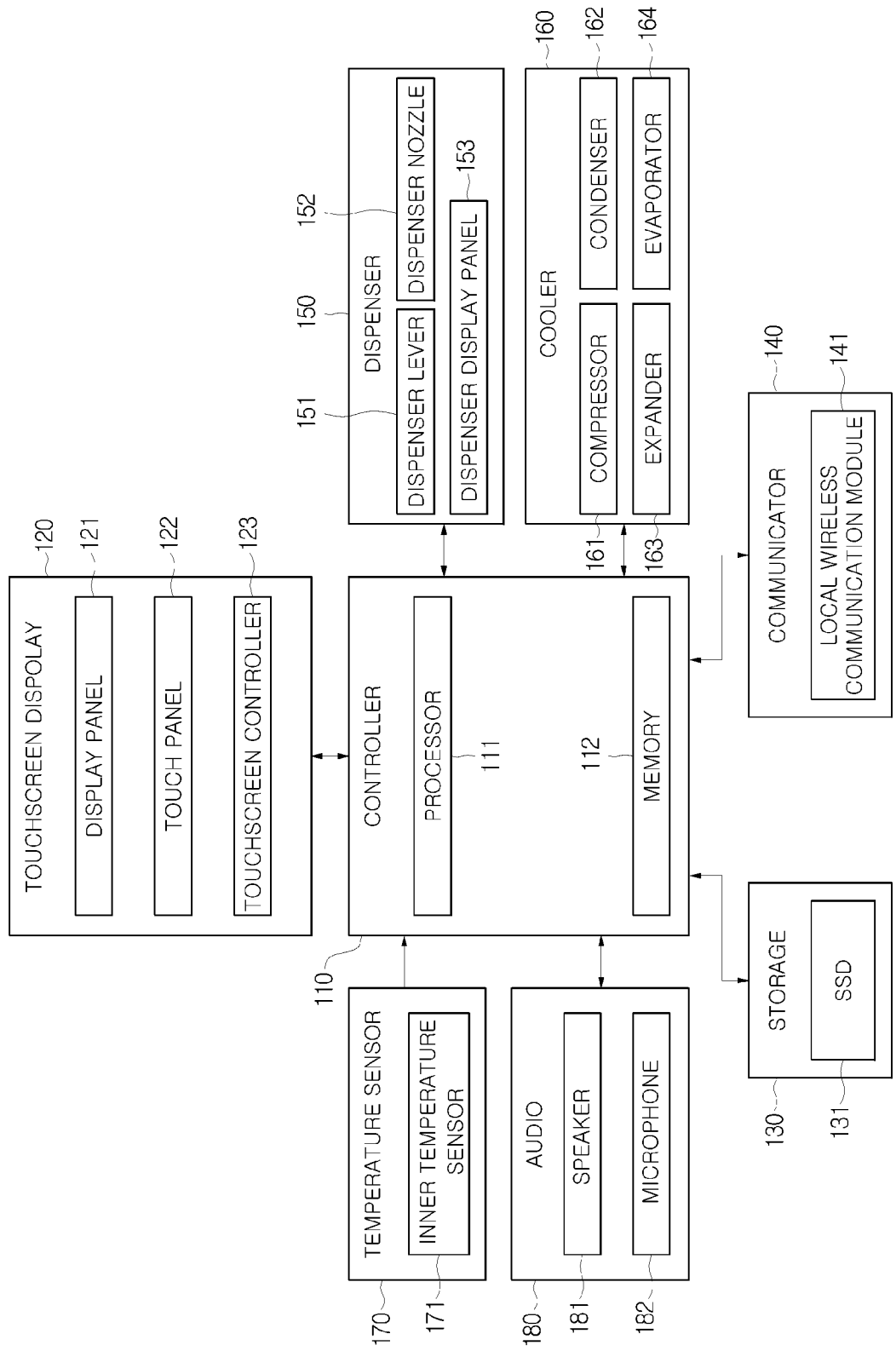
FIG. 3 illustrates a configuration of the refrigerator according to the embodiment.
Figure 4:
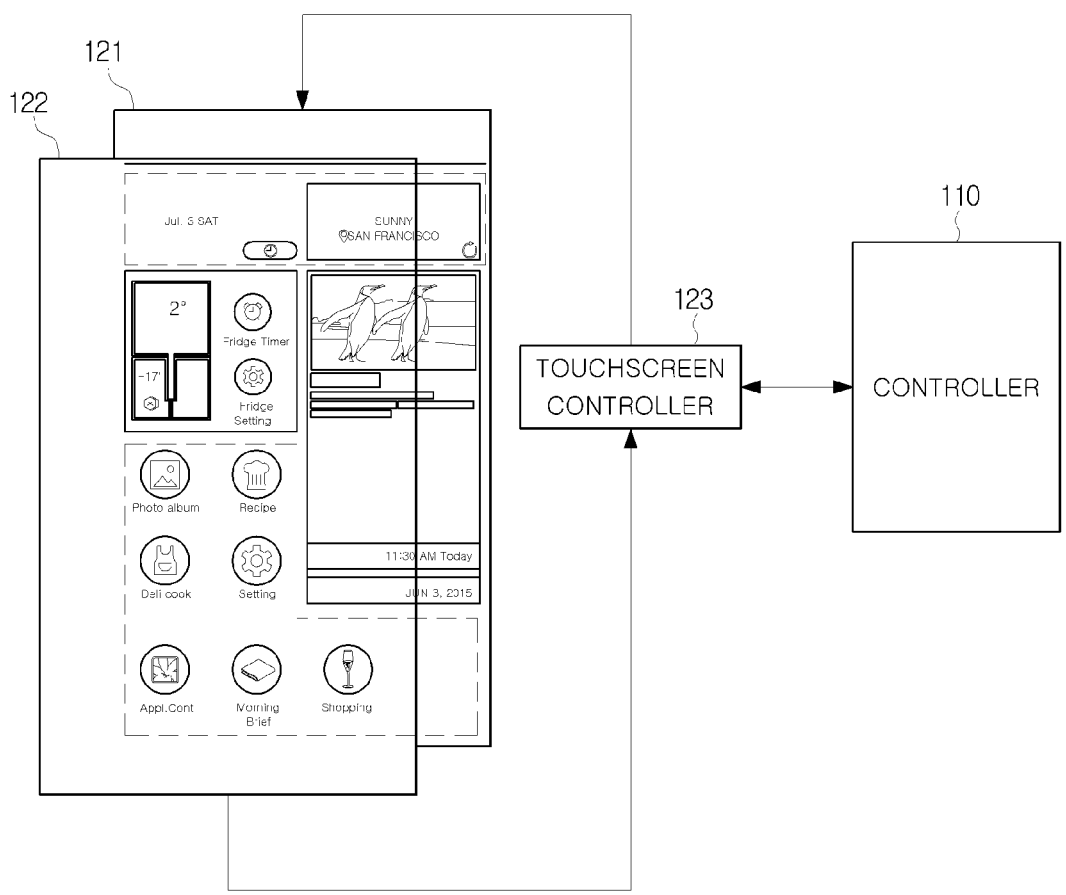
FIG. 4 illustrates a touchscreen display included in the refrigerator according to the embodiment.

FIG. 1 illustrates an exterior of a refrigerator according to an embodiment. FIG. 2 illustrates a front surface of the refrigerator according to the embodiment. FIG. 3 illustrates a configuration of the refrigerator according to the embodiment. Also, FIG. 4 illustrates a touchscreen display included in the refrigerator according to the embodiment.

Referring to FIGS. 1, 2, 3 and 4, a refrigerator 1 may include a main body 10 having an open front surface, a storage compartment 20 formed in the main body 10 and configured to keep a food item refrigerated and/or frozen, and a door 30 configured to open or close the open front surface of the main body 10.

The main body 10 may form an exterior of the refrigerator 1. The main body 10 may include an inner case 11 configured to form the storage compartment 20 and an outer case 12 configured to be coupled to outside of the inner case 11 to form the exterior of the refrigerator 1. A portion between the inner case 11 and the outer case 12 of the main body 10 may be filled with an insulating material (not illustrated) configured to prevent outflow of cold air from the storage compartment 20.

The storage compartment 20 may be divided into a plurality of sections by a horizontal partition 21 and a vertical partition 22. For example, as illustrated in FIG. 1, the storage compartment 20 may be divided into an upper storage compartment 20a, a lower first storage compartment 20b, and a lower second storage compartment 20c. A shelf 23 configured to have food items placed thereon and an airtight container 24 configured to keep food items airtight may be provided in the storage compartment 20.

The storage compartment 20 may be opened and closed by the door 30. For example, as illustrated in FIG. 1, the upper storage compartment 20a may be opened and closed by an upper first door 30aa and an upper second door 30ab, the lower first storage compartment 20b may be opened and closed by a lower first door 30b, and the lower second storage compartment 20c may be opened and closed by a lower second door 30c.

Handles 31 may be provided at the door 30 so that the door 30 may be opened and closed with ease. The handles 31 may be longitudinally formed in a vertical direction along a portion between the upper first door 30aa and the upper second door 30ab and a portion between the lower first door 30b and the lower second door 30c. Thus, the handles 31 may seem to be integrally formed when the door 30 is closed.

Also, as illustrated in FIG. 3, the refrigerator 1 may include a touchscreen display 120, a storage 130, a communicator 140, a dispenser 150, a cooler 160, a temperature sensor 170, an audio 180, and a controller 110.

The touchscreen display 120 may include a display panel 121 configured to display an image, a touch panel 122 configured to receive a touch input, and a touchscreen controller 123 configured to drive or control the display panel 121 and the touch panel 122.

The display panel 121 may convert image data received from the controller 110 to an optical signal that is visible to a user through the touchscreen controller 123.

The display panel 121 may employ a cathode ray tube (CRT), a display panel, a liquid crystal display (LCD) panel, a light emitting diode (LED) panel, an organic LED (OLED) panel, a plasma display panel (PDP), a field emission display (FED) panel, and the like. However, the display panel 121 is not limited thereto, and the display panel 121 may employ various other displays capable of visually displaying an optical image corresponding to image data.

The touch panel 122 may receive a user's touch input to the touch panel 122 and output an electrical signal corresponding to the received touch input to the touchscreen controller 123.

For example, the touch panel 122 may sense a user's touch on the touch panel 122 from a change in electrical resistance value or a change in capacitance and may output an electrical signal corresponding to coordinates of the user's touch point to the touchscreen controller 123. The touchscreen controller 123 may determine the coordinates of the user's touch point on the basis of the electrical signal received from the touch panel 122.

The touch panel 122 may be placed at a front surface of the display panel 121. In other words, the touch panel 122 may be provided on a surface on which an image is displayed. Consequently, the touch panel 122 may be formed of a transparent material so that an image displayed on the display panel 121 is not distorted.

The touch panel 122 may employ a resistive film type touch panel or a capacitance type touch panel. However, the touch panel 122 is not limited thereto. The touch panel 122 may employ various other touch panels capable of sensing a user's touch or approach and outputting an electrical signal corresponding to coordinates of a sensed touch point or a sensed approach point.

The touchscreen controller 123 may control operation of the display panel 121 and the touch panel 122. For example, as illustrated in FIG. 4, the touchscreen controller 123 may control the touch panel 122 to detect coordinates of a user's touch point and control the display panel 121 to display an optical image corresponding to image data received from the controller 110.

According to an embodiment, the touchscreen controller 123 may determine coordinates of a user's touch point on the basis of an electrical signal output from the touch panel 122 and output the coordinates of the user's touch point to the controller 110. Also, according to an embodiment, the touchscreen controller 123 may transmit an electrical signal output from the touch panel 122 to the controller 110 so that the controller 110 determines coordinates of a user's touch point.

The touchscreen controller 123 may include a memory configured to store a program and data for controlling operation of the display panel 121 and the touch panel 122 and a microprocessor configured to carry out operation for controlling operation of the display panel 121 and the touch panel 122 according to the program and the data stored in the memory. The memory and the processor of the touchscreen controller 123 may be provided with separate chips or a single chip.

In this way, the touchscreen display 120 may receive a touch input from a user and display an image according to the user's touch input. In other words, the touchscreen display 120 may interact with a user.

The touchscreen display 120 may be installed at the door 30 for user convenience. For example, as illustrated in FIG. 2, the touchscreen display 120 may be installed at the upper second door 30ab. Hereinafter, the touchscreen display 120 installed at the upper second door 30ab will be described. However, an installation position of the touchscreen display 120 is not limited to be at the upper second door 30ab. For example, the touchscreen display 120 may be installed at any position visible to a user, such as the upper first door 30aa, the lower first door 30b, the lower second door 30c, and the outer case 12 of the main body 10.

Also, the touchscreen display 120 may have a wake-up function in which the touchscreen display 120 is automatically activated when a user approaches the touchscreen display 120 within a predetermined range. For example, when a user approaches the touchscreen display 120 within a predetermined range, the touchscreen display 120 may be activated. In other words, the touchscreen display 120 may be turned on. Also, the touchscreen display 120 may be deactivated when a predetermined amount of time passes after the user leaves the predetermined range. In other words, the touchscreen display 120 may be turned off.

The touchscreen display 120 may display various screens or images. Screens or images displayed on the touchscreen display 120 will be described in detail below.

The storage 130 may include a nonvolatile memory configured to store a program or power supply and in which loss of the program or data stored therein does not occur even when power is cut off. For example, the storage 130 may include a high-capacity flash memory, a solid state drive (SSD) 131, or the like.

The storage 130 may have a control program and control data for controlling operation of the refrigerator 1 and various application programs and application data for performing various functions according to user input, stored therein.

For example, the storage 130 may have an operating system (OS) program configured to manage elements and resources (software and hardware) included in the refrigerator 1, an image display application configured to display an image, a video play application configured to play a video, a scheduler application configured to manage a schedule, a memo application for configured to store and display a memo, an online shopping application through which items can be bought online, stored therein.

The communicator 140 may transmit and receive data to and from an external device according to communication control by the controller 110. For example, the communicator 140 may include a local wireless communication module 141.

The local wireless communication module 141 may wirelessly transmit and receive data to and from an external device located relatively near the local wireless communication module 141. The local wireless communication module 141 may communicate with an external device by communication standards such as wireless fidelity (Wi-Fi), Bluetooth, and ZigBee.

The local wireless communication module 141 may include an antenna configured to transmit a wireless signal into free space or receive a wireless signal from free space, a modulator configured to modulate data that will be transmitted, a demodulator configured to demodulate a received wireless signal, and the like.

The dispenser 150 may dispense water or ice according to user input. In other words, a user may directly have water or ice dispensed to the outside without opening the door 30.

The dispenser 150 may include a dispenser lever 151 configured to receive a dispense command from a user, a dispenser nozzle 152 configured to dispense water or ice, and a dispenser display panel 153 configured to display an operational state of the dispenser 150.

The dispenser 150 may be installed outside of the door 30 or the main body 10. For example, as illustrated in FIG. 2, the dispenser 150 may be installed at the upper first door 30aa. Hereinafter, the dispenser 150 installed at the upper first door 30aa will be described. However, installation position of the dispenser 150 is not limited to be at the upper first door 30aa. The dispenser 150 may be installed at any position at which a user may have water or ice dispensed, such as the upper second door 30ab, the lower first door 30b, the lower second door 30c, and the outer case 12 of the main body 10.

Also, a cavity 150a recessed to form a dispensing space for water or ice may be provided at the door 30, and the dispenser nozzle 152 and the dispenser lever 151 may be provided in the cavity 150a. Water or ice may be dispensed from the dispenser nozzle 152 when a user presses the dispenser lever 151.

The cooler 160 may supply cold air to the storage compartment 20. Specifically, the cooler 160 may use refrigerant evaporation to keep temperature in the storage compartment 20 within a predetermined range.

The cooler 160 may include a compressor 161 configured to compress a gaseous refrigerant, a condenser 162 configured to change the phase of the compressed gaseous refrigerant to a liquid state, an expander 163 configured to decompress the liquid refrigerant, and an evaporator 164 configured to change the phase of the decompressed liquid refrigerant to a gaseous state.

The cooler 160 may use a phenomenon in which a liquid refrigerant absorbs thermal energy of the surrounding air while the phase of the liquid refrigerant is being changed to a gaseous state to cool air in the storage compartment 20.

However, elements of the cooler 160 are not limited to the compressor 161, the condenser 162, the expander 163, and the evaporator 164.

For example, the cooler 160 may include a Peltier device using the Peltier effect. The Peltier effect refers to a phenomenon in which, when a current flows through a contact surface between two different types of metal, one metal generates heat, and the other metal absorbs heat. The cooler 160 may user the Peltier device to cool air in the storage compartment 20.

In another example, the cooler 160 may include a magnetic cooling device using a magneto-caloric effect. The magneto-caloric effect refers to a phenomenon in which a particular material (a magneto-caloric material) generates heat when magnetized and absorbs heat when demagnetized. The cooler 160 may use a magnetic cooling device to cool air in the storage compartment 20.

The temperature sensor 170 may include inner temperature sensors 171 provided in the storage compartment 20 to sense temperature inside the storage compartment 20.

The inner temperature sensors 171 may be installed in each of the plurality of storage compartments 20a, 20b, and 20c to sense temperatures inside the plurality of storage compartments 20a, 20b, and 20c and output an electrical signal corresponding to a sensed temperature to the controller 110. Each of the inner temperature sensors 171 may include a thermistor configured to have electrical resistance thereof changed according to temperature.

The audio 180 may include a speaker 181 configured to convert an electrical signal received from the controller 110 to a sound signal and output the converted sound signal and a microphone 182 configured to convert the sound signal to an electrical signal and output the converted electrical signal to the controller 110.

The controller 110 may include a memory 112 configured to store a program and data for controlling operation of the refrigerator 1 and a processor 111 configured to generate a control signal for controlling operation of the refrigerator 1 according to the program and the data stored in the memory 112.

The memory 112 may temporarily store a user's touch input data input through the touchscreen display 120, stored data stored in the storage 130, communication data received through the communicator 140 and/or temperature data sensed by the temperature sensor 170. For example, the memory 112 may store a screen and/or an image that will be displayed on the touchscreen display 120 and may store coordinates of a user's touch input through the touchscreen display 120 and a control command corresponding to the user's touch input.

The memory 112 may include a volatile memory, such as a static random access memory (S-RAM) and dynamic RAM (D-RAM), configured to temporarily store data. Also, the memory 112 may include a non-volatile memory, such as a read-only memory (ROM), an erasable programmable ROM (EPROM), and an electrically EPROM (EEPROM), configured to store data for a long period.

The processor 111 may include various types of logic circuits and operational circuits, process data according to a program provided from the memory 112, and generate a control signal according to a result of processing.

For example, the processor 111 may process coordinates of a touch input that is input through the touchscreen display 120 and determine a control command from the user according to the coordinates of the touch input. Also, the processor 111 may control the communicator 140 to acquire information corresponding to the control command from the user and may control the touchscreen display 120 to display a screen and/or an image corresponding to the control command from the user.

The processor 111 and the memory 112 may be implemented with separate chips or with a single chip.

In this way, the controller 110 may control operation of the refrigerator 1 according to user input received through the touchscreen display 120 and/or a program and data stored in the storage 130.

Operation of the refrigerator 1 that will be described below may be seen as being controlled by the controller 110.

The touchscreen display 120, the storage 130, the communicator 140, the dispenser 150, the cooler 160, the temperature sensor 170, the audio 180, and the controller 110 included in the refrigerator 1 have been described. However, other elements may be added or some of the elements may be omitted as needed.

Hereinafter, operation of the refrigerator 1 will be described.

Figure 5:
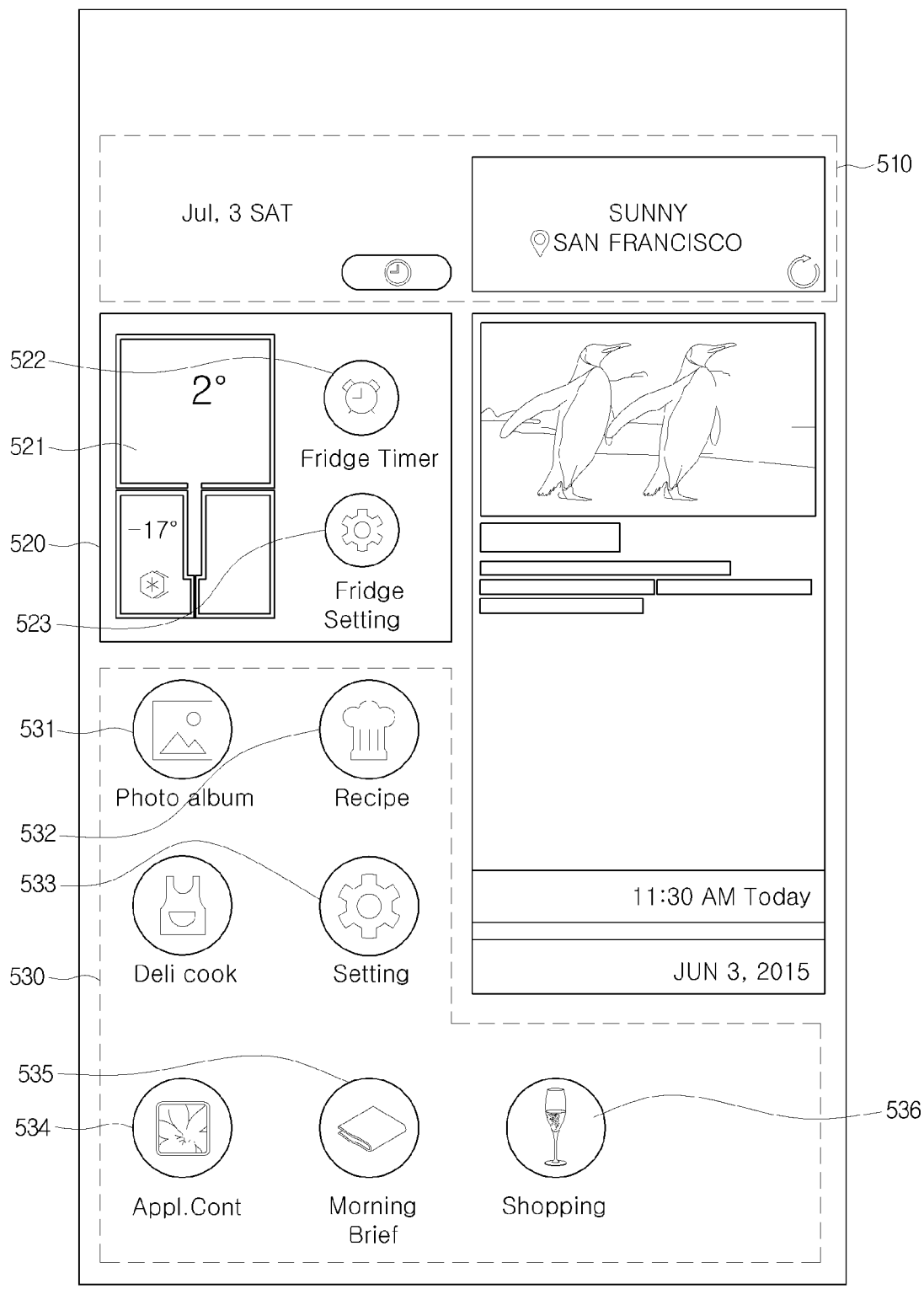
FIG. 5 illustrates a home screen displayed on a touchscreen display included in the refrigerator according to an embodiment.

FIG. 5 illustrates a home screen displayed on a touchscreen display included in the refrigerator according to an embodiment.

When power is supplied to the refrigerator 1, the controller 110 may control the touchscreen display 120 to display a home screen 500 as illustrated in FIG. 5.

A time/date area 510 configured to display time and date, an operational information area 520 configured to display operational information of the refrigerator 1, and a plurality of launchers 530 configured to execute an application stored in the storage 130 may be displayed on the home screen 500.

Current time information and current date information may be displayed in the time/date area 510. Also, location information on the location of the refrigerator 1 (e.g., a name of a country or a city) may be displayed in the time/date area 510.

A storage compartment map 521 related to operation of the plurality of storage compartments 20a, 20b, and 20c included in the refrigerator 1 may be displayed in the operational information area 520.

Information related to operation of the plurality of storage compartments 20a, 20b, and 20c included in the refrigerator 1 may be displayed in the storage compartment map 521. For example, as illustrated in FIG. 5, each of the upper storage compartment 20a, the lower first storage compartment 20b, and the lower second storage compartment 20c may be displayed in the storage compartment map 521, and a target temperature of the upper storage compartment 20a, a target temperature of the lower first storage compartment 20b, and a target temperature of the lower second storage compartment 20c may be displayed in the storage compartment map 521.

When the user touches an area representing each of the storage compartments 20a, 20b, and 20c, the controller 110 may display an image configured to display a target temperature of each of the storage compartments 20a, 20b, and 20c. For example, when a user touches an area representing the upper storage compartment 20a in the storage compartment map 521, an image for setting a target temperature of the upper storage compartment 20a may be displayed on the touchscreen display 120.

Also, a timer setting icon 522 and a refrigerator setting icon 523 for executing a control application for controlling operation of the refrigerator 1 may be displayed in the operational information area 520.

When a user touches a timer setting icon 522, the controller 110 may display a timer setting screen for setting a target time of a timer on the touchscreen display 120. For example, a user may input a time at which an alarm will be output through a timer setting image, and the refrigerator 1 may output an alarm at a time input by the user.

When the user touches the refrigerator setting icon 523, the controller 110 may display an operational setting screen through which set values for controlling operation of the refrigerator 1 may be input on the touchscreen display 120. For example, the user may set a target temperature of each of the plurality of storage compartments 20a, 20b, and 20c included in the refrigerator 1 and may set which one of water or ice will be dispensed through the dispenser 150, through the operational setting screen.

Also, the plurality of launchers 530 configured to run various applications stored in the storage 130 by a user may be displayed on the home screen 500.

For example, an album launcher 531 configured to run an album application that displays a photo, a recipe launcher 532 configured to run a recipe application that provides a recipe for a food item, and a screen setting launcher 533 configured to run a screen setting application that controls operation of the touchscreen display 120 may be displayed on the home screen 500. Also, a home appliance control launcher 534 configured to run a home appliance control application that control various types of home appliances through the refrigerator 1, a voice output setting launcher 535 configured to set operation of a voice output application that outputs various content in the form of voice, and an online shopping launcher 536 configured to run an online shopping application for online shopping may be displayed on the home screen 500.

As described above, key information related to operation of the refrigerator 1 or launchers configured to run various applications may be displayed on the home screen 500 of the refrigerator 1.

However, the home screen 500 illustrated in FIG. 5 is merely an example. A home screen may be displayed in various forms on the refrigerator 1 according to user settings and the like, and pieces of information and launchers displayed on a home screen are also not limited to those illustrated in FIG. 5.

Figure 6:
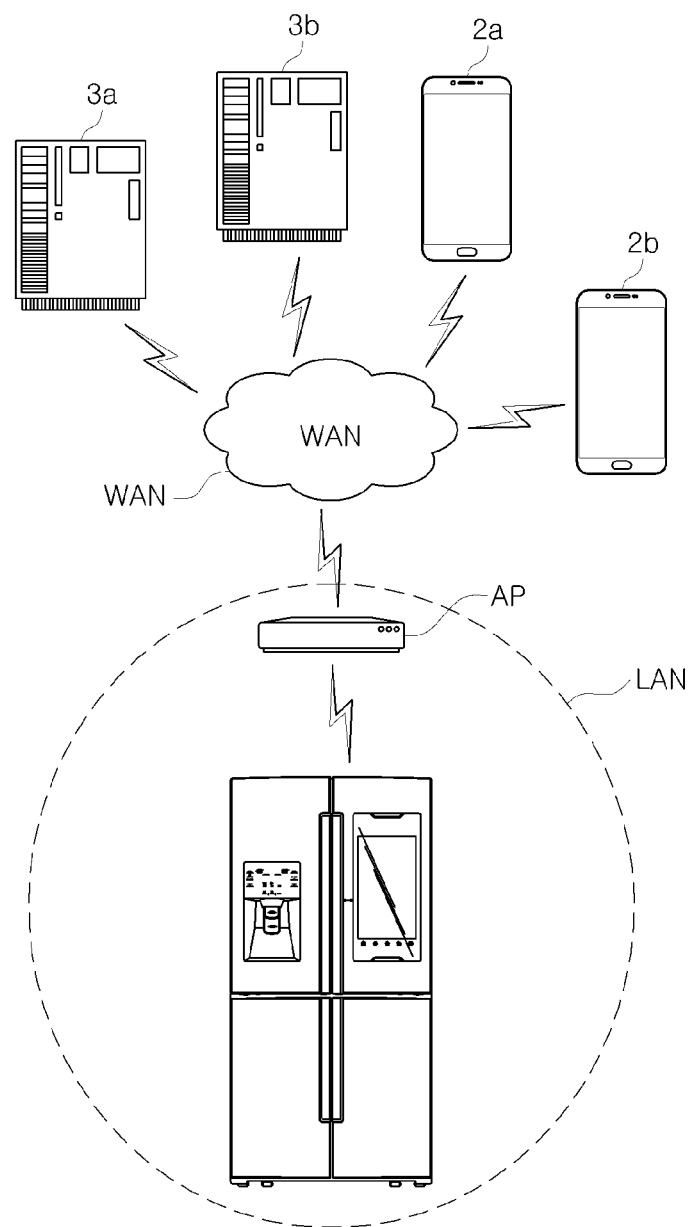
FIG. 6 is a view illustrating an example in which a refrigerator according to an embodiment communicates with external devices.

FIG. 6 is a view illustrating an example in which a refrigerator according to an embodiment communicates with external devices.

The refrigerator 1 may communicate with various external electronic devices via the communicator 140.

For example, as illustrated in FIG. 6, the refrigerator 1 may be connected to a wireless access point (AP) via the communicator 140. Specifically, the refrigerator 1 may be connected to a connection repeater (AP) using wireless communication standards such as Wi-Fi™ (IEEE 802.11), Bluetooth™ (IEEE 802.15.1), and ZigBee (IEEE 802.15.4).

The wireless AP may be referred to by various names such as "hub," "router," "switch," and "gateway" and may be connected to a wide area network (WAN) such as the Internet.

Various home appliances such as an air conditioner, a washing machine, an electric oven, a microwave oven, a robot cleaner, a security camera, a lamp, and a television may also be connected to the wireless AP in addition to the refrigerator 1. Also, home appliances connected to the wireless AP may form a local area network (LAN).

Also, the wireless AP may connect the LAN formed by the home appliances connected to the wireless AP to the WAN such as the Internet.

A service server 3a configured to provide a predetermined service to the refrigerator 1 and a shopping mall server 3b configured to sell items online may be connected to the WAN.

Also, user devices 2a and 2b may be connected to the WAN. The user devices 2a and 2b may be connected to the WAN through a mobile communication service provided by a mobile carrier or through the wireless AP.

The user devices 2a and 2b may be connected to the WAN wirelessly or by wire and may communicate with other devices such as the refrigerator 1. The user devices 2a and 2b may be a portable device capable of being held and carried by a user or a fixed type device that is difficult to be carried. The user devices 2a and 2b may be referred to by various names such as mobile phones, cellular phones, smartphones, personal communication services (PCS), personal digital assistants (PDAs), computers, notebooks, personal computers (PCs), laptops, and desktops.

The refrigerator 1 may transmit data to the service server 3a and/or the shopping mall server 3b, and receive data from the service server 3a and/or the shopping mall server 3b. The user devices 2a and 2b may also transmit data to the service server 3a and/or the shopping mall server 3b and receive data from the service server 3a and/or the shopping mall server 3b.

Figure 7:
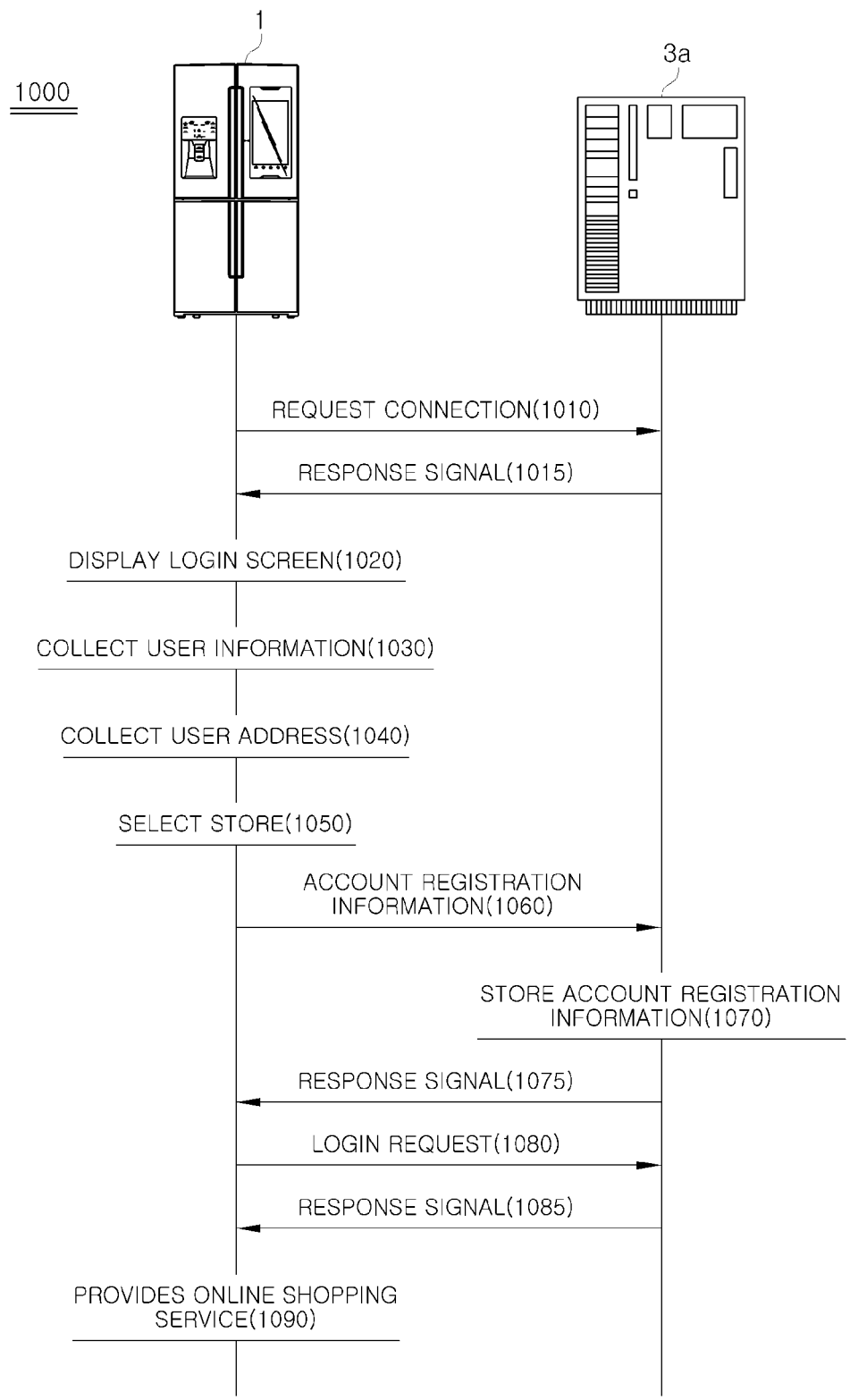
FIG. 7 illustrates a method of registering the refrigerator according to an embodiment to a service server.
Figure 8:
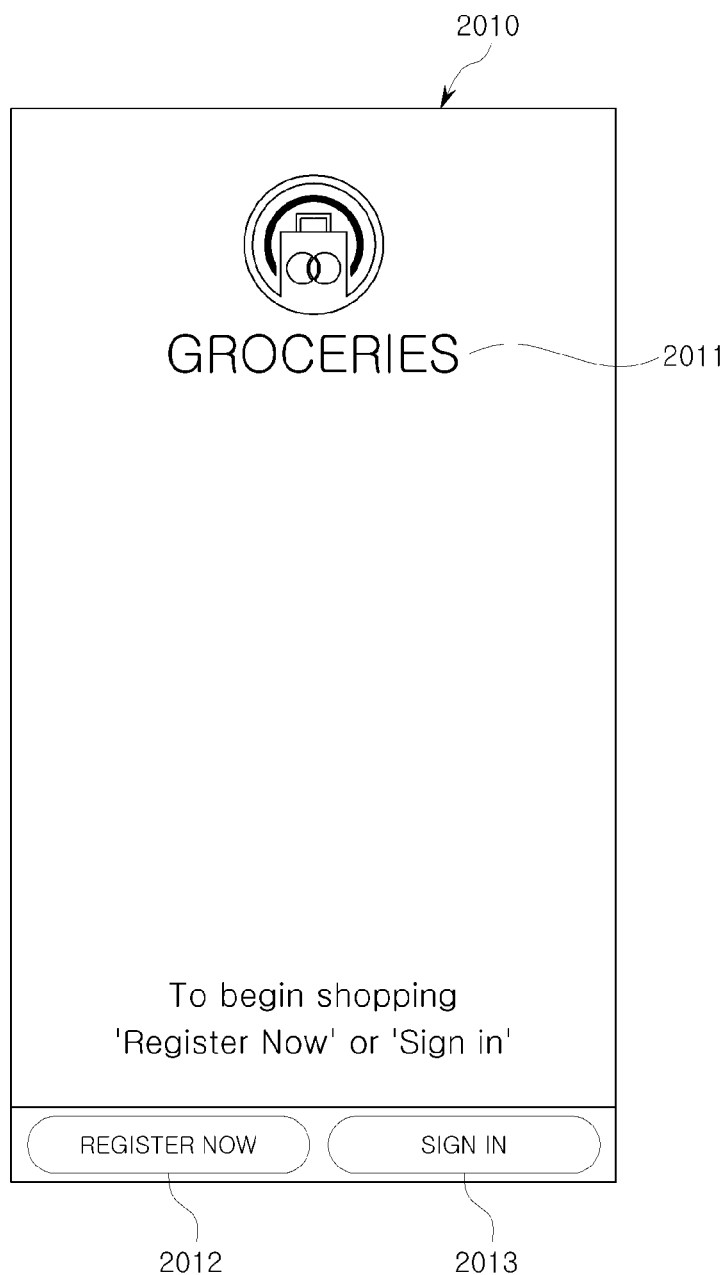
FIG. 8 illustrates an example of a login screen displayed on the refrigerator according to an embodiment.
Figure 10:
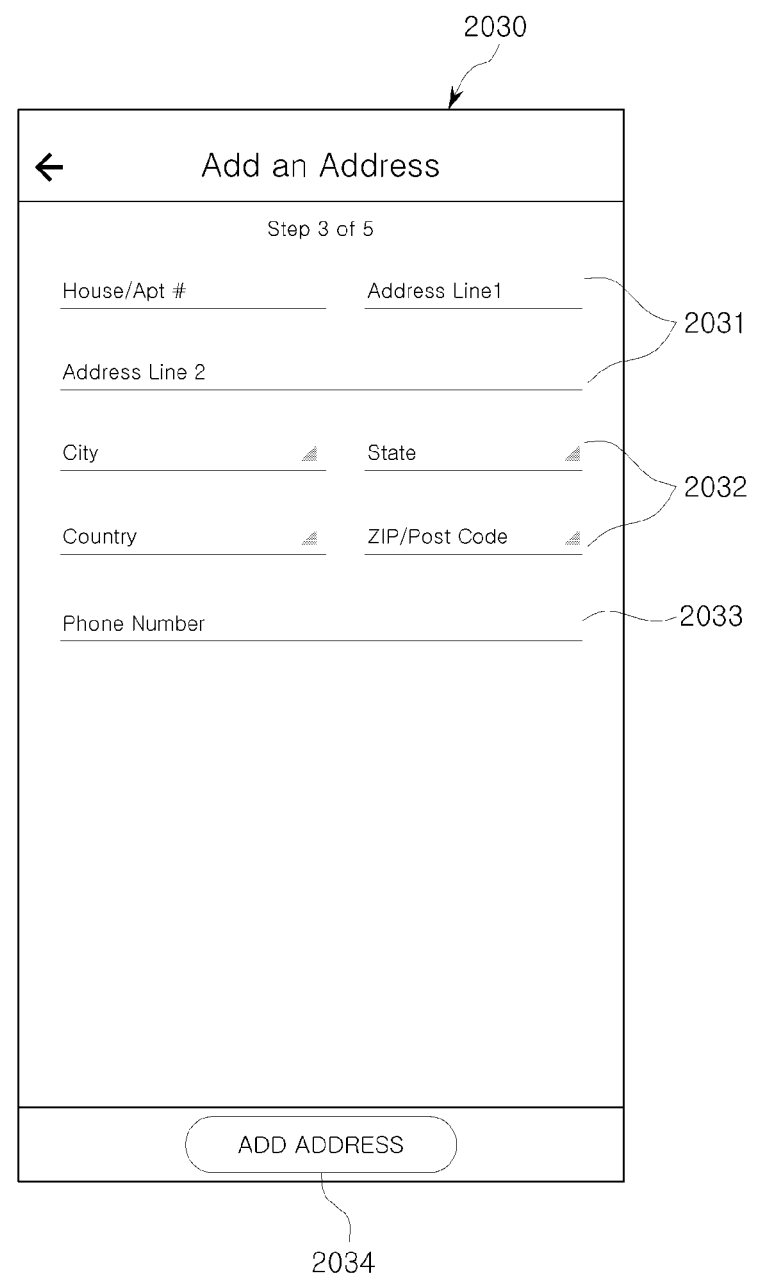
Figure 11:
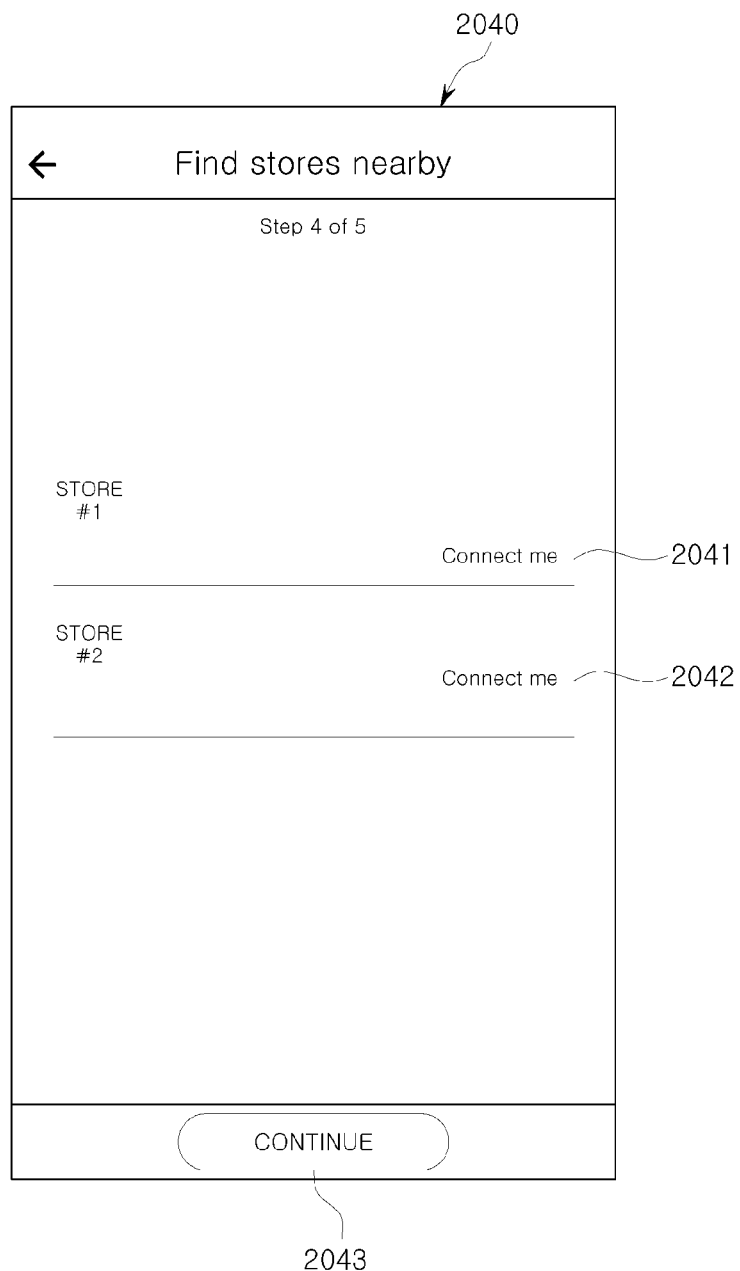
Figure 12:
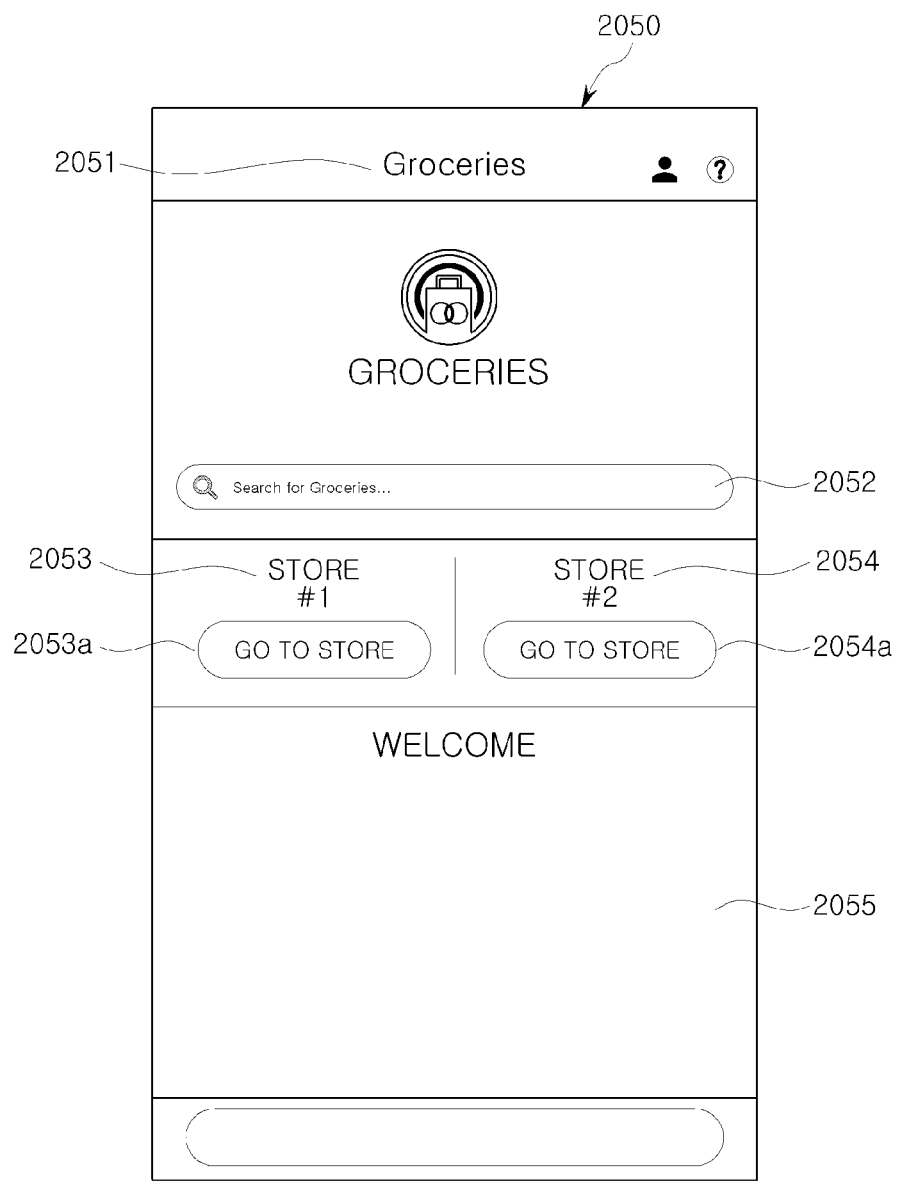
FIG. 12 illustrates an example of a main shopping screen displayed on the refrigerator according to an embodiment.

FIG. 7 illustrates a method of registering the refrigerator according to an embodiment to a service server. FIG. 8 illustrates an example of a login screen displayed on the refrigerator according to an embodiment. FIGS. 9, 10 and 11 illustrate an example of a registration screen displayed on the refrigerator according to an embodiment. Also, FIG. 12 illustrates an example of a main shopping screen displayed on the refrigerator according to an embodiment.

A registration method 1000 for registering the refrigerator 1 to the service server 3a will be described with reference to FIGS. 7, 8, 9, 10, 11 and 12.

The refrigerator 1 requests connection to the service server (1010).

When a user touches the online shopping launcher 536 displayed on the home screen 500 (see FIG. 5), the refrigerator 1 runs the online shopping application for online shopping, and the refrigerator 1 may request connection to the service server 3a via the communicator 140 by the online shopping application.

With the request for connection to the service server 3a, the refrigerator 1 may transmit universal unique identifiers (UUID), a name, a media access control (MAC) address, an internet protocol (IP) address, and the like to the service server 3a.

In response to the connection request from the refrigerator 1, the service server 3a transmits a response signal to the refrigerator 1 (1015).

Then, the refrigerator 1 displays a login screen 2010 (1020).

To login to the service server 3a, the refrigerator 1 may display the login screen 2010 on the touchscreen display 120 and acquire login information from a user via the login screen 2010. For example, the refrigerator 1 may display the login screen 2010 illustrated in FIG. 8.

The login screen 2010 may include a title area 2011 configured to indicate an online shopping application, a registration area 2012 configured to register the refrigerator 1 to the service server 3a, and a login area 2013 configured to connect the refrigerator 1 to the service server 3a.

A user may touch the login area 2013 when the refrigerator 1 is already registered to the service server 3a. Then, the user may input login information for connecting the refrigerator 1 to the service server 3a. The login information may include one or more sets of account information (e.g., an account ID) related to the service server 3a and authentication information (e.g., a password) related to the service server 3a.

The user may touch the registration area 2012 when the refrigerator 1 is not registered to the service server 3a yet. The user may input information for registering the refrigerator 1 to the service server 3a, and the refrigerator 1 may sequentially display screens 2020, 2030, and 2040 for registering the refrigerator 1 to the service server 3a.

The refrigerator 1 collects user information to be registered to the service server (1030).

The refrigerator 1 may display a user information collection screen 2020 on the touchscreen display 120 to collect user information from the user. For example, the refrigerator 1 may display the user information collection screen 2020 illustrated in FIG. 9.

The user information collection screen 2020 may include a name collection area 2021 configured to collect name of a user, an account information collection area 2022 configured to collect user account information (e.g., an e-mail address or an account ID) for identifying the user, an authentication information collection area 2023 configured to collect authentication information (e.g., a password) for authenticating the user, and a user information registration button 2024 configured to register the user's name, account information, and authentication information.

The user may input his or her name, account information, and authentication information to the user information collection screen 2020 to register the refrigerator 1 to the service server 3a. Then, when the user touches the user information registration button 2024, the refrigerator 1 may store the user's name, account information, and authentication information for registering the refrigerator 1 to the service server 3a.

Then, the refrigerator 1 collects the user's address to be registered to the service server 3a (1040).

The refrigerator 1 may display a user address collection screen 2030 on the touchscreen display 120 to collect the user's address from the user. For example, the refrigerator 1 may display the user address collection screen 2030 illustrated in FIG. 10.

The user address collection screen 2030 may include an address collection area 2031 configured to collect the user's address, an administrative district collection area 2032 configured to collect information on a city, an administrative district, and a country where the user lives in, a contact information collection area 2033 configured to collect contact information (e.g., a phone number or a cellphone number) of the user, and a user address registration button 2034 configured to register the user's address, administrative district, and contact information.

The user may input the user's address, an administrative district where the user lives in, and contact information of the user to the user address collection screen 2030 to register the refrigerator 1 to the service server 3a. Then, when the user touches the user address registration button 2034, the refrigerator 1 may store the user's address, administrative district, and contact information to register the refrigerator 1 to the service server 3a.

The user's address and administrative district may be used as a delivery address for receiving items bought through the online shopping application.

Then, the refrigerator 1 receives selection on stores for shopping from the user (1050).

The refrigerator 1 may display a store selection screen 2040 on the touchscreen display 120 to receive selection on stores from the user. For example, the refrigerator 1 may display the store selection screen 2040 illustrated in FIG. 11.

The store selection screen 2040 may include a first store selection area 2041 for selecting a first store (STORE #1), a second store selection area 2042 for selecting a second store (STORE #2), and a store registration button 2043 configured to register stores (STORE #1 and STORE #2) selected by the user.

The user may select one or more of the first store (STORE #1) and the second store (STORE #2) through the store selection screen 2040 to register the refrigerator 1 to the service server 3a. Then, when the user touches the store registration button 2043, the refrigerator 1 may store a list of stores for the user's shopping.

Then, the refrigerator 1 transmits account registration information of the user to the service server 3a (1060).

The refrigerator 1 may transmit account registration information of the user to the service server 3a via the communicator 140. The account registration information of the user may include, for example, the user's name, the user's account information, the user's authentication information, the user's address, an administrative district where the user lives in, the user's contact information, and information on stores selected by the user.

The service server 3a stores account registration information of the user in response to receiving the account registration information of the user (1070). The service server 3a transmits a response signal to the refrigerator 1 (1075).

The service server 3a may store the account registration information of the user to a storage medium of the service server 3a and transmit a response signal to the refrigerator 1 after storing the account registration information of the user.

The refrigerator 1 requests to login to the service server 3a (1080).

To login to the service server 3a after the refrigerator 1 is registered to the service server 3a, the refrigerator 1 may display the login screen 2010 on the touchscreen display 120, and the refrigerator 1 may acquire login information from the user.

For example, the refrigerator 1 may display the login screen 2010 illustrated in FIG. 8, and the user may touch the login area 2013. Then, the user may input login information for connection to the service server 3a to the touchscreen display 120 of the refrigerator 1.

The refrigerator 1 may transmit login information input by the user as well as the request for logging into the service server 3a to the service server 3a.

The service server 3a transmits a response signal to the refrigerator 1 in response to the login request from the refrigerator 1 (1085).

The service server 3a may compare pre-stored account registration information of the user with login information received from the refrigerator 1.

When the account registration information of the user matches the login information, the service server 3a may transmit a response signal that allows the refrigerator 1 to be logged in to the service server 3a to the refrigerator 1. When the account registration information of the user does not match the login information, the service server 3a may transmit a response signal that does not allow the refrigerator 1 to be logged in to the service server 3a to the refrigerator 1.

When logging in to the service sever 3a is allowed, the refrigerator 1 provides an online shopping service (1090).

The refrigerator 1 may display a main shopping screen 2050 configured to provide an online shopping service on the touchscreen display 120. For example, the refrigerator 1 may display the main shopping screen 2050 illustrated in FIG. 12.

The main shopping screen 2050 may include a title area 2051 configured to indicate an online shopping application, an item search area 2052 configured to search for an item, store area 2053 and 2054 configured to display the stores (STORE #1 and STORE #2) selected by the user, and a support information area 2065 configured to display various types of information for supporting online shopping by the user.

A search keyword for searching for items may be input to the item search area 2052 by the user. For example, name of items, category of items, or a word related to items may be input as a search keyword to the item search area 2052. When a search keyword is input to the item search area 2052, the refrigerator 1 may transmit the input search keyword to the service server 3*a* (or the shopping mall server 3*b*), receive information on items related to the search keyword from the service server 3*a* (or the shopping mall server 3*b*), and display the received items information.

The stores (STORE #1 and STORE #2) selected by the user may be displayed on the store areas 2053 and 2054 through the store selection screen 2040. For example, the first store (STORE #1) may be displayed on the first store area 2053, and the second store (STORE #2) may be displayed on the second store area 2054.

Also, when attempting to search for items from each of the stores (STORE #1 and STORE #2), the user may touch store selection buttons 2053*a* and 2054*b* for searching for items in the stores (STORE #1 and STORE #2). For example, the refrigerator 1 may display items sold by the first store (STORE #1) when a first store selection button 2053*a* is touched, and display items sold by the second store (STORE #2) when a second store selection button 2054*b* is touched.

The support information area 2055 may display diverse information for providing convenience to the user. For example, the support information area 2065 may display information on items recently bought by the user, information on items in cart, and discount information of items provided by the stores (STORE #1 and STORE #2). Also, the support information area 2055 may not display any information when the refrigerator 1 is logged into the service server 3*a* for the first time.

As described above, the refrigerator 1 may transmit account registration information of the user to the service server 3*a* to be registered to the service server 3*a*, and the account registration information may include a store that will be visited by the user.

Figure 13:
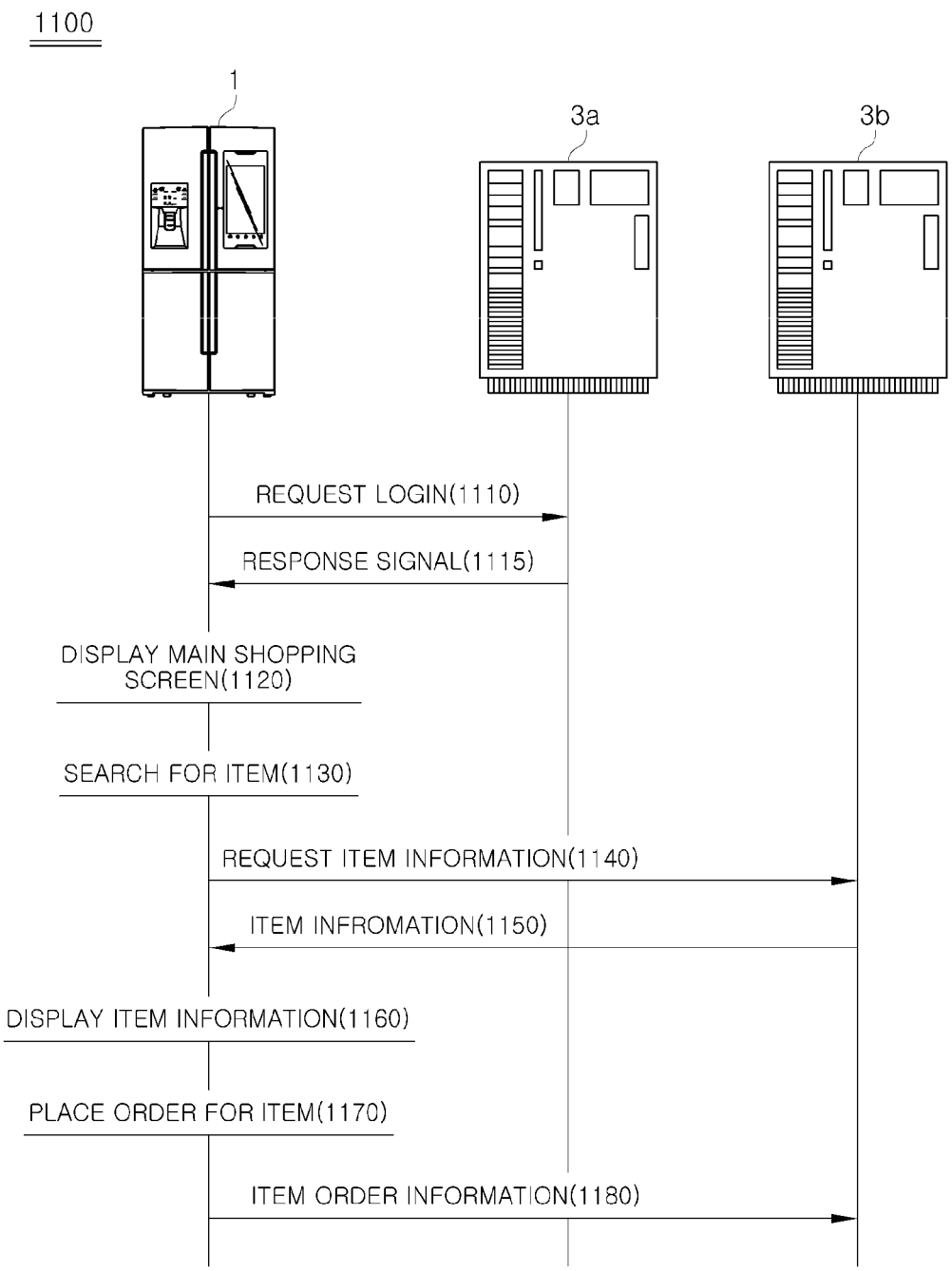
FIG. 13 illustrates a method of providing a shopping service by the refrigerator according to an embodiment
Figure 14:
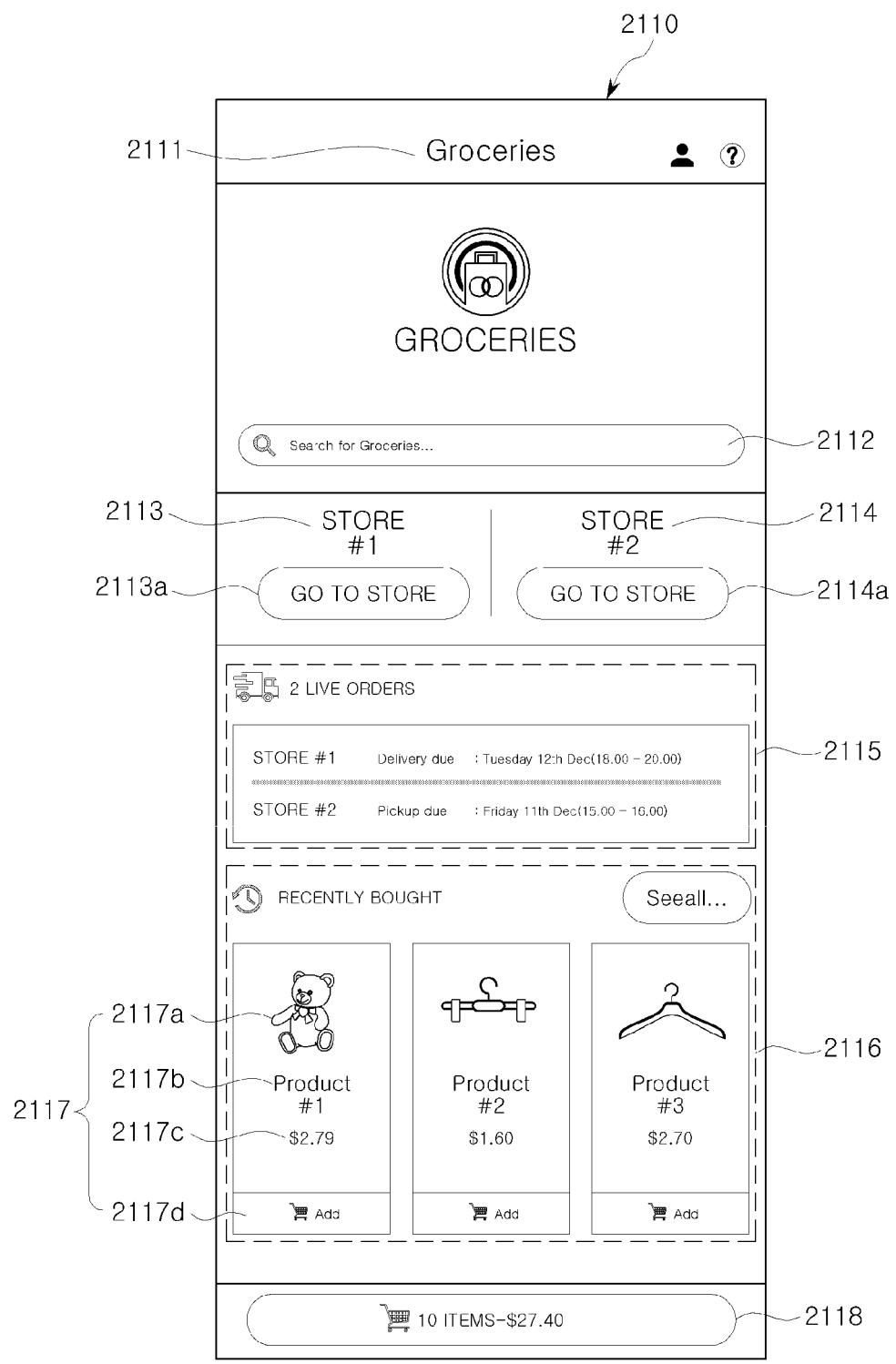
FIG. 14 illustrates an example of a main shopping screen displayed by the refrigerator according to an embodiment
Figure 15:
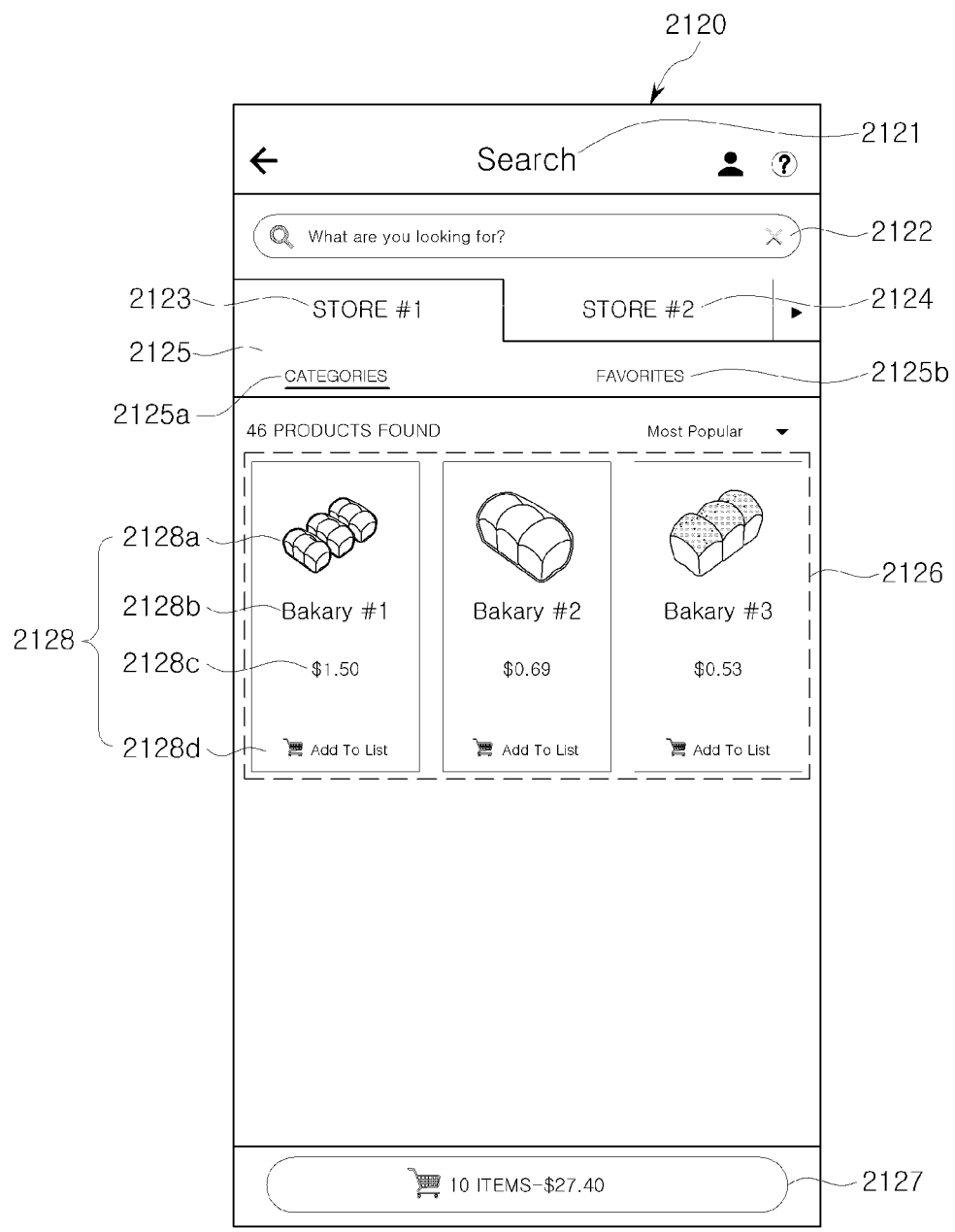
FIGS. 15 and 16 illustrate an example of an item information screen displayed by the refrigerator according to an embodiment.
Figure 16:
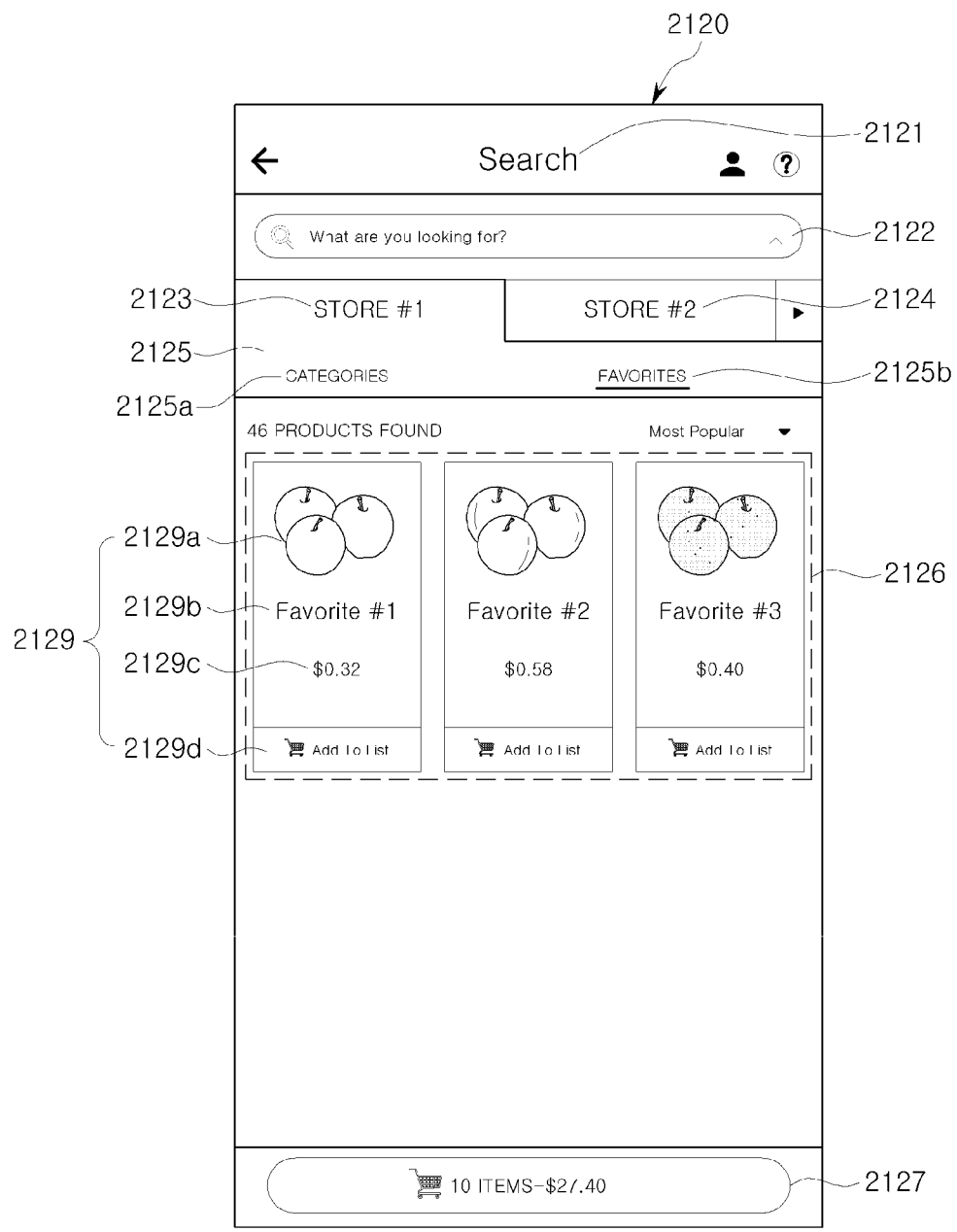
Figure 17:
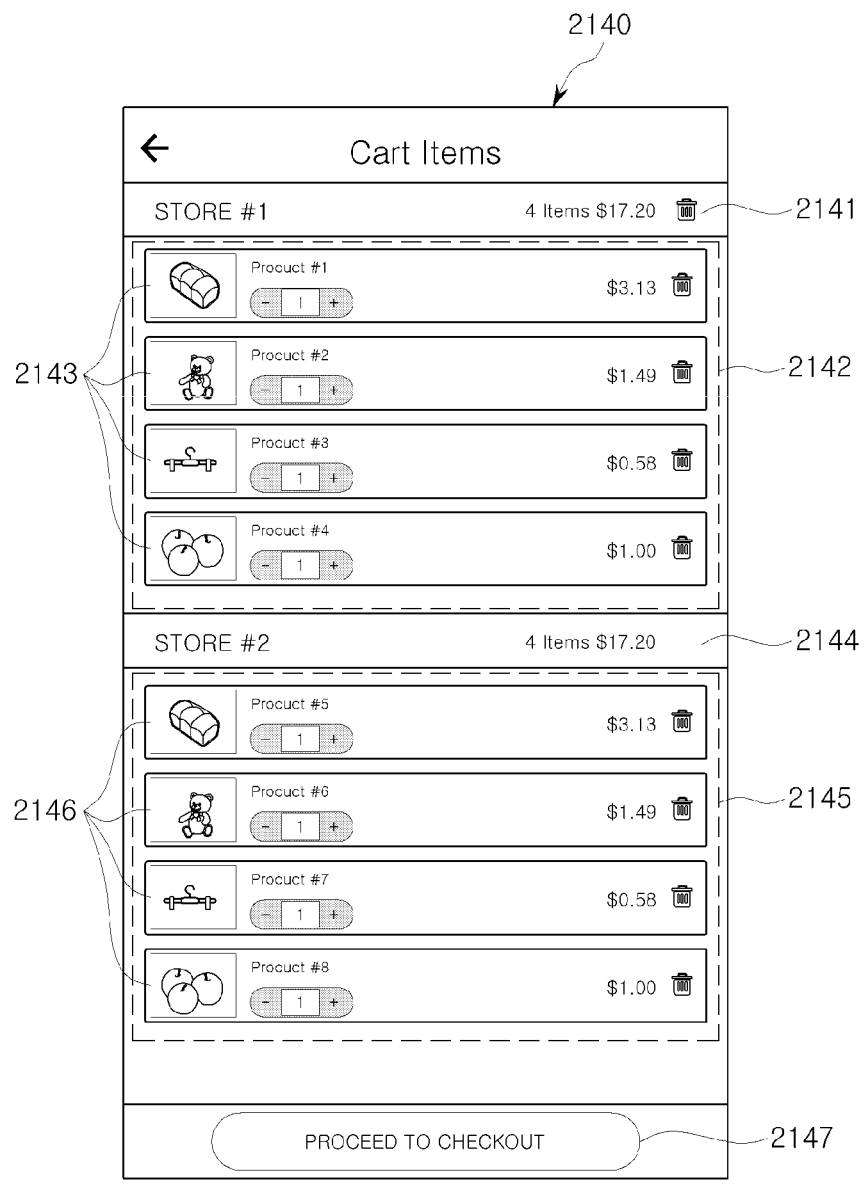
FIG. 17 illustrates an example of a list of items in cart displayed by the refrigerator according to an embodiment.
Figure 18:
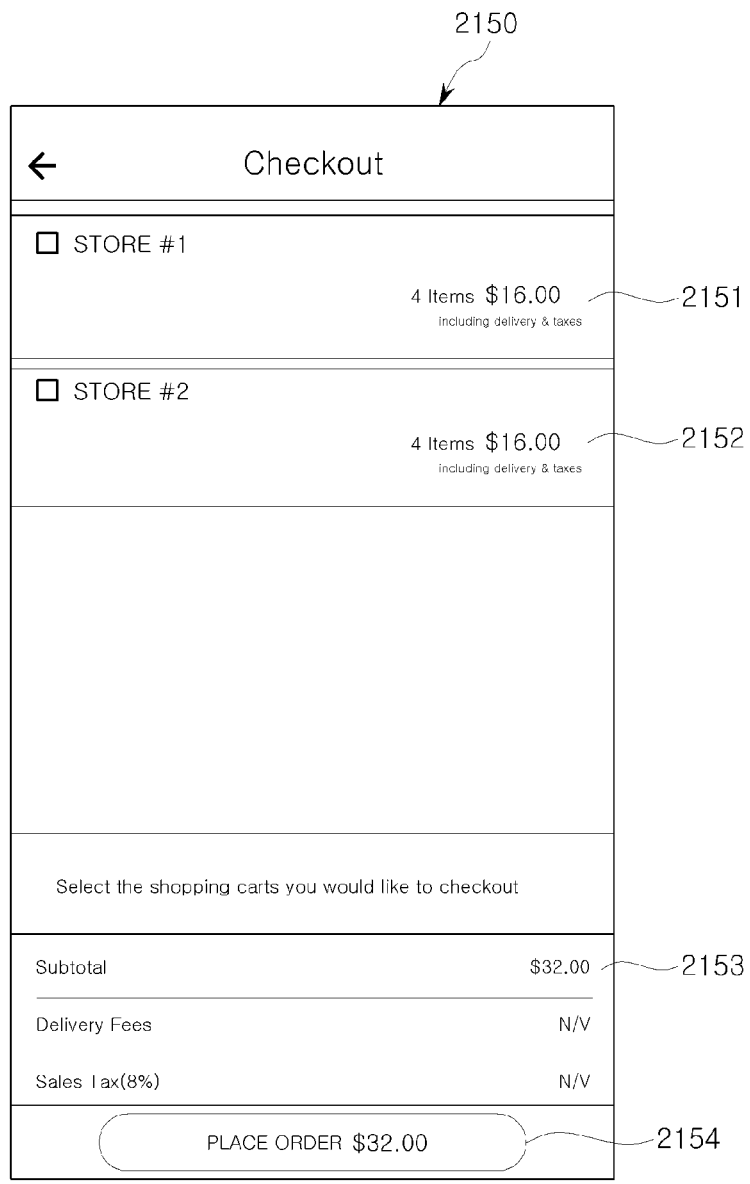
FIG. 18 illustrates an example of a checkout screen displayed by the refrigerator according to an embodiment.

FIG. 13 illustrates a method of providing a shopping service by the refrigerator according to an embodiment. FIG. 14 illustrates an example of a main shopping screen displayed by the refrigerator according to an embodiment. FIGS. 15 and 16 illustrate an example of an item information screen displayed by the refrigerator according to an embodiment. FIG. 17 illustrates an example of a list of items in cart displayed by the refrigerator according to an embodiment. Also, FIG. 18 illustrates an example of a checkout screen displayed by the refrigerator according to an embodiment.

A shopping service provision method 1100 of the refrigerator 1 will be described with reference to FIGS. 13, 14, 15, 16, 17 and 18.

The refrigerator 1 requests to login to the service server 3*a* (1110).

The refrigerator 1 may run an online shopping application for online shopping according to a touch input of the user and request connection to the service server 3*a* via the communicator 140. Also, the refrigerator 1 may display a login screen on the touchscreen display 120.

The refrigerator 1 may acquire login information from the user. For example, the user may input login information to the touchscreen display 120 to connect the refrigerator 1 to the service server 3*a*.

The refrigerator 1 may transmit the login information input by the user as well as the request for logging in to the service server 3*a* to the service server 3*a*.

The service server 3*a* transmits a response signal to the refrigerator 1 in response to the login request from the refrigerator (1115).

The service server 3*a* may allow the refrigerator 1 to be logged in to the service server 3*a* depending on whether the account registration information of the user matches the login information received from the refrigerator 1.

When the login is allowed, the refrigerator 1 displays a main shopping screen 2110 (1120).

The refrigerator 1 may display the main shopping screen 2110 configured to provide an online shopping service on the touchscreen display 120. For example, the refrigerator 1 may display the main shopping screen 2110 illustrated in FIG. 14.

The main shopping screen 2110 may include a title area 2111 configured to indicate the online shopping application, an item search area 2112 configured to search for an item, store areas 2113 and 2114 configured to display the stores (STORE #1 and STORE #2) selected by the user, a delivery information area 2115 configured to display delivery information of a bought item, a recently bought item area 2116 configured to display a recently bought item, and a cart button 2118 configured to buy items in cart.

The title area 2111, the item search area 2112, and the store areas 2113 and 2114 may be identical to the title area 2051, the item search area 2052, and the store areas 2053 and 2054 illustrated in FIG. 12.

The delivery information area 2115 may display delivery information of items bought by the user through the online shopping application. For example, the delivery information area 2115 may display a delivery deadline, a shipping status, expected delivery date and time, and the like of an item bought by the user. The user may easily check delivery information of an item bought by himself of herself through the delivery information area 2115.

The recently bought item area 2116 may display item information 2117 of items recently bought by the user through the online shopping application. For example, an item image 2117*a*, an item name 2117*b*, an item price 2117*c*, and a repurchase button 2117*d* for repurchasing an item may be displayed in the recently bought item area 2116. The user may easily repurchase an item that has been recently bought through the repurchase button 2117*d* in the recently bought item area 2116.

Information on items in cart that the user plans to purchase through the online shopping application may be displayed on the cart button 2118. For example, the number of items in cart and the total price of the items in cart may be displayed on the cart button 2118.

Items in the cart may be items selected by the user to be bought but not paid for by the user yet. The cart may include a list of items to be bought.

The refrigerator 1 searches for an item according to user input (1130).

The refrigerator 1 may receive user input for item search from the user.

For example, the user may input a search keyword for item search to the item search area 2112 of the main shopping screen 2110. The refrigerator 1 may display item information of items related to the search keyword in response to the keyword input to the item search area 2112.

In another example, the user may touch store selection buttons 2113*a* and 2114*a* in the store areas 2113 and 2114 in the main shopping screen 2110 for item search. In response to the user touching the store selection buttons 2113*a* and 2114*a* in the store areas 2113 and 2114, the refrigerator 1 may display item information of items sold by each of the stores (STORE #1 and STORE #2).

In response to the user input for item search, the refrigerator 1 requests item information from the shopping mall server 3b (1140).

The refrigerator 1 may transmit the item information request as well as information related to the item information request to the shopping mall server 3b via the communicator 140. For example, when the user inputs a search keyword to the item search area 2112, the refrigerator 1 may request item information of items related to the search keyword input by the user from the shopping mall server 3b. Also, when the user touches the store selection buttons 2113a and 2114a, the refrigerator 1 may request item information of items being sold by the selected stores (STORE #1 and STORE #2) from the shopping mall server 3b.

The item information request from the refrigerator 1 may be directly transmitted to the shopping mall server 3b or transmitted to the shopping mall server 3b via the service server 3a.

In response to the item information request from the refrigerator 1, the shopping mall server 3b transmits item information to the refrigerator 1 (1150).

The shopping mall server 3b may transmit, for example, item information of items related to a search keyword input by the user or item information of items being sold by the stores (STORE #1 and STORE #2). The item information may include, for example, an item image, an item name, an item price, item inventory, an item description, and the like.

The refrigerator 1 may receive item information from the shopping mall server 3b via the communicator 140. The refrigerator 1 may directly receive item information from the shopping mall server 3b or receive item information from the shopping mall server 3b via the service server 3a.

In response to receiving the item information, the refrigerator 1 displays the item information (1160).

The refrigerator 1 may display a list of item information sets received from the shopping mall server 3b on the touchscreen display 120. For example, the refrigerator 1 may display an item information screen 2120 as illustrated in FIG. 15 or 16.

The refrigerator 1 may display item information of items for each category of items according to selection by the user or display item information of items favored by the user.

The item information screen 2120 may include a title area 2121 configured to indicate item search, an item search area 2122 configured to additionally search for an item, store selection areas 2123 and 2124 configured to select the stores (STORE #1 and STORE #2), a display change area 2125 configured to change an item display method (displaying according to categories or according to user favorites), an item information area 2126 configured to display item information, and a cart button 2127 configured to display a list of items in cart.

The store selection areas 2123 and 2124 may include a first store selection area 2123 configured to select the first store (STORE #1) and a second store selection area 2124 configured to select the second store (STORE #2). Item information of the first store (STORE #1) may be displayed in the item information area 2126 in response to the user selecting the first store (STORE #1), and item information of the second store (STORE #2) may be displayed in the item information area 2126 in response to the user selecting the second store (STORE #2).

The display change area 2125 may include a category selection button 2125a configured to display items according to categories of items and a favorite item selection button 2125b configured to display items according to user favorites.

In response to touching the category selection button 2125a, item information 2128 of items that belong to a category selected by the user may be displayed in the item information area 2126 as illustrated in FIG. 15. For example, when the user selects bread, information of bread items may be displayed in the item information area 2126.

Also, in response to touching the favorite item selection button 2125b, item information 2129 of favorite items preset by the user may be displayed in the item information area 2126 as illustrated in FIG. 16.

For example, item images 2128a and 2129a, item names 2128b and 2129b, item prices 2128c and 2129c, and add-to-cart buttons 2128d and 2129d for item purchase may be displayed in the item information area 2126.

An item may be added to a cart when the add-to-cart buttons 2128d and 2129d are touched. Items in the cart are items selected by the user to be bought but not paid for by the user yet. The cart may contain a list of items to be bought. The user may check items in the cart through a cart screen 2140 that will be described below.

Information on items in cart that the user plans to purchase through the online shopping application may be displayed on the cart button 2127. For example, the number of items in cart and the total price of the items in cart may be displayed on the cart button 2127. When the cart button 2127 is touched, the refrigerator 1 may display a list of items added to the cart by the add-to-cart buttons 2128d and 2129d.

The user may check item information of items, select desired items, and add the desired items to cart.

When an item to be bought is selected by the user, the refrigerator 1 places an order for the selected item (1170).

The user may check an item to be bought and pay for the item to place an order for the item. Also, the refrigerator 1 may display a list of items in cart added to the cart by the user and display a screen for paying for the item.

For example, the refrigerator 1 may display the cart screen 2140 as illustrated in FIG. 17. The cart screen 2140 may display pieces of purchase information 2143 and 2146 of items in cart from each of the stores (STORE #1 and STORE #2).

The cart screen 2140 may include a first total purchase information area 2141 configured to display the number and the total price of items in cart from the first store (STORE #1), a first purchase information area 2142 configured to display the purchase information 2143 of the items in cart from the first store (STORE #1), a second total purchase information area 2144 configured to display the number and the total price of items in cart from the second store (STORE #2), and a second purchase information area 2145 configured to display the purchase information 2146 of the items in cart from the second store (STORE #2). Also, the cart screen 2140 may include a proceed-to-checkout button 2147 configured to pay for the items.

The user may check the pieces of purchase information 2143 and 2146 of items in cart through the cart screen 2140. Also, in some cases, the user may modify the number of items in cart or cancel the purchase through the cart screen 2140.

When items in cart are checked through the cart screen 2140, the user may touch the proceed-to-checkout button 2147.

Then, the refrigerator 1 may display a checkout screen 2150 for paying for the items on the touchscreen display 120.

The checkout screen 2150 may display a price to be paid for each of the stores (STORE #1 and STORE #2).

The checkout screen 2150 may display a purchase price 2151 to be paid to the first store (STORE #1), a purchase price 2152 to be paid to the second store (STORE #2), and a total purchase price 2153 to be paid to both of the stores (STORE #1 and STORE #2). Also, the checkout screen 2150 may include a place order button 2154 for making a payment.

The user may select checkout for the first store (STORE #1), select checkout for the second store (STORE #2), or select checkout for both of the stores (STORE #1 and STORE #2). In other words, the user may selectively pay the purchase price for the first store (STORE #1) or the purchase price for the second store (STORE #2) or pay the purchase prices for both of the first store (STORE #1) and the second store (STORE #2).

Then, the refrigerator 1 transmits item order information to the service server 3a and/or the shopping mall server 3b (1180).

The refrigerator 1 may transmit the item order information to the service server 3a and/or the shopping mall server 3b via the communicator 140. The item order information may include information on an item decided to be bought through the cart screen 2140 and information on a final price to be paid through the checkout screen 2150.

In response to the order information from the refrigerator 1, the service server 3a may finish checking out, and the stores (STORE #1 and STORE #2) in the shopping mall server 3b may deliver items to the user.

As described above, the user may buy items from a plurality of stores (STORE #1 and STORE #2) through the refrigerator 1. Particularly, with respect to paying for items, the user may separately pay for items from each of the stores (STORE #1 and STORE #2) or simultaneously pay for items from both of the stores (STORE #1 and STORE #2).

The refrigerator 1 may communicate with user devices and may be linked to the user devices to provide an online shopping service thereto.

Also, the user devices may independently provide users with an online shopping service.

Hereinafter, configuration and operation of user devices will be described.

Figure 19:
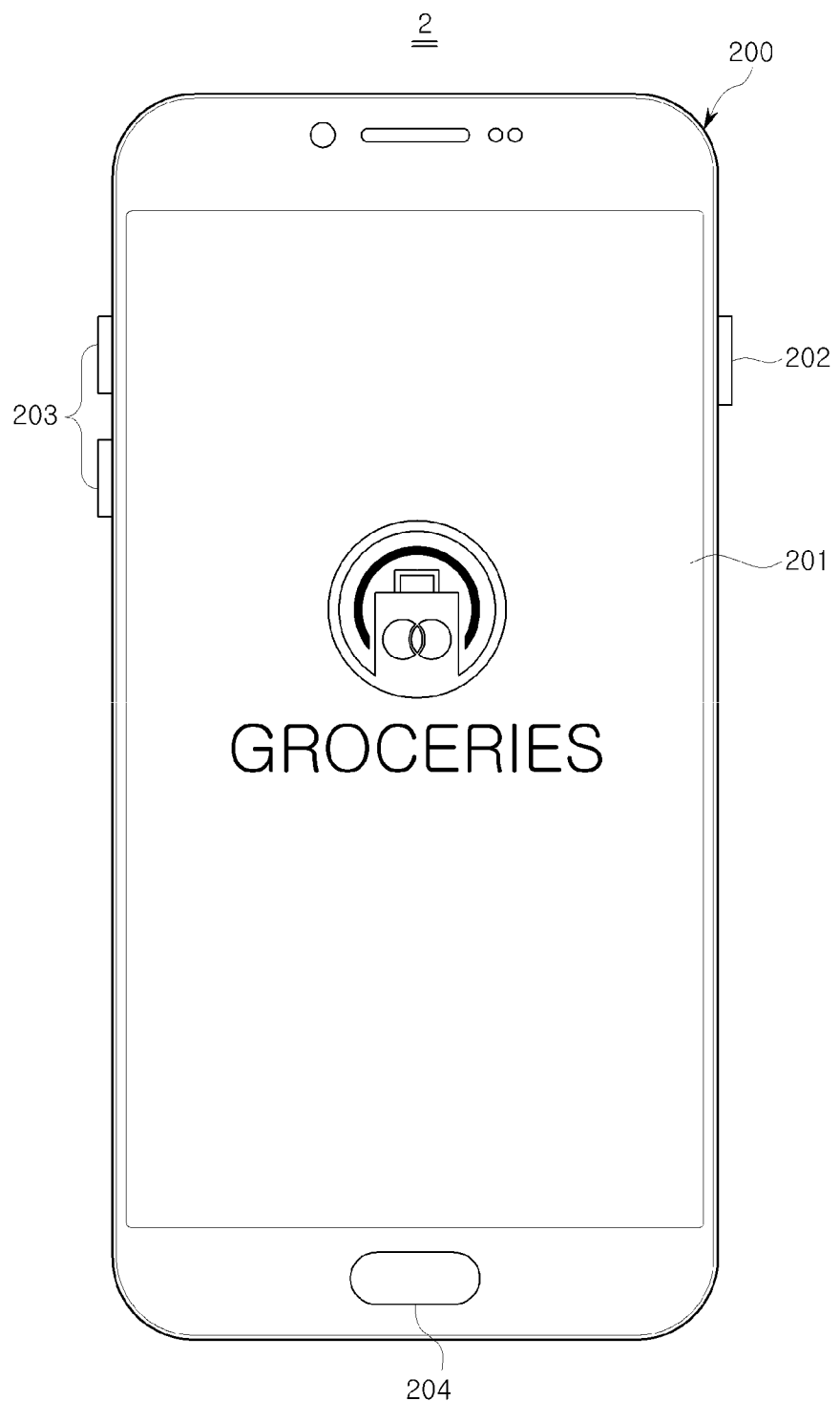
FIG. 19 illustrates an exterior of a user device according to an embodiment.
Figure 20:
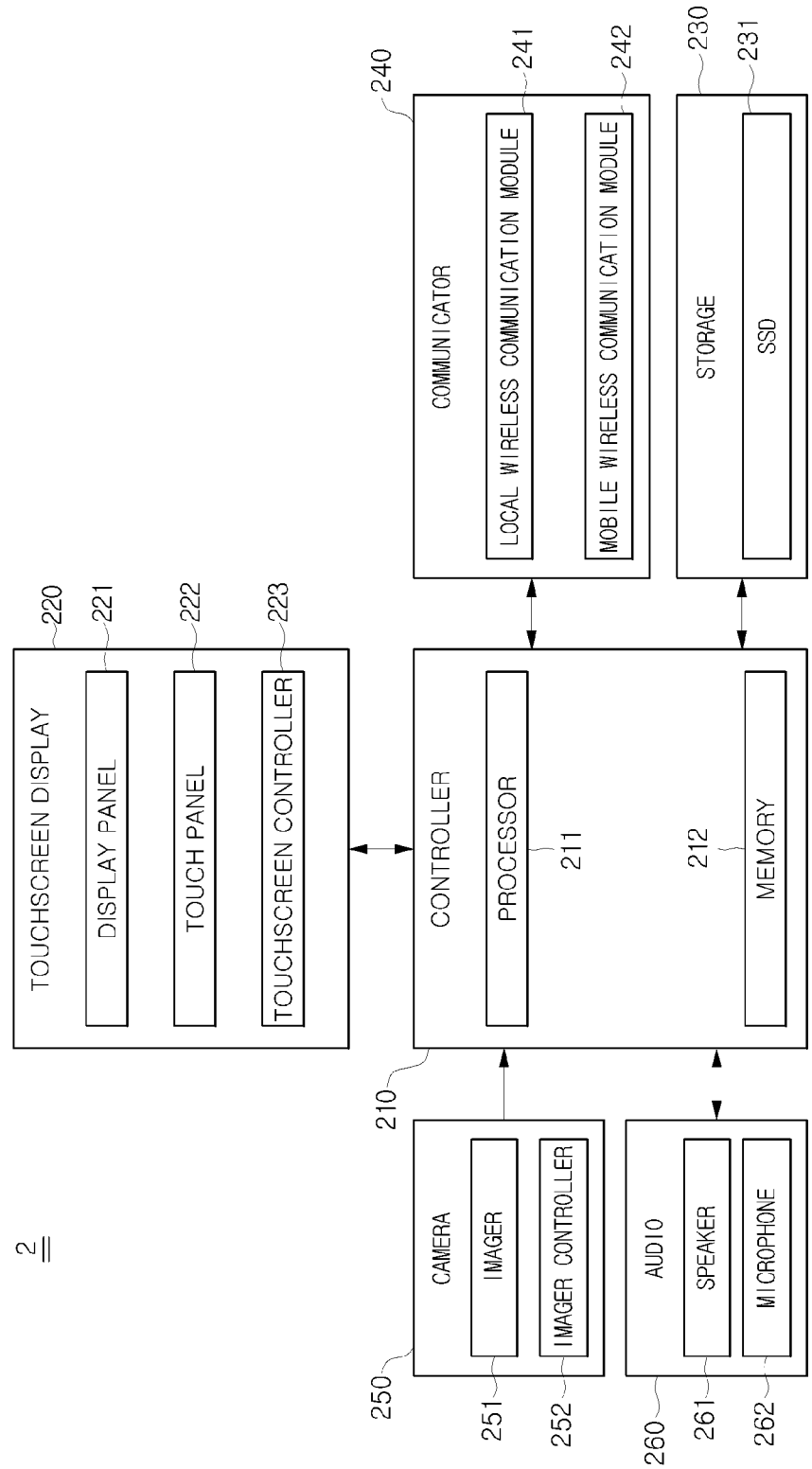
FIG. 20 illustrates configuration of the user device according to an embodiment.

FIG. 19 illustrates an exterior of a user device according to an embodiment. Also, FIG. 20 illustrates configuration of the user device according to an embodiment.

A user device 2 may include a main body 200 in the form of a box, a screen 201 provided at the front surface of the main body 200, and input buttons 202, 203, and 204 provided at the front surface or a side surface of the main body 200.

The main body 200 may form an exterior of the user device 2 and may protect various types of configurations included in the user device 2 that will be described below.

The screen 201 may receive user input and display an image according to the user input.

The input buttons 202, 203, and 204 may receive a predetermined command from a user. For example, the input buttons 202, 203, and 204 may include a power button 202 configured to turn power of the user device 2 on or off, a volume control button 203 configured to control volume of sound output by the user device 2, and a home button 204 configured to change an image displayed on the screen 201 of the user device 2 to a home screen.

Also, the user device 2 may include a touchscreen display 220, a storage 230, a communicator 240, a camera 250, an audio 260, and a controller 210.

The touchscreen display 220 may form the screen 201 of the main body 200 and may include a display panel 221 configured to display an image, a touch panel 222 configured to receive a touch input, and a touchscreen controller 223 configured to drive or control the display panel 221 and the touch panel 222.

The display panel 221, the touch panel 222, and the touchscreen controller 223 may have different sizes and may be installed at different positions compared to the display panel 121, the touch panel 122, and the touchscreen controller 123 described with reference to FIGS. 3 and 4, but may have the same functions.

The storage 230 may include a nonvolatile memory configured to store a program or power supply and in which loss of the program or data stored therein does not occur even when power is cut off. For example, the storage 230 may include a high-capacity flash memory, an SSD 231, or the like.

The storage 230 may have a control program and control data for controlling operation of the user device 2 and various application programs and application data for performing various functions according to user input, stored therein. For example, the storage 230 may have an OS program, an image display application, a video play application, a scheduler application, a memo application, an online shopping application, and the like, stored therein.

The communicator 240 may transmit and receive data to and from an external device according to communication control by the controller 210. For example, the communicator 240 may include a local wireless communication module 241 and a mobile wireless communication module 242 configured to wirelessly transmit and receive communication data to and from an external device.

The local wireless communication module 241 may wirelessly transmit and receive data to and from an external device located relatively near the local wireless communication module 241. The local wireless communication module 241 may communicate with an external device by communication standards such as Wi-Fi, a Bluetooth module, and a ZigBee module.

The mobile wireless communication module 242 may wirelessly transmit and receive data to and from a base station, connect to the WAN via the base station, or communicate with an external device via the base station. The mobile wireless communication module 242 may communicate with an external device using communication standards such as time division multiple access (TDMA), code division multiple access (CDMA), wide code division multiple access (WCDMA), CDMA2000, wireless broadband (Wibro), world interoperability for microwave access (WiMAX), long term evolution (LTE), and/or Wibro evolution.

Each of the local wireless communication module 241 and the mobile wireless communication module 242 may include an antenna configured to transmit a wireless signal into free space or receive a wireless signal from the free space, a modulator configured to modulate data that will be transmitted, a demodulator configured to demodulate a received wireless signal, and the like.

The camera 250 may include an imager 251 configured to capture an image and convert the captured image into an electrical signal and an imager controller 252 configured to process the electrical signal output by the imager 251 to generate image data.

The imager 251 may include a plurality of optical diodes configured to convert an optical signal to an electrical signal, and the plurality of optical diodes may be arranged in two-dimension. The imager 251 may include a charge-coupled device (CCD) image sensor or a complementary metal-oxide-semiconductor (CMOS) image sensor, in which a plurality of optical diodes are arranged in two-dimension.

The imager controller 252 may control operation of the imager 251 and generate image data from an electrical signal output by the imager 251. Also, the imager controller 252 may output the image data to the controller 210.

In this way, the camera 250 may acquire an image of a captured object and output the acquired image to the controller 210.

The audio 260 may include a speaker 261 configured to convert an electrical signal received from the controller 210 into a sound signal and output the converted sound signal and a microphone 262 configured to convert a sound signal into an electrical signal and output the converted electrical signal to the controller 210.

The controller 210 may include a memory 212 configured to store a program and data for controlling operation of the user device 2 and a processor 211 configured to generate a control signal for controlling operation of the refrigerator 1 according to the program and data stored in the memory 212.

The memory 212 may temporarily store a user's touch input data input through the touchscreen display 220, stored data stored in the storage 230, communication data received through the communicator 240 and/or image data acquired through the camera 250.

The memory 212 may include a volatile memory, such as an S-RAM a D-RAM, configured to temporarily store data and a non-volatile memory, such as a ROM, an EPROM, and an EEPROM, configured to store data for a long period.

The processor 211 may include various types of logic circuits and operational circuits, process data according to a program provided from the memory 212, and generate a control signal according to a result of processing.

The processor 211 and the memory 212 may be implemented with separate chips or with a single chip.

In this way, the controller 210 may control operation of the user device 2 according to user input received through the touchscreen display 220 and/or a program and data stored in the storage 230.

Operation of the user device 2 that will be described below may be seen as being controlled by the controller 210.

The touchscreen display 220, the storage 230, the communicator 240, the camera 250, the audio 260, and the controller 210 included in the user device 2 have been described. However, other elements may be added or some of the elements may be omitted as needed.

Hereinafter, operation of the user device 2 will be described.

Figure 21:
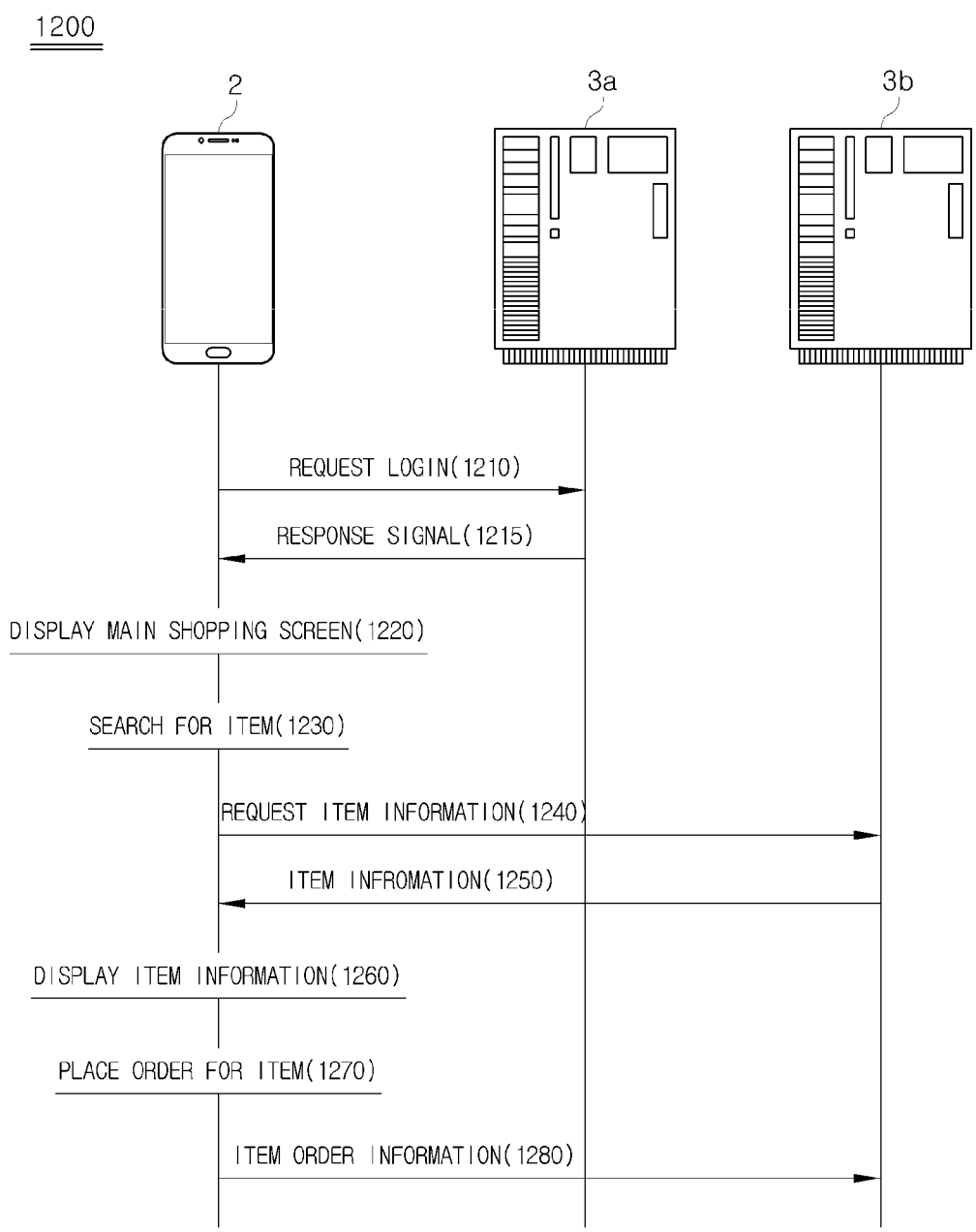
FIG. 21 illustrates a method of providing a shopping service by a user device according to an embodiment.
Figure 22:
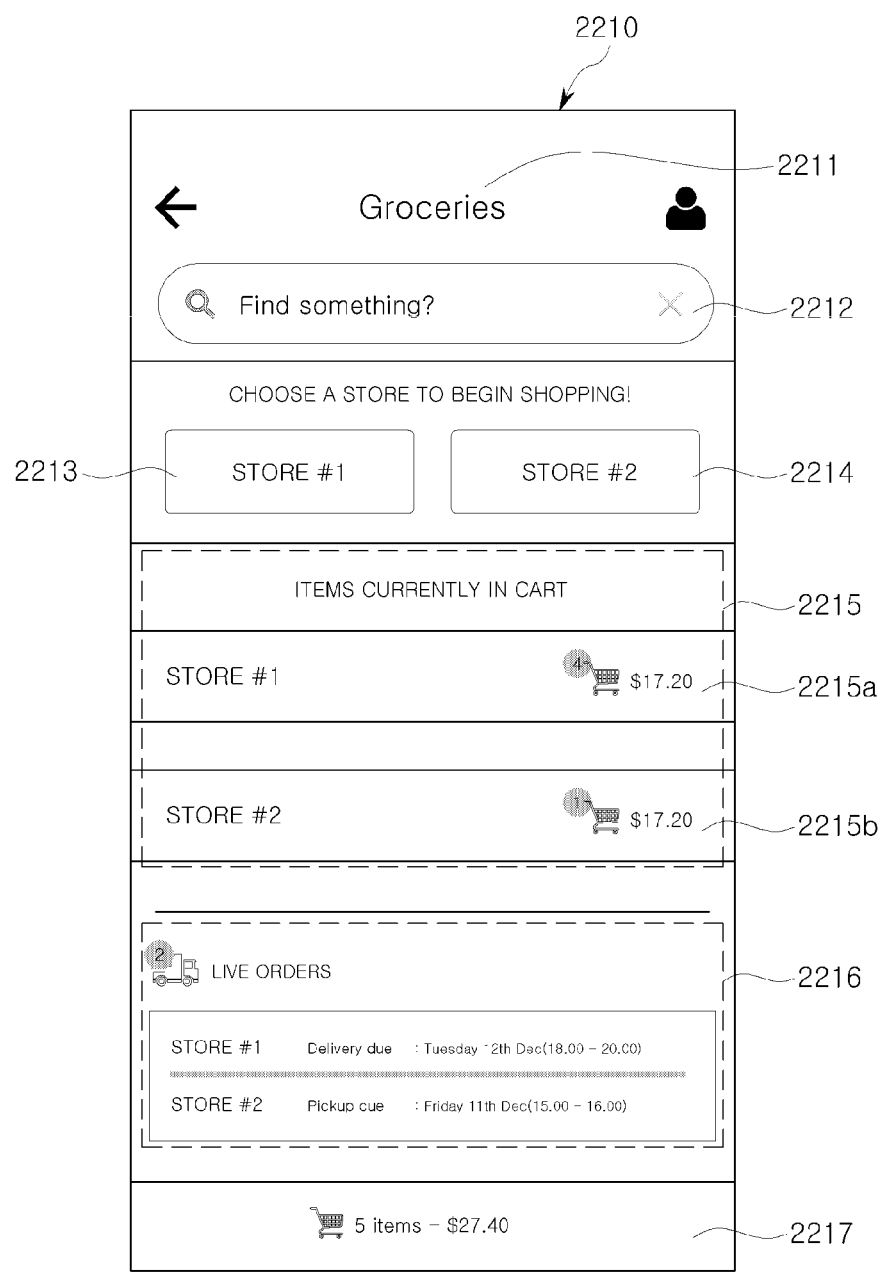
FIG. 22 illustrates an example of a main shopping screen displayed by the user device according to an embodiment.
Figure 23:
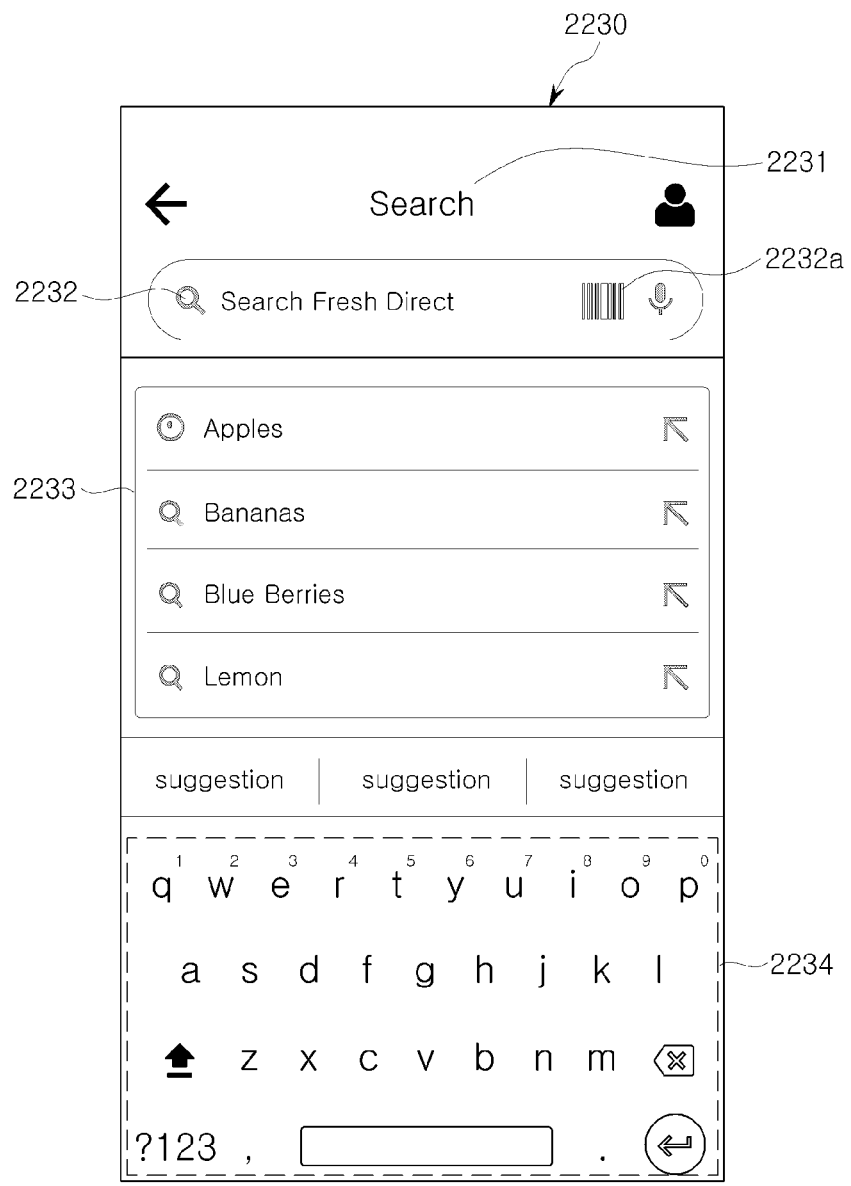
FIGS. 23 and 24 illustrate an example of an item search screen displayed by the user device according to an embodiment.
Figure 24:
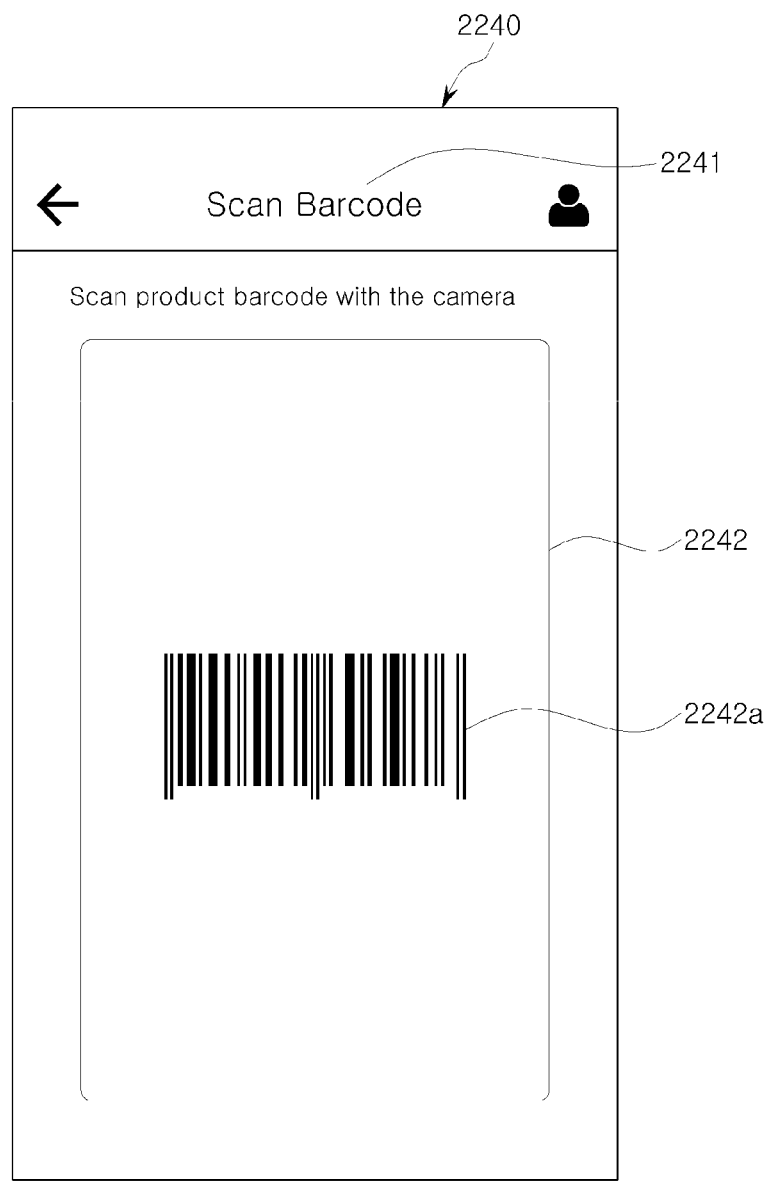
Figure 25:
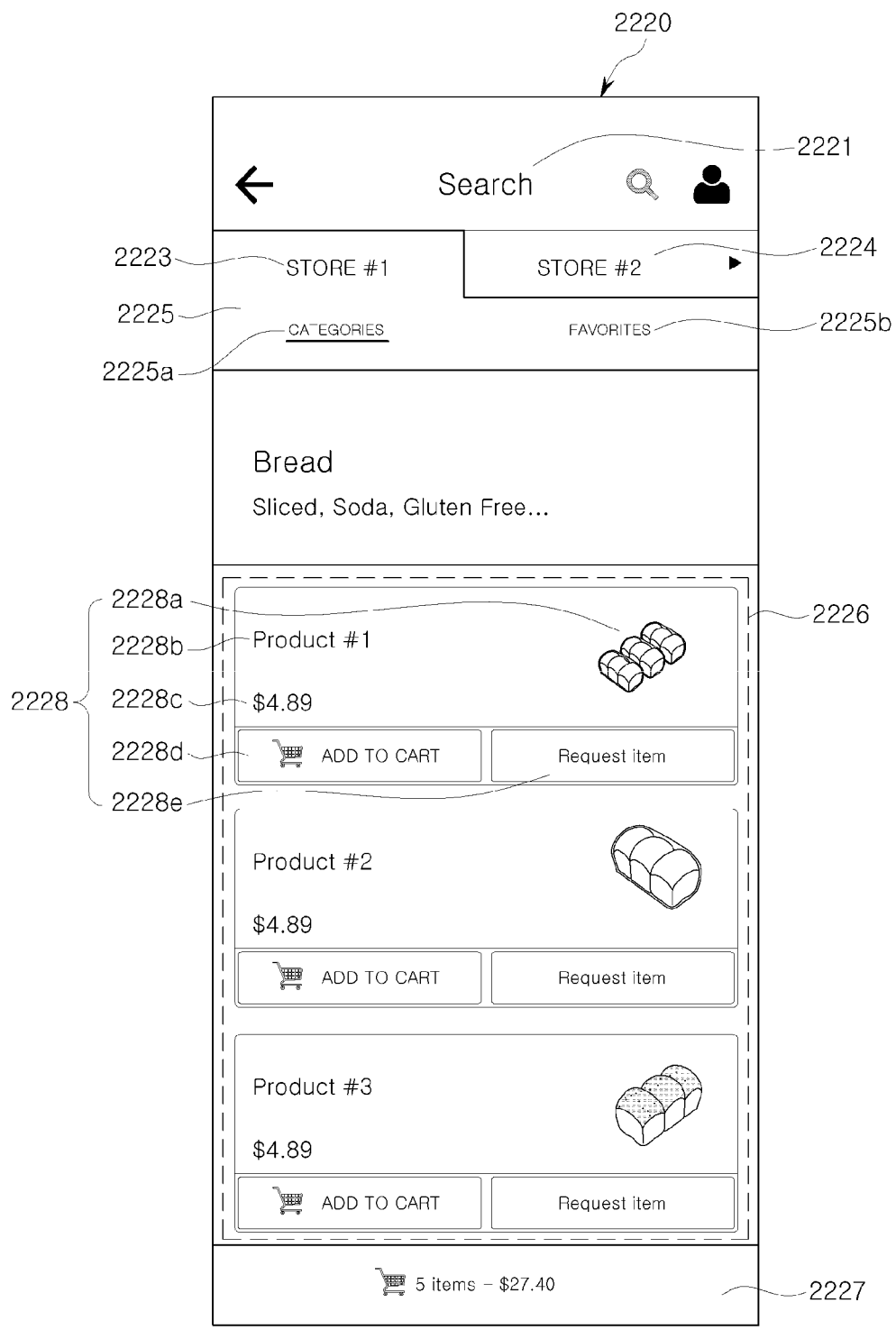
FIG. 25 illustrates an example of an item information screen displayed by the user device according to an embodiment.

FIG. 21 illustrates a method of providing a shopping service by a user device according to an embodiment. FIG. 22 illustrates an example of a main shopping screen displayed by the user device according to an embodiment. FIGS. 23 and 24 illustrate an example of an item search screen displayed by the user device according to an embodiment. Also, FIG. 25 illustrates an example of an item information screen displayed by the user device according to an embodiment.

A shopping service provision method 1200 of the user device 2 will be described with reference to FIGS. 21, 22, 23, 23 and 25.

The user device 2 requests to login to the service server (1210).

The user device 2 may run an online shopping application for online shopping according to a touch input of the user and request connection to the service server 3a via the communicator 240. Also, the user device 2 may acquire login information from the user and transmit the login information to the service server 3a.

The service server 3a transmits a response signal to the user device 2 in response to the login request from the user device 2 (1215).

The service server 3a may allow the user device 2 to be logged in to the service server 3a depending on whether the pre-stored account registration information of the user matches the login information received from the user device 2.

When the login is allowed, the user device 2 displays a main shopping screen 2210 (1220).

The user device 2 may display the main shopping screen 2210 configured to provide an online shopping service on the touchscreen display 220. For example, the user device 2 may display the main shopping screen 2210 as illustrated in FIG. 22.

The main shopping screen 2210 may include a title area 2211 configured to indicate the online shopping application, an item search area 2212 configured to searched for an item, store areas 2213 and 2214 configured to display the stores (STORE #1 and STORE #2) selected by the user, a cart item information area 2215 configured to display information on items in cart from each of the stores (STORE #1 and STORE #2) (e.g., the number and price of items in cart), a delivery information area 2216 configured to display delivery information of bought items, and a cart button 2217 configured to buy items in cart.

The title area 2211, the item search area 2212, the store areas 2213 and 2214, the delivery information area 2216, and the cart button 2217 may be identical to the title area 2111, the item search area 2112, the store areas 2113 and 2114, and the delivery information area 2115 illustrated in FIG. 14.

The items in cart information area 2215 may display information on items to be bought by the user through the online shopping application for each of the stores (STORE #1 and STORE #2). For example, the items in cart information area 2215 may display first store items in cart information 2215a that indicates the number and total price of items in cart from the first store (STORE #1) and second store items in cart information 2215b that indicates the number and total price of items in cart from the second store (STORE #2).

The user device 2 searches for an item according to user input (1230).

The user device 2 may receive user input for item search from the user.

For example, the user may input a search keyword for item search to the item search area 2212 of the main shopping screen 2210. The user device 2 may display an item search screen 2230 as illustrated in FIG. 23 on the touchscreen display 220 when the user touches the item search area 2212 in the main shopping screen 2210.

The item search screen 2230 may include a title area 2231 configured to indicate item search, a search keyword area 2232 configured to display an input search keyword, a search keyword auto-complete area 2233 configured to automatically complete an input search keyword, and a keypad 2234 configured to input a search keyword.

The search keyword area 2232 may display a search keyword input via the keypad 2234. Also, the search keyword auto-complete area 2233 may display an item name related to the search keyword displayed on the search keyword area 2232 so that the user can easily input a search keyword.

A barcode input button 2232a for searching for an item using a barcode may be displayed on the search keyword area 2232. When attempting to search for an item using a barcode marked on an exterior of the item or packaging of the item, the user may touch the barcode input button 2232a.

When the barcode input button 2232a is touched, the user device 2 may display a barcode input screen 2240 as illustrated in FIG. 24 on the touchscreen display 220.

The barcode input screen 2240 may include a title area 2241 configured to indicate barcode input and a barcode display area 2242 configured to display an image acquired through the camera 250.

The user may use the camera 250 of the user device 2 to capture a barcode displayed on an exterior or packaging of an item, and the user device 2 may display a barcode image 2242a captured by the camera 250 on the barcode display area 2242. Also, the user device 2 may extract item information such as a name, a manufacturer of an item from the barcode image 2242a.

In response to a search keyword input or a barcode input, the user device 2 may display item information of items related to the input search keyword or barcode.

In another example, the user may touch the store areas 2213 and 2214 in the main shopping screen 2210 for item search. In response to the user touching the store areas 2213 and 2214, the user device 2 may display item information of items being sold by each of the stores (STORE #1 and STORE #2).

In response to the user input for item search, the user device 2 requests item information from the shopping mall server 3b (1240).

The user device 2 may transmit the item information request as well as information related to the item information request to the shopping mall server 3b via the communicator 240.

The item information request from the user device 2 may be directly transmitted to the shopping mall server 3b or transmitted to the shopping mall server 3b via the service server 3a.

In response to the item information request from the user device 2, the shopping mall server 3b transmits item information to the user device 2 (1250).

The shopping mall server 3b may transmit, for example, item information of items related to a search keyword input by the user or item information of items sold by the stores (STORE #1 and STORE #2).

The user device 2 may directly receive item information from the shopping mall server 3b or receive item information from the shopping mall server 3b via the service server 3a.

In response to receiving item information, the user device 2 displays the item information (1260).

The user device 2 may display item information of items received from the shopping mall server 3b on the touchscreen display 220. For example, the user device 2 may display an item information screen 2220 as illustrated in FIG. 25.

The item information screen 2220 may include a title area 2221 configured to indicate an item search result, store selection areas 2223 and 2224 configured to select the stores (STORE #1 and STORE #2), a display change area 2225 configured to change an item display method (displaying according to categories or displaying according to user favorites), an item information area 2226 configured to display item information, and a cart button 2227 configured to display a list of items in cart.

The store selection areas 2223 and 2224, the display change area 2225, and the cart button 2227 may be identical to the store selection areas 2123 and 2124, the display change area 2125, and the cart button 2127 illustrated in FIGS. 15 and 16.

Item information 2228 of items may be displayed on the item information area 2226. For example, an item image 2228a, an item name 2228b, an item price 2228c, an add-to-cart button 2228d for item purchase, and a purchase request button 2228e for an item purchase request may be displayed in the item information area 2226.

An item may be added to a cart when the add-to-cart button 2228d is touched. Items in the cart are items selected by the user to be bought but not paid for by the user yet.

When the purchase request button 2228e is touched, a purchase request for a corresponding item may be transmitted to the refrigerator 1. The user may use the user device 2 to select an item and use the refrigerator 1 to place an order for the item. For example, a first user may use the user device 2 to select an item and request that the selected item be purchased, and a second user may place an order for the item that has been requested to be purchased by the first user using the refrigerator 1. In another example, the first user may use the user device 2 to select an item and order the selected item using the refrigerator 1. In this way, a user (e.g., a user of the user device) may request another user (e.g., a user of the refrigerator) to place an order for an item by requesting that the item be purchased, or the user (e.g., a user of the user device and the refrigerator) may select and place an order for an item using separate electronic devices (e.g., the user device and the refrigerator).

The request that the item be purchased will be described in more detail below.

The user may check item information of items, select a desired item, add the item to cart, or request that the item be purchased through the item information screen 2220.

When an item to be bought is selected by the user, the user device 2 places an order for the selected item (1270) and transmits order information of the item to the service server 3a and the shopping mall server 3b (1280). The service server 3a may finish checkout in response to the order information from the user device 2, and the stores (STORE #1 and/or STORE #2) in the shopping mall server 3b may deliver the item to the user.

Figure 26:
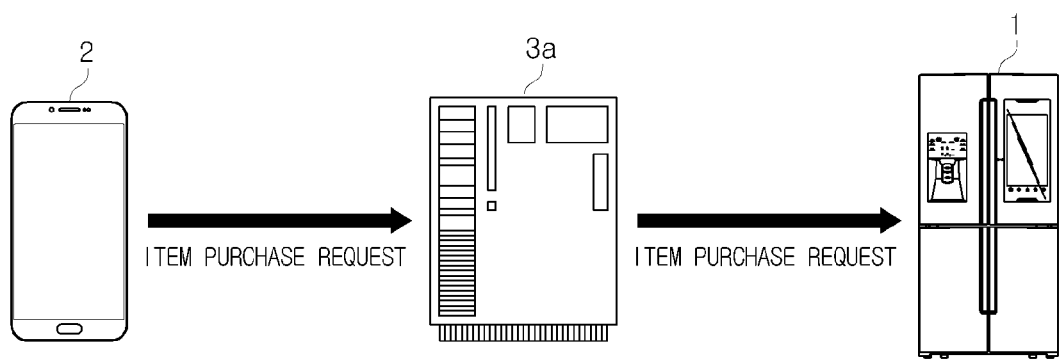
FIG. 26 briefly illustrates a purchase request from the user device to the refrigerator according to an embodiment.

FIG. 26 briefly illustrates a purchase request from the user device to the refrigerator according to an embodiment.

As briefly described above, the user device 2 may transmit a request that an item be purchased to the refrigerator 1. For example, the user may use the user device 2 to select an item and use the refrigerator 1 to place an order for the item.

The user device 2 may transmit a request that an item be purchased to the refrigerator 1 through the purchase request button 2228e in the item information area 2226 displayed on the item information screen 2220. The request from the user device 2 that an item be purchased may include, for example, information on an item that is requested to be purchased.

The request that an item be purchased may be transmitted from the user device 2 to the refrigerator 1 via the service server 3a as illustrated in FIG. 26.

In response to receiving the request from the user device 2 that an item be purchased, the refrigerator 1 may display the request from the user device 2 that an item be purchased on the touchscreen display 120. Also, the user may check the item purchase request from the user device 2 through the touchscreen display 120 of the refrigerator 1 and may place an order for the item that is requested to be purchased through the refrigerator 1.

Hereinafter, linkage between the user device 2 and the refrigerator 1 will be described in detail.

First, a method of connecting the user device 2 to the refrigerator 1 to enable linkage between the user device 2 and the refrigerator 1 will be described.

Figure 27:
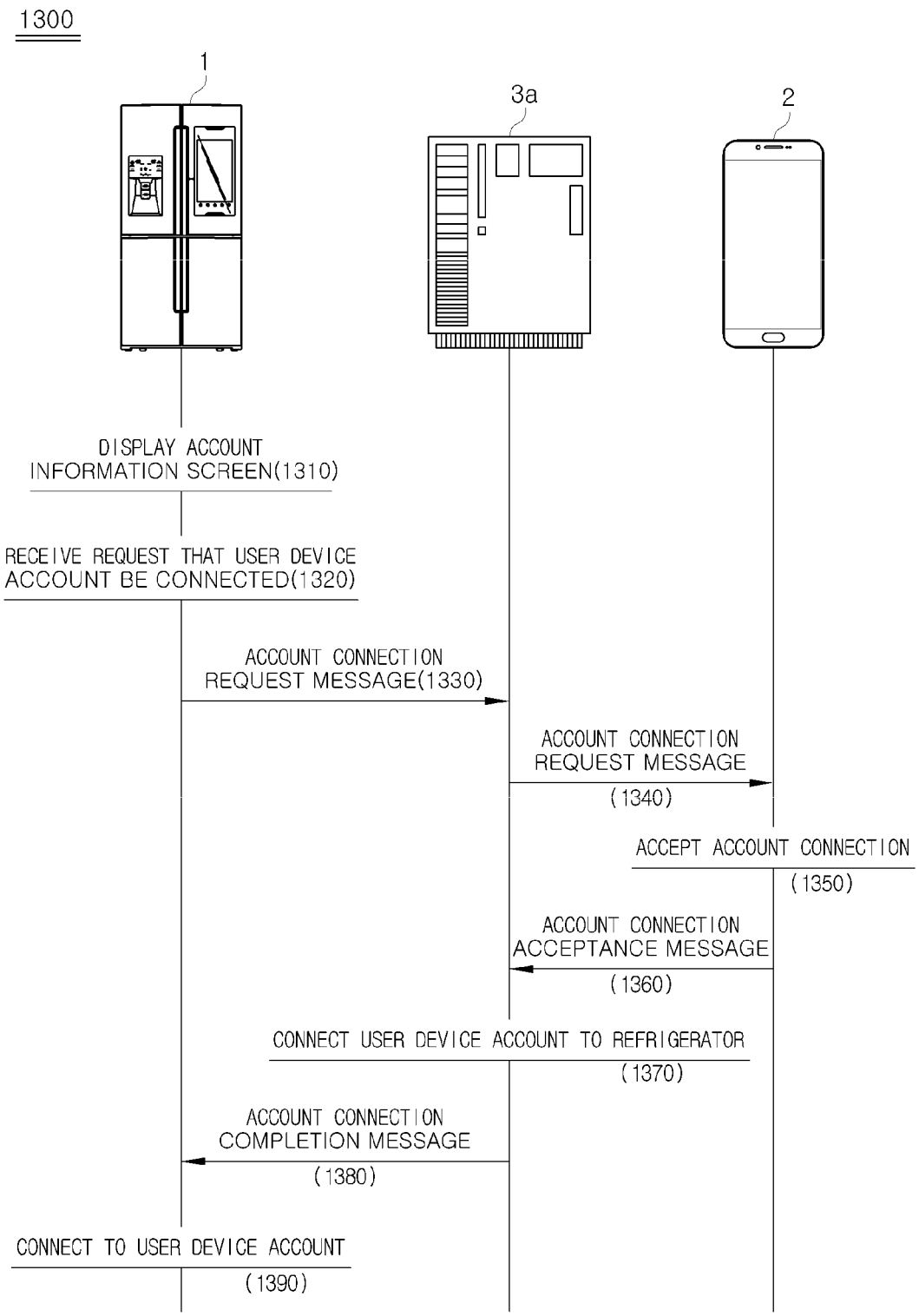
FIG. 27 illustrates a link method for linkage between the refrigerator and the user device according to an embodiment.
Figure 28:
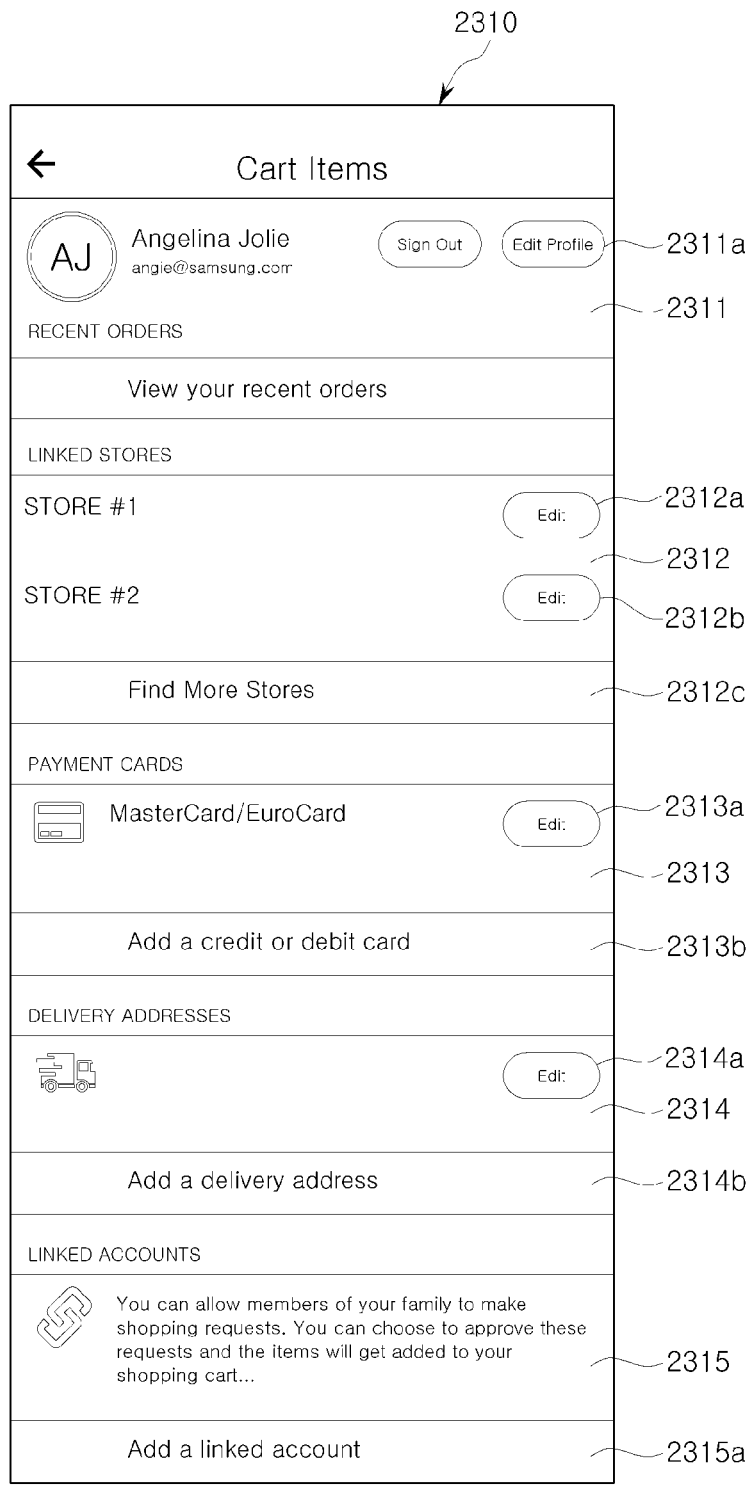
FIG. 28 illustrates a link screen configured to connect the refrigerator to the user device according to an embodiment.

FIG. 27 illustrates a link method for linkage between the refrigerator and the user device according to an embodiment. Also, FIG. 28 illustrates a link screen configured to connect the refrigerator to the user device according to an embodiment.

A link method 1300 for linkage between the user device 2 and the refrigerator 1 will be described with reference to FIGS. 27 and 28.

The refrigerator 1 displays an account information screen 2310 (1310).

When the online shopping application is run, the refrigerator 1 may display the main shopping screen 2110 (see FIG. 14) on the touchscreen display 120.

When a touch input for checking user account information is input to the main shopping screen 2110, the refrigerator 1 may display the account information screen 2310 on the touchscreen display 120. For example, the refrigerator 1 may display the account information screen 2310 as illustrated in FIG. 28.

The account information screen 2310 may include an identification information area 2311 configured to display identification information of a user, a store editing area 2312 configured to edit the selected stores (STORE #1 and STORE #2), a payment method editing area 2313 configured to edit a payment method, a delivery address editing area 2314 configured to edit a delivery address, and a link editing area 2315 configured to edit a list of user devices 2 linked to the refrigerator 1.

The identification information area 2311 may display a name, a nickname, an e-mail address, contact information, and the like of a user for identifying the user. Also, the identification information area 2311 may display an identification information editing button 2311a configured to edit identification information of the user.

The store editing area 2312 may display information on stores (STORE #1 and STORE #2) selected by the user. Also, the store editing area 2312 may display store editing buttons 2312a and 2312b configured to edit the selected stores (STORE #1 and STORE #2) and a store adding button 2312c configured to add a store for online shopping.

The payment method editing area 2313 may display information on a payment method selected by the user (e.g., a credit card number or a payment account number). Also, a payment method editing button 2313a configured to edit a selected payment method and a payment method adding button 2313b configured to add a payment method for paying for an item.

The delivery address editing area 2314 may display information on a delivery address input by the user (e.g., an address of a delivery address). Also, a delivery address editing button 2314a configured to edit a selected delivery address and a delivery address adding button 2314b configured to add a delivery address may be displayed on the delivery address editing area 2314.

The link editing area 2315 may display account information of the user device 2 that operates by being linked to the refrigerator 1. Also, a linked account adding button 2315a configured to add an account of the user device 2 that operates by being linked to the refrigerator 1 may be displayed on the link editing area 2315.

The refrigerator 1 receives a request from the user that an account of the user device 2 be connected to the refrigerator 1 (1320).

The user may input a request that an account of the user device 2 be connected to the refrigerator 1 so that the refrigerator 1 operates by being linked to the user device 2. For example, the user may touch the linked account adding button 2315a illustrated in FIG. 28.

According to the user's touch input, the refrigerator 1 transmits an account connection request message from the user device 2 to the service server 3a (1330).

When the user touches the linked account adding button 2315a illustrated in FIG. 28, the refrigerator 1 may display a linked account adding screen through which connection information of the user device 2 that will be added (e.g., a phone number of the user device) or connection information of a user who will be added (e.g., an e-mail address of the user) may be input.

The refrigerator 1 may acquire the connection information of the user device 2 that will be added or the connection information of a user who will be added through the linked account adding screen.

The refrigerator 1 may transmit a request that an account of the user device 2 or an additional user be connected to the refrigerator 1 to the service server 3a via the communicator 140, and may transmit connection information of the user device 2 or connection information of the user to the service server 3a in addition to the account connection request.

In response to receiving the account connection request, the service server 3a transmits an account connection request message to the user device 2 or the user (1340).

The service server 3a that has received the account connection request from the refrigerator 1 may use the connection information of the user device 2 or the connection information of the user included in the account connection request to transmit the account connection request message to the user device 2 or the user.

For example, the service server 3a may use the connection information of the user device 2 (e.g., a phone number of the user device) to transmit a text message (a short message service (SMS) message) to the user device 2. The text message may include a message that indicates that an account connection has been requested from a user of the refrigerator 1 and a link address for installing an online shopping application for providing an online shopping service by being linked to the refrigerator 1.

In another example, the service server 3a may use the connection information of the user (e.g., an e-mail address of the user) to send an e-mail to the user. The e-mail may include a message that indicates that an account connection has been requested from a user of the refrigerator 1 and a link address for installing an online shopping application for providing an online shopping service by being linked to the refrigerator 1.

In response to the account connection request message, the user device 2 accepts the account connection request from the refrigerator 1 (1350).

A user who has checked a text message or an e-mail from the service server 3a may accept the account connection request from the refrigerator 1 via the user device 2.

For example, the user may visit the link address included in the text message or the e-mail, thereby install an online shopping application in the user device 2. Also, the user may run the online shopping application and accept the account connection request from the refrigerator 1.

When the account connection request is accepted, the user device 2 sends an account connection acceptance message to the service server 3a (1360).

When the online shopping application is installed and the account connection request from the refrigerator 1 is accepted, the user device 2 may send the account connection acceptance message to the service server 3a via the communicator 240. The account connection acceptance message may include identification information of the refrigerator 1 that has requested the account connection, identification information of the user device 2, and user account information of the user who has accepted the account connection request.

In response to the account connection acceptance message from the user device 2, the service server 3a connects an account of the user device 2 to an account of the refrigerator (1370).

The service server 3a may add the account information of the user device 2 or the account information of the user of the user device 2 to, for example, a list of connected accounts that shows accounts connected to the refrigerator 1.

Then, the service server 3a sends an account connection completion message to the refrigerator 1 (1380).

In response to the account connection completion message from the service server 3a, the refrigerator 1 connects the account of the user device 2 to the refrigerator 1 (1390).

The refrigerator 1 may add the account information of the user device 2 or the account information of the user of the user device 2 to, for example, a list of connected accounts that shows accounts connected to the refrigerator 1.

As described above, the refrigerator 1 may request that an account of the user device 2 be connected to the refrigerator 1 according to user input, and the refrigerator 1 may connect an account of the user device 2 to the refrigerator 1 according to a response of the user device 2.

Also, the refrigerator 1 may provide an online shopping service by being linked to the connected user device 2.

Figure 29:
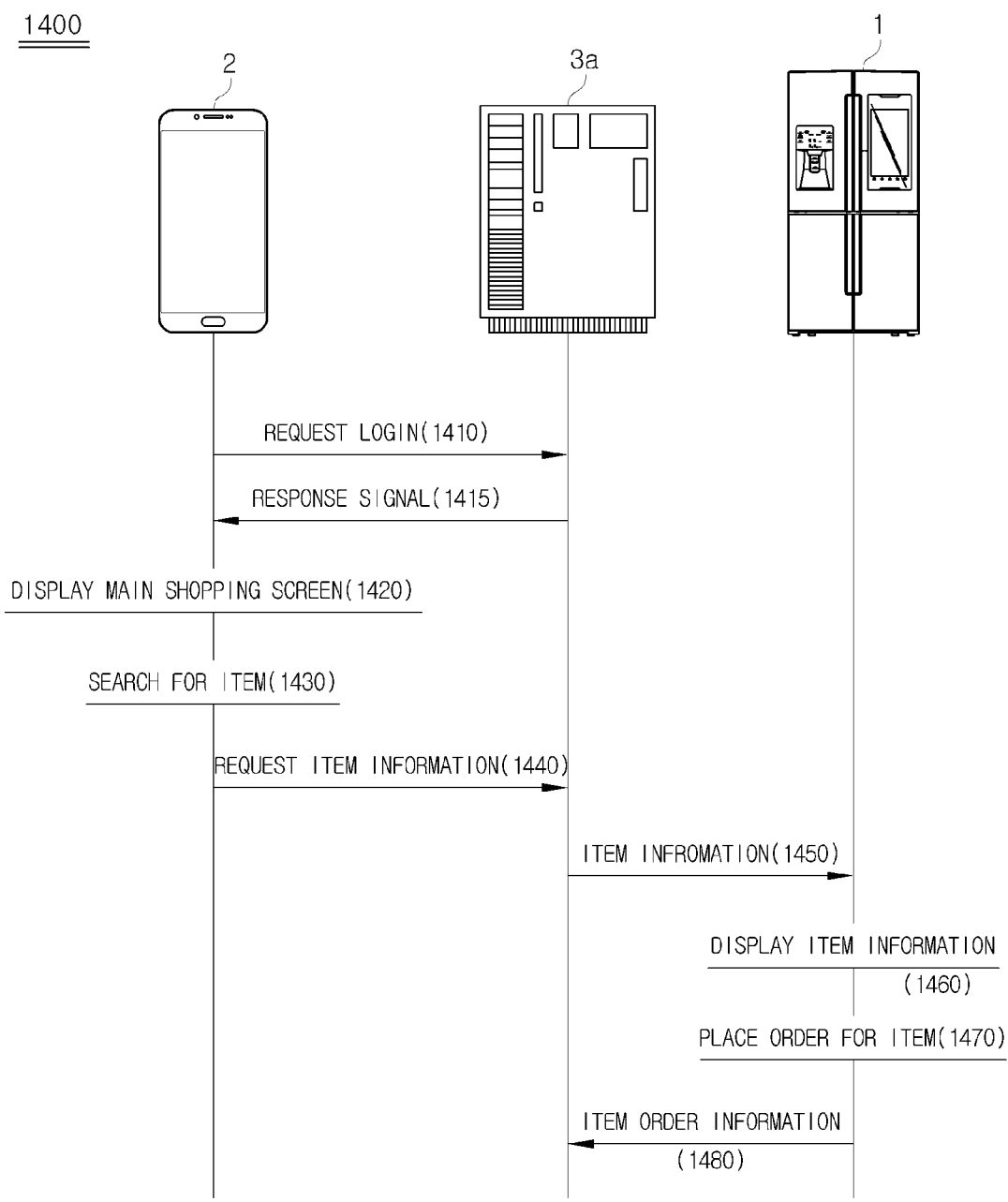
FIG. 29 illustrates an example of a method of providing a shopping service by a refrigerator linked to a user device according to an embodiment.
Figure 30:
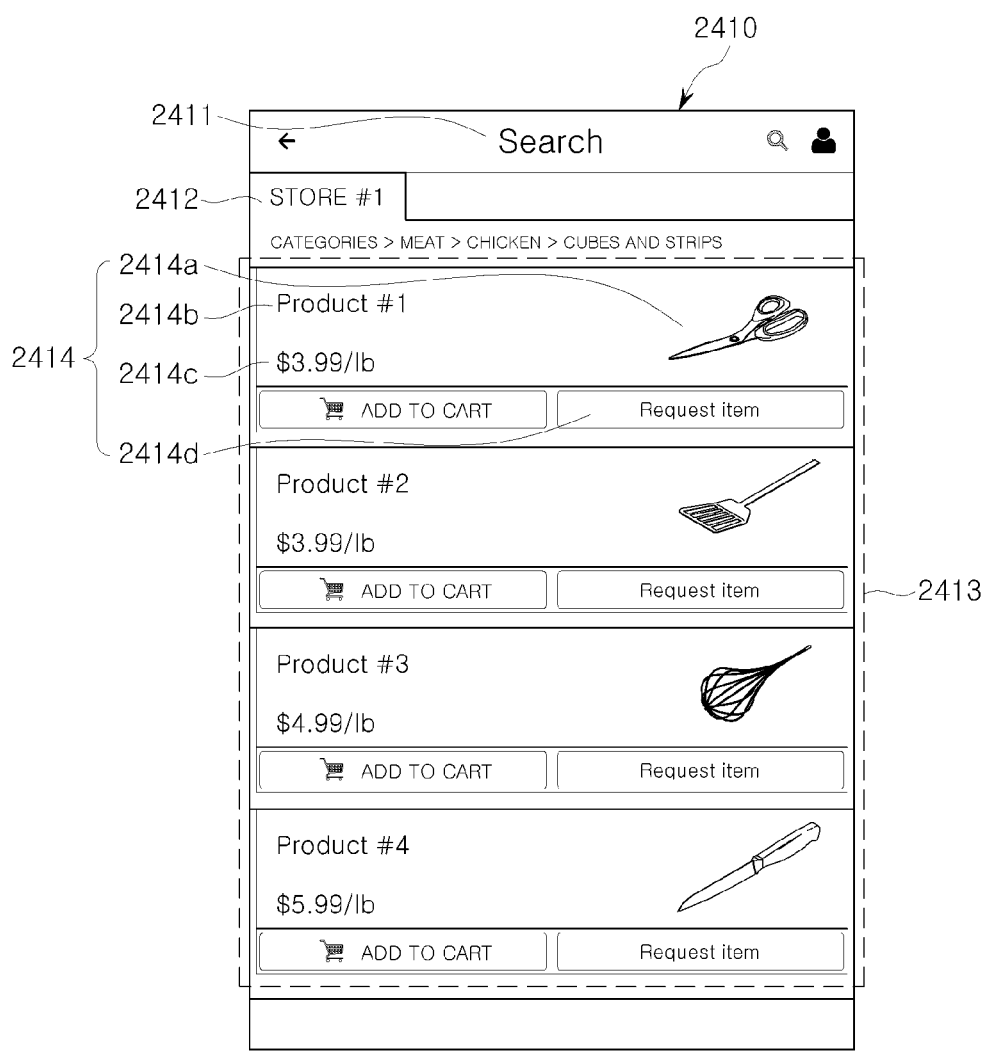
FIG. 30 illustrates an example of requesting purchase through the user device according to an embodiment.
Figure 31:
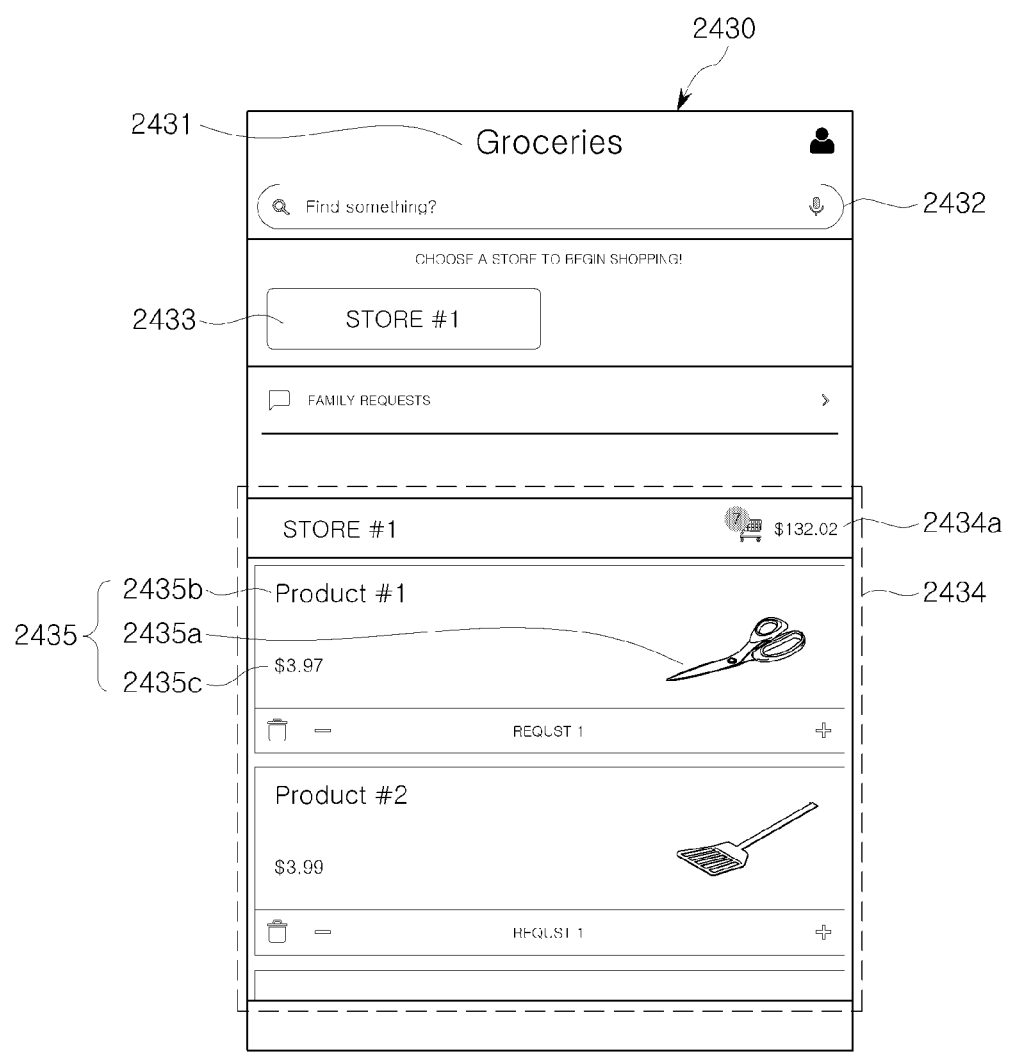
FIG. 31 illustrates an example of a result of a purchase request from the user device according to an embodiment.
Figure 32:
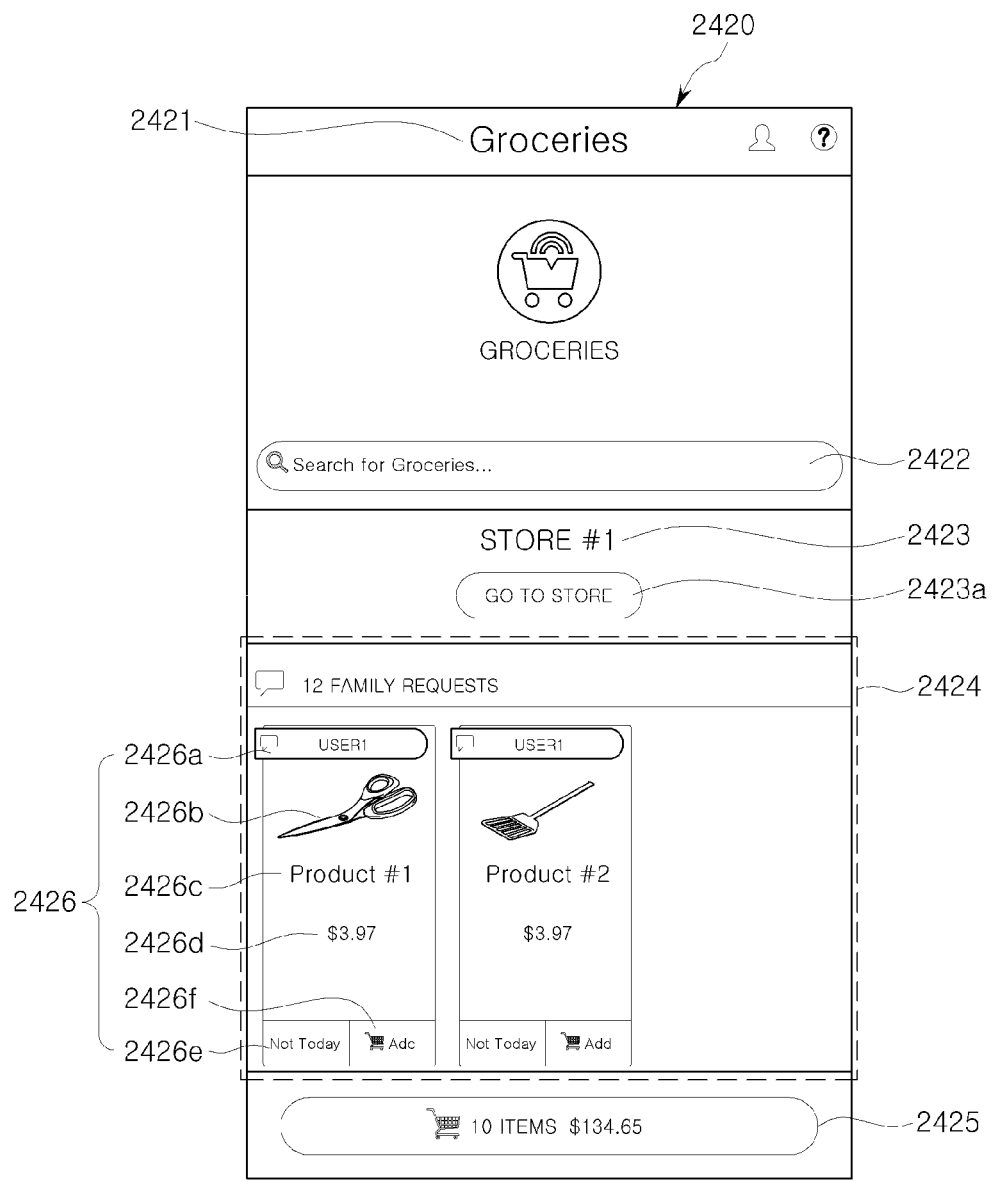
FIG. 32 illustrates an example of displaying the purchase request from the user device by the refrigerator according to an embodiment.
Figure 33:
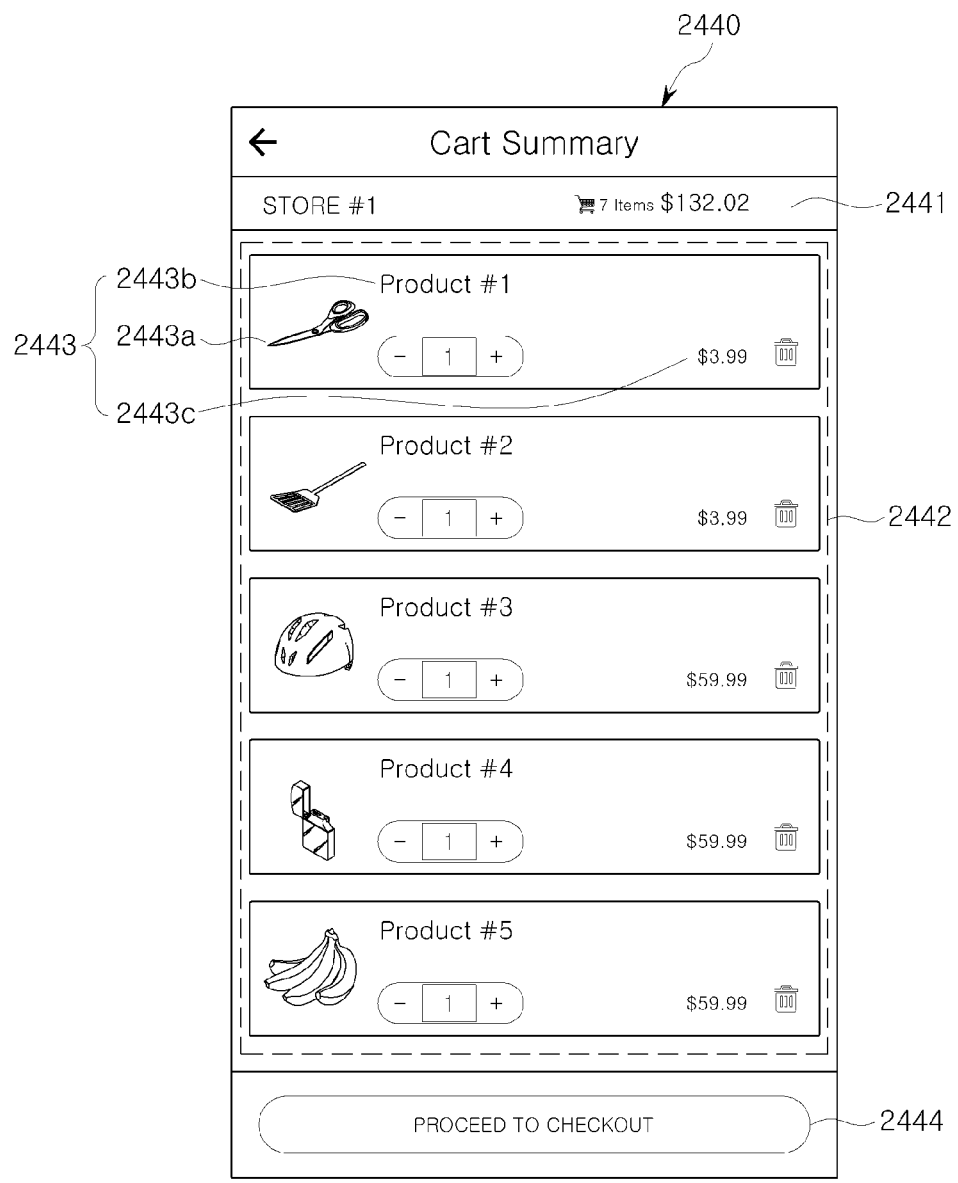
FIG. 33 illustrates an example of purchasing a product by the refrigerator according to the purchase request from the user device according to an embodiment.

FIG. 29 illustrates an example of a method of providing a shopping service by a refrigerator linked to a user device according to an embodiment. FIG. 30 illustrates an example of requesting purchase through the user device according to an embodiment. FIG. 31 illustrates an example of a result of a purchase request from the user device according to an embodiment. FIG. 32 illustrates an example of displaying the purchase request from the user device by the refrigerator according to an embodiment. Also, FIG. 33 illustrates an example of purchasing a product by the refrigerator according to the purchase request from the user device according to an embodiment.

A shopping service provision method 1400 through a linkage between the user device 2 and the refrigerator 1 will be described with reference to FIGS. 29, 30, 31, 33 and 33.

The user device 2 requests to login to the service server 3a (1410). In response to the login request from the user device 2, the service server 3a transmits a response signal to the user device 2 (1415). Also, the user device 2 searches for an item according to user input and displays item information (1420).

Operation of the user device 2 by Step 1410, Step 1415, and Step 1420 may be identical to operation of the user device 2 by Step 1210, Step 1215, Step 1220, Step 1230, Step 1240, Step 1250, and Step 1260 illustrated in FIG. 21.

The user device 2 receives an item purchase request from a user (1440).

The user device 2 may display item information of items on the touchscreen display 220. For example, the user device 2 may display an item information screen 2410 as illustrated in FIG. 30.

The item information screen 2410 may include a title area 2411 configured to indicate item search, a store selection area 2412 configured to select a store (STORE #1), and an item information area 2413 configured to display item information.

Item information 2414 of items may be displayed on the item information area 2413. For example, an item image 2414a, an item name 2414b, an item price 2414c, and a purchase request button 2414d configured to request that an item be purchased may be displayed on the item information area 2413.

The user may touch the purchase request button 2414d for an item desired to be purchased. When the purchase request button 2414d is touched, an item purchase request related to the purchase request button 2414d may be input to the user device 2.

Using a purchase request, a user (e.g., a user of the user device) may request another user (e.g., a user of the refrigerator) to place an order for an item or select and place an order for an item by using separate electronic devices (e.g., the user device and the refrigerator).

Also, the user device 2 may display item information of items that are requested to be purchased on the touchscreen display 220. For example, the user device 2 may display a main shopping screen 2430 as illustrated in FIG. 31.

The main shopping screen 2430 may include a title area 2431 configured to indicate an online shopping application, an item search area 2432 configured to search an item, a store area 2433 configured to display a store (STORE #1) selected by a user, and a purchase request information area 2434 configured to display information of items requested to be purchased from each store (e.g., the number and price of the items).

The title area 2341, the item search area 2432, and the store area 2433 may be identical to the title area 2211, the item search area 2212, and the store areas 2213 and 2214 illustrated in FIG. 22.

A total price 2434a of items requested to be purchased and item purchase request information 2435 transmitted to the refrigerator 1 may be displayed on the purchase request information area 2434. For example, an item image 2435a, an item name 2435b, and an item price 2435c of each item requested to be purchased may be displayed on the purchase request information area 2434.

The user of the user device 2 may check information of items requested to be purchased to the refrigerator 1 through the purchase request information area 2434.

In response to a purchase request input, the user device 2 transmits an item purchase request to the service server 3a (1440).

The user device 2 may transmit an item purchase request to the service server 3a via the communicator 240. The item purchase request may include, for example, an item purchase message and information on an item requested to be purchased.

In response to receiving the item purchase request, the service server 3a may transmit the item purchase request to the refrigerator 1 (1450).

In response to receiving the item purchase request, the refrigerator 1 displays the item purchase request (1460).

The refrigerator 1 may receive the item purchase request from the service server 3a via the communicator 140 and display the item purchase request from the user device 2 to the touchscreen display 120. For example, the refrigerator 1 may display a main shopping screen 2420 as illustrated in FIG. 32.

The main shopping screen 2420 may include a title area 2421 configured to indicate an online shopping application, an item search area 2422 configured to search for an item, a store area 2423 configured to display a store (STORE #1) selected by the user, a purchase-requested item area 2424 configured to display an item requested to be purchased, and a cart button 2425 configured to display information on items in cart.

The title area 2421, the item search area 2422, and the store area 2423 may be identical to the title area 2111, the item search area 2112, and the store areas 2113 and 2114 illustrated in FIG. 14.

The purchase-requested item area 2424 may display the number of item purchase requests and item purchase request information 2426 received from the user device 2. For example, user identification information 2426a of a user who requested that an item be purchased, an item image 2426b of items requested to be purchased, an item name 2426c of the items requested to be purchased, an item price 2426d of items requested to be purchased, a purchase refusal button 2426e configured to turn down a purchase request, and a purchase acceptance button 2426f configured to accept a purchase request may be displayed on the purchase-requested item area 2424.

A user of the refrigerator 1 may check a user (USER 1) who made an item purchase request through the user identification information 2426a. Also, when the user identification information 2426a is touched, the refrigerator 1 may display a message of the user (USER 1) who made the item purchase request, and the user of the refrigerator 1 may check the message from the user (USER 1) who made the item purchase request.

The user of the refrigerator 1 may check an item requested to be purchased looking at the item image 2426b, the item name 2426c, and the item price 2426d. The user of the refrigerator 1 may turn down or accept the purchase request after checking the item requested to be purchased.

The user of the refrigerator 1 may turn down the purchase request through the purchase refusal button 2426e. When the purchase refusal button 2426e is touched, the refrigerator 1 may delete a turned-down purchase request. Also, when the purchase refusal button 2426e is touched, the refrigerator 1 may send a message that indicates that a purchase request has been turned down to the user device 2 via the service server 3a.

The user of the refrigerator 1 may accept the purchase request by the purchase acceptance button 2426f. When the purchase acceptance button 2426f is touched, the refrigerator 1 may add an item that is accepted to be purchased to a cart. In other words, an item requested to be purchased may become a cart item. Also, when the purchase acceptance button 2426f is touched, the refrigerator 1 may send a message that indicates that a purchase request has been accepted to the user device 2 via the service server 3a.

Information on items to be bought by the user of the refrigerator 1 through the online shopping application may be displayed on the cart button 2425. For example, the number of items in cart and items in cart and the total price of the items in cart may be displayed on the cart button 2425. When the purchase acceptance button 2426f is touched, the refrigerator 1 may update the number of items in cart and the total price of the items in cart displayed on the cart button 2425. In other words, the refrigerator 1 may add the number and price of an item accepted to be purchased to the number and the price of the items in cart displayed on the cart button 2425.

When the purchase request is accepted by the user, the refrigerator 1 places an order for the item accepted to be purchased (1470).

To place an order for the item, the user may check the item to be purchased and pay for the item. The refrigerator 1 may display a list of items in cart to be bought by the user and display a screen for paying for the items.

For example, the refrigerator 1 may display a cart screen 2440 as illustrated in FIG. 33 to enable an item to be purchased according to a purchase request. The cart screen 2440 may display purchase information 2443 of items to be purchased according to a purchase request.

The cart screen 2440 may include a total purchase information area 2441 configured to display the number and total price of items in cart to be bought and a purchase information area 2442 configured to display the purchase information 2443 of items in cart to be bought from a store (STORE #1). The purchase information 2443 of items in cart to be bought may include an item image 2443a, and item name 2443b, and an item price 2443c of each cart item to be bought.

Also, the cart screen 2440 may include a proceed-to-checkout button 2444 configured to pay for items.

The user of the refrigerator 1 may check, through the cart screen 2440, the purchase information 2443 of the items in cart to be bought according to a purchase request. Also, in some cases, the user may change the number of items in cart or cancel the purchase through the cart screen 2440.

When items in cart are checked through the cart screen 2440, the user may touch the proceed-to-checkout button 2444.

Then, the user may pay for the items requested to be purchased through a checkout screen displayed on the touchscreen display 120 of the refrigerator 1.

Then, the refrigerator 1 transmits item order information to the service server 3a and the shopping mall server 3b (1480).

The refrigerator 1 may transmit item order information to the service server 3a and the shopping mall server 3b via the communicator 140. The item order information may include information on an item decided to be bought through the cart screen 2440 and information on a final price to be paid through the checkout screen.

In response to the order information from the refrigerator 1, the service server 3a may finish checking out, and the store (STORE #1) in the shopping mall server 3b may deliver items to the user.

As described above, a user may use the user device 2 to request the refrigerator 1 to buy an item, and a user of the refrigerator 1 may buy the item requested to be purchased from the user device 2 by the refrigerator 1.

Figure 34:
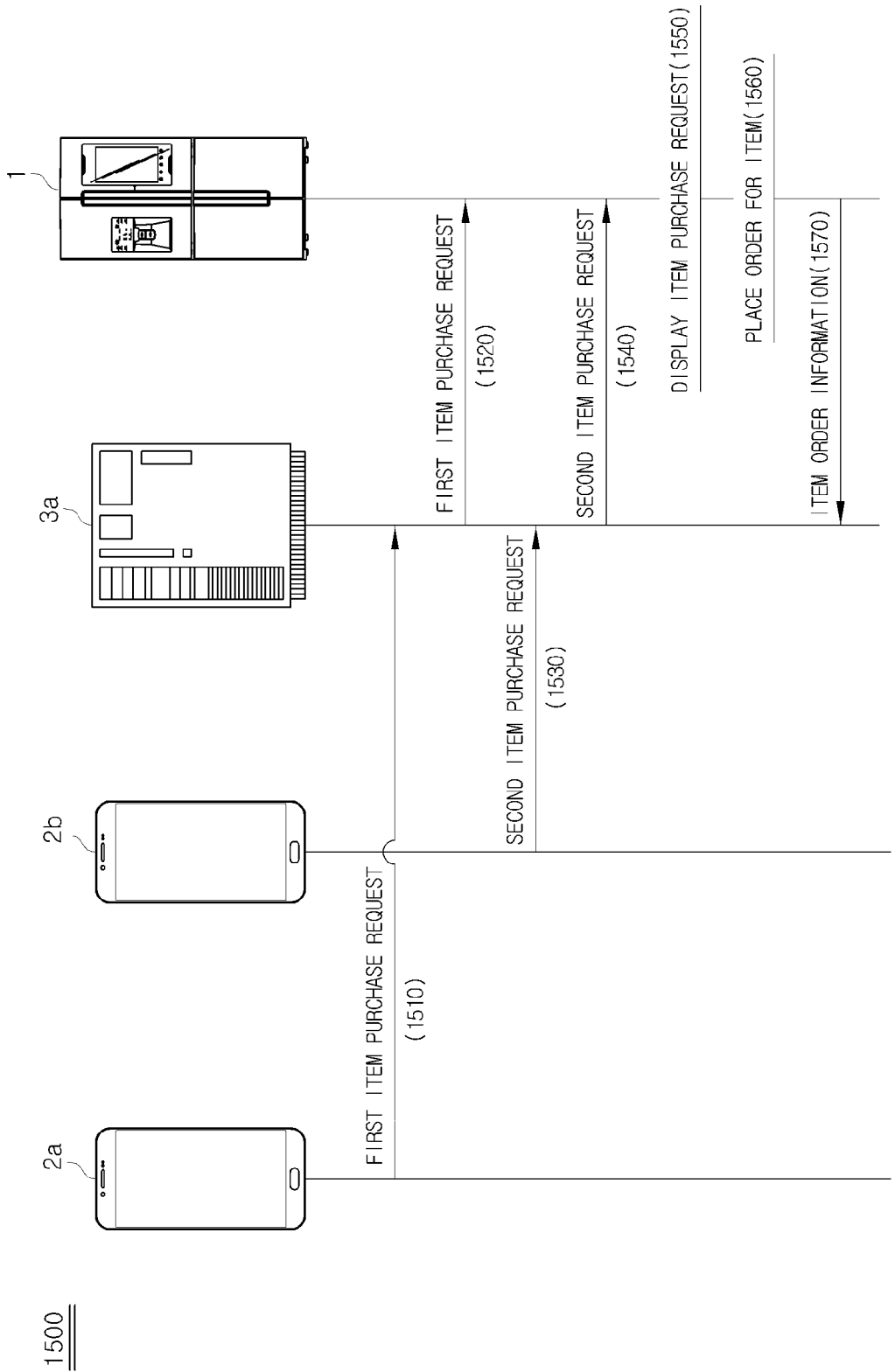
FIG. 34 illustrates another example of a method of providing a shopping service by a refrigerator being linked to a user device according to an embodiment.
Figure 35:
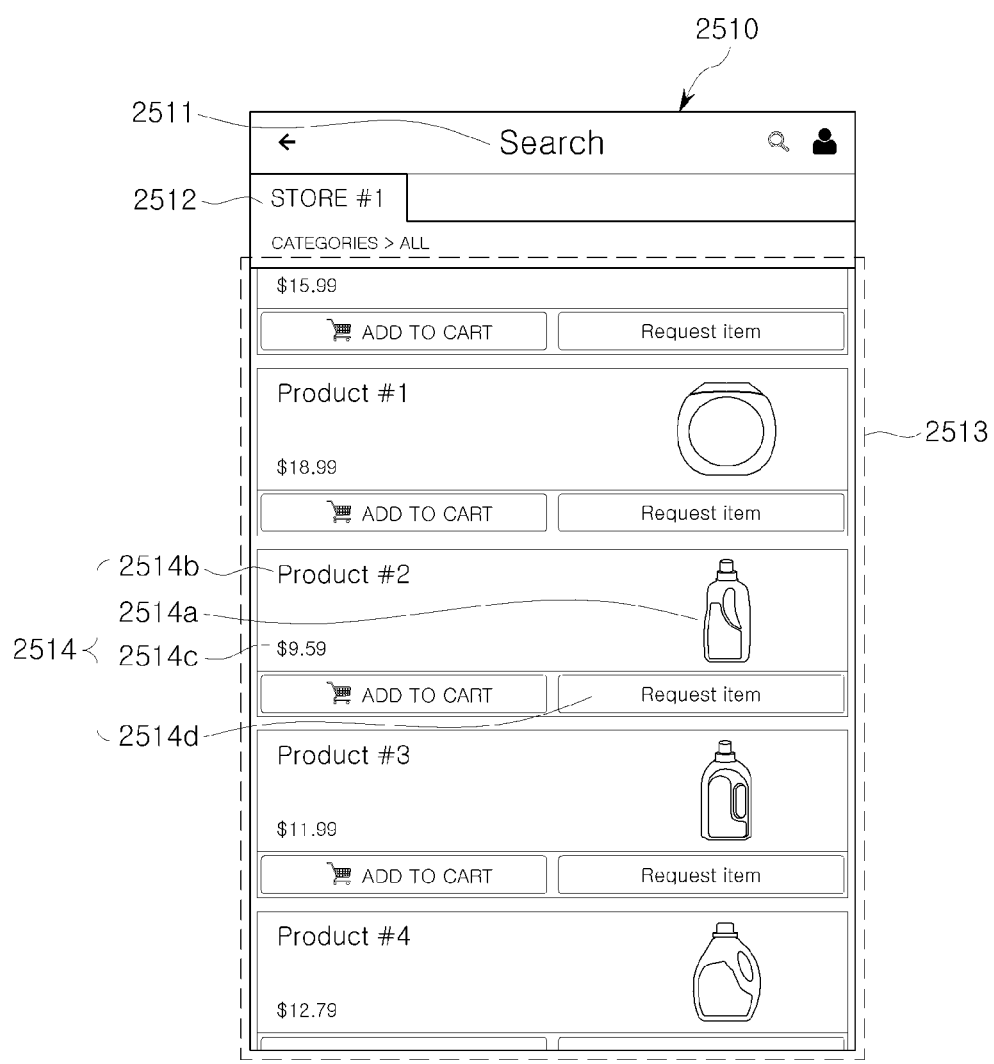
FIG. 35 illustrates another example of requesting purchase through the user device according to an embodiment.
Figure 36:
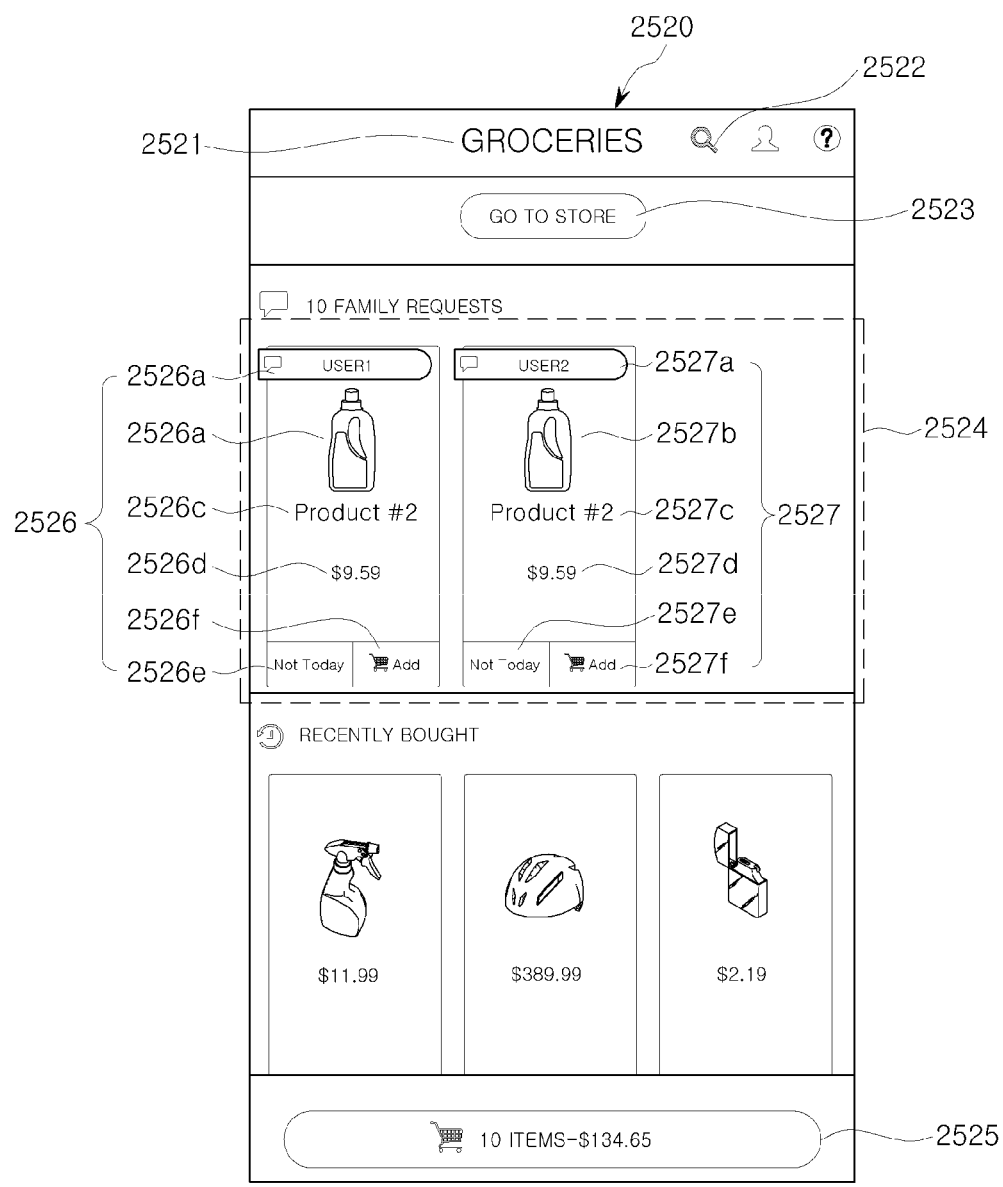
FIG. 36 illustrates another example of displaying a purchase request from the user device by the refrigerator according to an embodiment.
Figure 37:
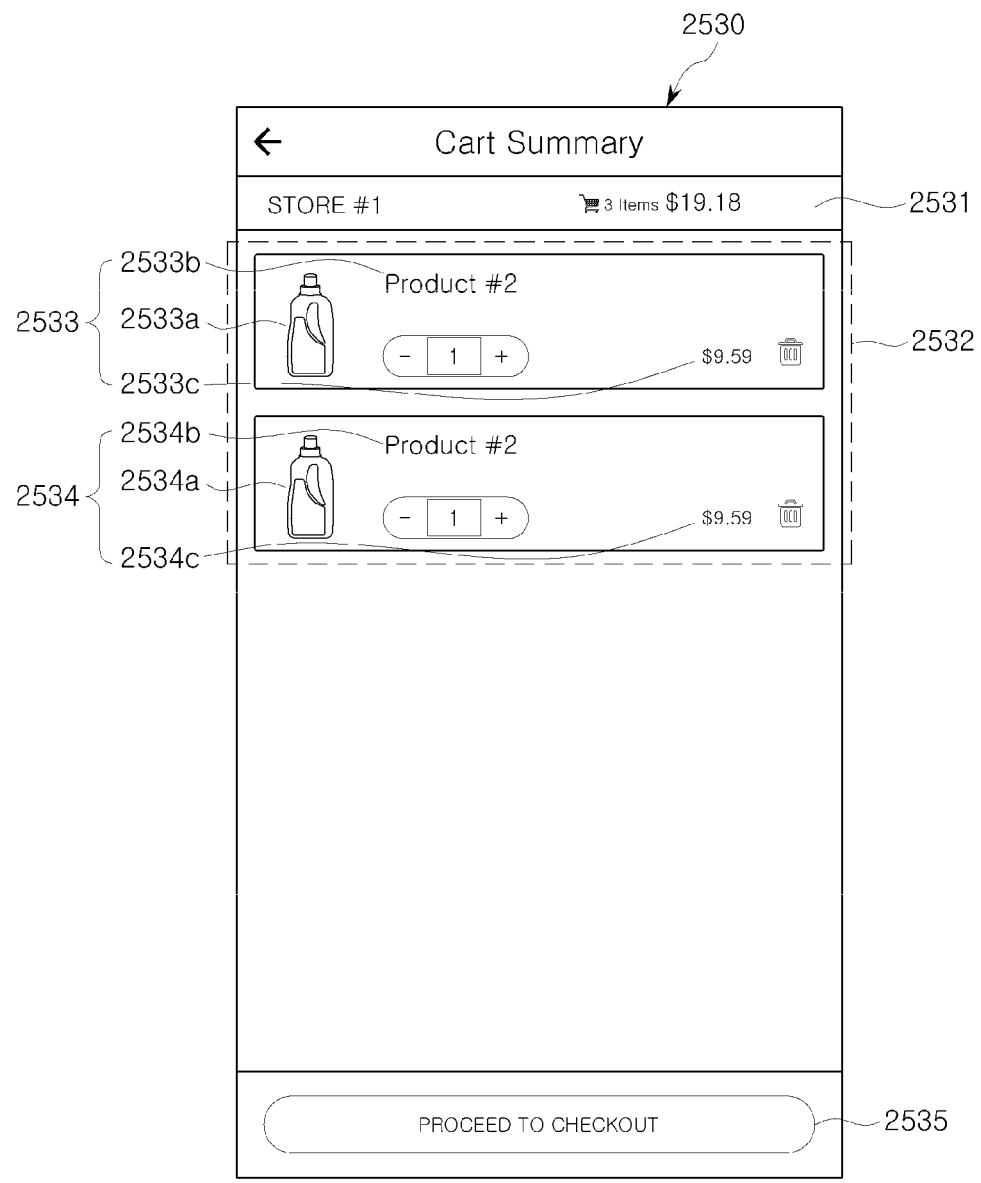
FIG. 37 illustrates another example of buying an item by the refrigerator according to a purchase request from the user device according to an embodiment.

FIG. 34 illustrates another example of a method of providing a shopping service by a refrigerator being linked to a user device according to an embodiment. FIG. 35 illustrates another example of requesting purchase through the user device according to an embodiment. FIG. 36 illustrates another example of displaying a purchase request from the user device by the refrigerator according to an embodiment. Also, FIG. 37 illustrates another example of buying an item by the refrigerator according to a purchase request from the user device according to an embodiment.

A shopping service provision method 1500 through a linkage between the user device 2 and the refrigerator 1 will be described with reference to FIGS. 34, 35, 36 and 37.

The first user device 2a receives an item purchase request from the first user (user 1) and transmits the item purchase request to the service server 3a (1510).

The first user device 2a may display item information of items on the touchscreen display 220. For example, the first user device 2a may display an item information screen 2510 as illustrated in FIG. 35.

The item information screen 2510 may include a title area 2511, a store selection area 2512, and an item information area 2513. Item information 2514 that contains an item image 2514a, an item name 2514b, an item price 2514c, and a purchase request button 2514d may be displayed on the item information area 2513.

The first user (user 1) may touch the purchase request button 2514d for a second item (Product #2), and the first user device 2a may transmit a request that the second item (Product #2) be purchased to the service server 3a.

The service server 3a transmits the item purchase request from the first user device 2a to the refrigerator 1 (1520).

A second user device 2b receives an item purchase request from a second user (user 2) and transmits an item purchase request to the service server 3a (1530).

The second user device 2b may display item information of items on the touchscreen display 220. For example, the second user device 2b may display the item information screen 2510 as illustrated in FIG. 35 as the first user device 2a.

The second user (user 2) may touch the purchase request button 2514d for the second item (Product #2), and the second user device 2b may transmit a request that the second item (Product #2) be purchased to the service server 3a.

The service server 3a transmits the item purchase request from the second user device 2b to the refrigerator (1540).

In response to receiving the item purchase request, the refrigerator 1 displays the item purchase request (1550).

The refrigerator 1 may receive the item purchase request from the service server 3a via the communicator 140 and display the item purchase requests from the first user device 2a and the second user device 2b on the touchscreen display 120. For example, the refrigerator 1 may display a main shopping screen 2520 as illustrated in FIG. 36.

The main shopping screen 2520 may include a title area 2521 configured to indicate an online shopping application, an item search area 2522 configured to search for an item, a store area 2523 configured to display a store (STORE #1) selected by a user, a purchase-requested item area 2524 configured to display an item requested to be purchased, and a cart button 2525 configured to display information on items in cart.

The title area 2521, the item search area 2522, the store area 2523, and the cart button 2525 may be identical to the title area 2421, the item search area 2422, the store areas 2423, and the cart button 2425 illustrated in FIG. 32.

The purchase-requested item area 2524 may display the number of item purchase requests and item purchase request information 2526 and 2527 received from the first user device 2a and the second user device 2b. For example, first item purchase request information 2526 of the second item (Product #2) received from the first user device 2a and second item purchase request information 2527 of the second item (Product #2) received from the second user device 2b may be displayed on the purchase-requested item area 2524.

The first item purchase request information 2526 of the second item (Product #2) may include user identification information 2526a of a user (user 1) who requested that the second item (Product #2) be purchased, an item image 2526b of the second item (Product #2), an item name 2526c of the second item (Product #2), an item price 2526d of the second item (Product #2), a purchase refusal button 2526e configured to turn down a request that the second item (Product #2) be purchased, and a purchase acceptance button 2526f configured to accept a request that the second item (Product #2) be purchased.

The second item purchase request information 2527 of the second item (Product #2) may include user identification information 2527a of a user (user 2) who requested that the second an item be purchased, an item image 2527b of the second item (Product #2), an item name 2527c of the second item (Product #2), an item price 2527d of the second item (Product #2), a purchase refusal button 2527e configured to turn down a request that the second item (Product #2) be purchased, and a purchase acceptance button 2527f configured to accept a request that the second item (Product #2) be purchased.

In this way, the refrigerator 1 may display each of the purchase request received from the first user device 2a and the purchase request received from the second user device 2b. Particularly, even when the item (Product #2) requested to be purchased from the first user device 2a and the item (Product #2) requested to be purchased from the second user device 2b are the same, the refrigerator 1 may separately display the second item (Product #2) requested to be purchased from the first user device 2a and the second item (Product #2) requested to be purchased from the second user device 2b.

The user of the refrigerator 1 may turn down the purchase request by using each of the purchase refusal buttons 2526e and 2527e or may accept the purchase request by using each of the purchase acceptance buttons 2526f and 2527f. When each of the purchase acceptance buttons 2526f and 2527f is touched, the refrigerator 1 may add the second item (Product #2) requested from the first user device 2a and the second item (Product #2) requested from the second user device 2b to the cart.

When the purchase request is accepted by a user, the refrigerator 1 places an order for the item accepted to be purchased (1560).

To place an order for the item, the user may check the item to be purchased and pay for the item. The refrigerator 1 may display a list of items in cart to be bought by the user and display a screen for paying for the items.

For example, the refrigerator 1 may display a cart screen 2530 as illustrated in FIG. 37 to enable an item to be purchased according to a purchase request. The cart screen 2530 may display pieces of purchase information 2533 and 2534 of items to be purchased according to a purchase request.

The cart screen 2530 may include a total purchase information area 2531 configured to display the number and total price of items in cart to be bought from the store (STORE #1) and a purchase information area 2532 configured to display the pieces of purchase information 2533 and 2534 of items in cart to be bought from the store (STORE #1).

The pieces of purchase information 2533 and 2534 of items in cart to be bought may include purchase information 2533 for the second item (Product #2) requested from the first user device 2a and purchase information 2534 for the second item (Product #2) requested from the second user device 2b.

The purchase information 2533 of the second item (Product #2) requested from the first user device 2a may include an item image 2533a of the second item (Product #2), an item name 2533b of the second item (Product #2), and an item price 2533c of the second item (Product #2). Also, the purchase information 2534 of the second item (Product #2) requested from the second user device 2b may include an item image 2534a of the second item (Product #2), an item name 2534b of the second item (Product #2), and an item price 2534c of the second item (Product #2).

In this way, the refrigerator 1 may display each of the purchase information 2533 of an item requested to be purchased from the first user device 2a and the purchase information 2534 of an item requested to be purchased from the second user device 2b. Particularly, even when the item (Product #2) requested to be purchased from the first user device 2a and the item (Product #2) requested to be purchased from the second user device 2b are the same, the refrigerator 1 may separately display the purchase information 2533 of the second item (Product #2) requested to be purchased from the first user device 2a and the purchase information 2534 of the second item (Product #2) requested to be purchased from the second user device 2b.

Also, the cart screen 2530 may include a proceed-to-checkout button 2535 configured to pay for an item.

The user of the refrigerator 1 may check, through the cart screen 2530, the pieces of purchase information 2533 and 2534 of the items in cart to be bought according to a purchase request. Also, in some cases, the user may change the number of items in cart or cancel the purchase through the cart screen 2530.

When items in cart are checked through the cart screen 2530, the user may touch the proceed-to-checkout button 2535.

Then, the user may pay for the items requested to be purchased through a checkout screen displayed on the touchscreen display 120 of the refrigerator 1.

Then, the refrigerator 1 transmits item order information to the service server 3a and the shopping mall server 3b (1570).

The refrigerator 1 may transmit item order information to the service server 3a and the shopping mall server 3b via the communicator 140. The item order information may include information on an item decided to be bought through the cart screen 2530 and information on a final price to be paid through the checkout screen.

In response to the order information from the refrigerator 1, the service server 3a may finish checkout, and the store (STORE #1) in the shopping mall server 3b may deliver items to the user.

As described above, multiple users (user1 and user2) may use the user devices 2a and 2b to request the refrigerator 1 to buy an item. The refrigerator may separately display purchase requests received from the user devices 2a and 2b and separately process the purchase requests received from the user devices 2a and 2b.

According to the aspect of the present disclosure, a refrigerator capable of providing convenient online shopping through a communication device and a touchscreen display can be provided.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:
1. An item purchase system, comprising:
a first user device storing a first account, and configured to transmit a first request identifying a first item selected to be purchased in association with the first account using the first user device;
a second user device storing a second account, and configured to transmit a second request identifying a second item selected to be purchased in association with the second account using the second user device, the second account being different than the first account; and
a refrigerator including:
a communicator including circuitry configured to receive the first request identifying the first item and the second request identifying the second item,
a touchscreen display, and
a processor configured to:
in response to receiving the first request and the second request, control the touchscreen display to display a purchase-requested item area, where the purchase-requested item area includes a first item purchase request graphic interface and a second item purchase request graphic interface,
the first item purchase request graphic interface comprising information of the first item of the first request, user information associated with the first account, a first purchase refusal option and a first purchase acceptance option, and the second item purchase request graphic interface comprising information of the second item of the second request, user information associated with the second account, a second purchase refusal option and a second purchase acceptance option;

in response to receiving a selection of one or more of the first purchase acceptance option and the second purchase acceptance option via the touchscreen display, adding one or more of the first item and the second item to an electronic cart;

place an order through the refrigerator, via an order screen, for the one or more items added to the electronic cart to thereby purchase at least one of the first item and the second item.

2. The item purchase system of claim 1, wherein the touchscreen display, displays the first purchase refusal option and the second purchase refusal option configured to turn down the first request and the second request, respectively, and the first purchase acceptance option and the second purchase acceptance option configured to accept the first request and the second request, respectively.

3. The item purchase system of claim 2, wherein, when a touch input on one or more of the first purchase acceptance option and the second purchase acceptance option is received in association with the at least one of the first request and the second request, the touchscreen display displays the order screen through which the order for the at least one of the first item and the second item identified to be purchased is placed.

4. The item purchase system of claim 2, wherein, when a touch input related to at least one of the first account and the second account is received, the touchscreen display displays a message input through at least one of the first user device and the second user device.

5. The item purchase system of claim 1, wherein the touchscreen display displays a plurality of store selection buttons to respectively represent a plurality of stores.

6. The item purchase system of claim 5, wherein the touchscreen display separately displays available items from each of the plurality of stores.

7. The item purchase system of claim 5, wherein the touchscreen display separately displays purchase prices to be paid to each of the plurality of stores.

8. The item purchase system of claim 1, further comprising:

a service server configured to receive the first request and the second request identifying the first item and the second item from the first user device and the second user device and transmit the first request and the second request to the refrigerator.

9. The item purchase system of claim 8, wherein the service server sends a message to connect the first account of the first user device and the second account of the second user device to the refrigerator in response to account connection request from the refrigerator, and registers the first account of the first user device and the second account of the second user device to the refrigerator in response to account connection acceptance from the first user device and the second user device.

10. A method controlling a refrigerator, comprising:

receiving a first request identifying a first item selected to be purchased from a first user device in association with a first account and a second request identifying a second item selected to be purchased from a second user device in association with a second account, the second account being different than the first account;

in response to receiving the first request and the second request, displaying a purchase-requested item area of a touchscreen display of the refrigerator, where the purchase-requested item area includes a first item purchase request graphic interface and a second item purchase request graphic interface, the first item purchase request graphic interface comprising information of the first item of the first request user information associated with the first account, a first purchase refusal option and a first purchase acceptance option, and the second item purchase request graphic interface comprising information of the second item of the second request, user information associated with the second account, a second purchase refusal option and a second purchase acceptance option; and in response to receiving a selection of one or more of the first purchase acceptance option and the second purchase acceptance option via the touchscreen display, adding one or more of the first item and the second item to an electronic cart;

placing an order, through the refrigerator, via an order screen, for the one or more items added to the electronic cart.

11. The method of claim 10, further comprising: displaying, on the refrigerator, the first purchase refusal option and the second purchase refusal option configured to turn down the first request and the second request, respectively, and the first purchase acceptance option and the second purchase acceptance option configured to accept the first request and the second request, respectively.

12. The method of claim 11, further comprising, when a touch input on one or more of the first purchase acceptance option and the second purchase acceptance option is received in association with at least one of the first request and the second request, displaying the order screen to place the order for at least one of the first item and the second item identified to be purchased.

13. The method of claim 11, further comprising, when a touch input related to at least one of the first account and the second account is received, displaying a message input through at least one of the first user device and the second user device.

14. The method of claim 10, further comprising separately displaying available items from each of a plurality of stores.

15. The method of claim 10, further comprising separately displaying each purchase price to be paid to each of a plurality of stores.

16. A refrigerator comprising:

a communicator including circuitry configured to receive, from a first user device storing a first account, a first request identifying a first item selected to be purchased in association with the first account using the first user device and receive, from a second user device storing a second account, a second request identifying a second item selected to be purchased in association with the second account using the second user device, the second account being different than the first account;

a touchscreen display; and a processor configured to:

in response to receiving the first request and the second request, control the touchscreen display to display a purchase-requested item area, where the purchase-requested item area includes a first item purchase request graphic interface and a second item purchase request graphic interface,
  the first item purchase request graphic interface comprising information of the first item of the first request, user information associated with the first account, a first purchase refusal option and a first purchase acceptance option, and
  the second item purchase request graphic interface comprising information of the second item of the second request, user information associated with the second account, a second purchase refusal option and a second purchase acceptance option;
in response to receiving a selection of one or more of the first purchase acceptance option and the second purchase acceptance option via the touchscreen display, adding one or more of the first item and the second item to an electronic cart;
place an order through the refrigerator, via an order screen, for the one or more items added to the electronic cart.

17. The refrigerator of claim 16, wherein the touchscreen display displays the first purchase refusal option and the second purchase refusal option configured to turn down the first request and the second request, respectively, and the first purchase acceptance option and the second purchase acceptance option configured to accept the first request and the second request, respectively.

18. The refrigerator of claim 17, wherein, when a touch input on or more of the first purchase acceptance option and the second purchase acceptance option is received in association with at least one of the first request and the second request, the touchscreen display displays the order screen to place the order for at least one of the first item and the second item identified to be purchased.

19. The refrigerator of claim 17, wherein when a touch input related to at least one of the first account and the second account is received, the touchscreen display displays a message input through at least one of the first user device and the second user device.

* * * * *